(12) United States Patent
Kaburaki et al.

(10) Patent No.: US 10,628,052 B2
(45) Date of Patent: Apr. 21, 2020

(54) MEMORY SYSTEM CONTROLLING A CACHE OF A NONVOLATILE MEMORY

(71) Applicant: Toshiba Memory Corporation, Minato-ku (JP)

(72) Inventors: Satoshi Kaburaki, Meguro (JP); Katsuya Ohno, Yokohama (JP); Hiroshi Katougi, Isehara (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/113,202

(22) Filed: Aug. 27, 2018

(65) Prior Publication Data

US 2019/0235762 A1  Aug. 1, 2019

(30) Foreign Application Priority Data

Jan. 29, 2018 (JP) .................................. 2018-012649

(51) Int. Cl.
  *G06F 3/06*   (2006.01)
  *G06F 12/0891*  (2016.01)
  *G06F 12/10*   (2016.01)

(52) U.S. Cl.
  CPC .......... *G06F 3/0611* (2013.01); *G06F 3/0656* (2013.01); *G06F 3/0679* (2013.01); *G06F 12/0891* (2013.01); *G06F 12/10* (2013.01); *G06F 2212/1024* (2013.01); *G06F 2212/2022* (2013.01)

(58) Field of Classification Search
  CPC .... G06F 3/0611; G06F 3/0656; G06F 3/0679; G06F 12/10; G06F 12/0891; G06F 2212/1024; G06F 2212/2022
  See application file for complete search history.

(56) References Cited

U.S. PATENT DOCUMENTS

| | | | |
|---|---|---|---|
| 5,784,590 | A | 7/1998 | Cohen et al. |
| 7,743,215 | B2 | 6/2010 | Okawa et al. |
| 2017/0068621 | A1 | 3/2017 | Watanabe et al. |
| 2017/0235681 | A1* | 8/2017 | Kaburaki ............ G06F 12/0292 711/128 |

FOREIGN PATENT DOCUMENTS

| | | |
|---|---|---|
| JP | 5-282208 | 10/1993 |
| JP | 5012016 | 8/2012 |

* cited by examiner

*Primary Examiner* — Aracelis Ruiz
(74) *Attorney, Agent, or Firm* — Oblon, McClelland, Maier & Neustadt, L.L.P.

(57) ABSTRACT

According to one embodiment, a memory system includes a nonvolatile memory and a controller configured to manage a first cache which stores a part of a logical-to-physical address translation table in the nonvolatile memory. The first cache includes cache lines each including sub-lines. Each of entries of a first cache tag includes bitmap flags corresponding to the sub-lines in the corresponding cache line. Each bitmap flag indicates whether data of the logical-to-physical address translation table is already transferred to a corresponding sub-line. The controller determines a cache line including the smallest number of sub-lines to which data of the logical-to-physical address translation table is already transferred, as a cache line to be replaced.

18 Claims, 41 Drawing Sheets

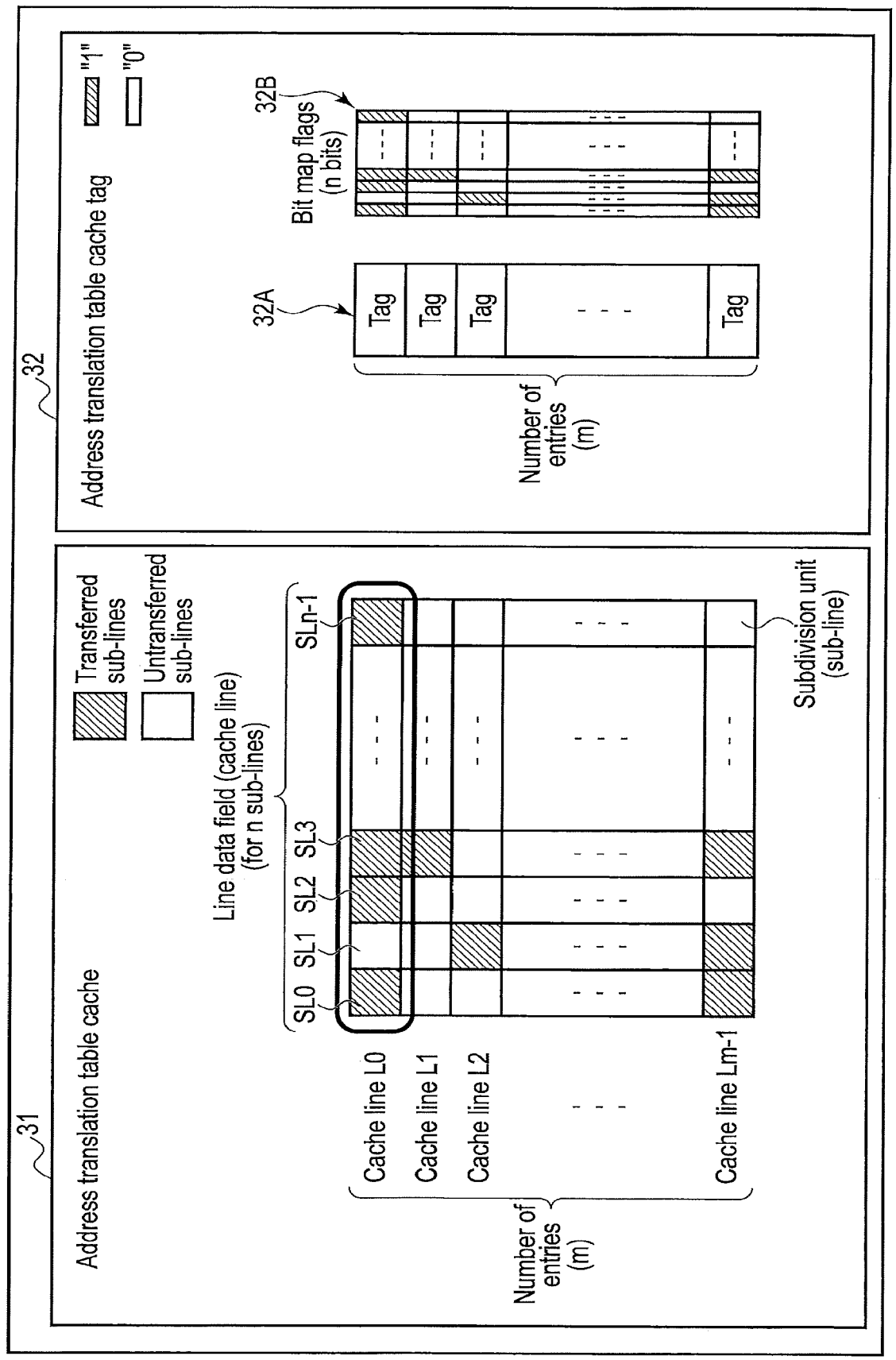
F I G. 3

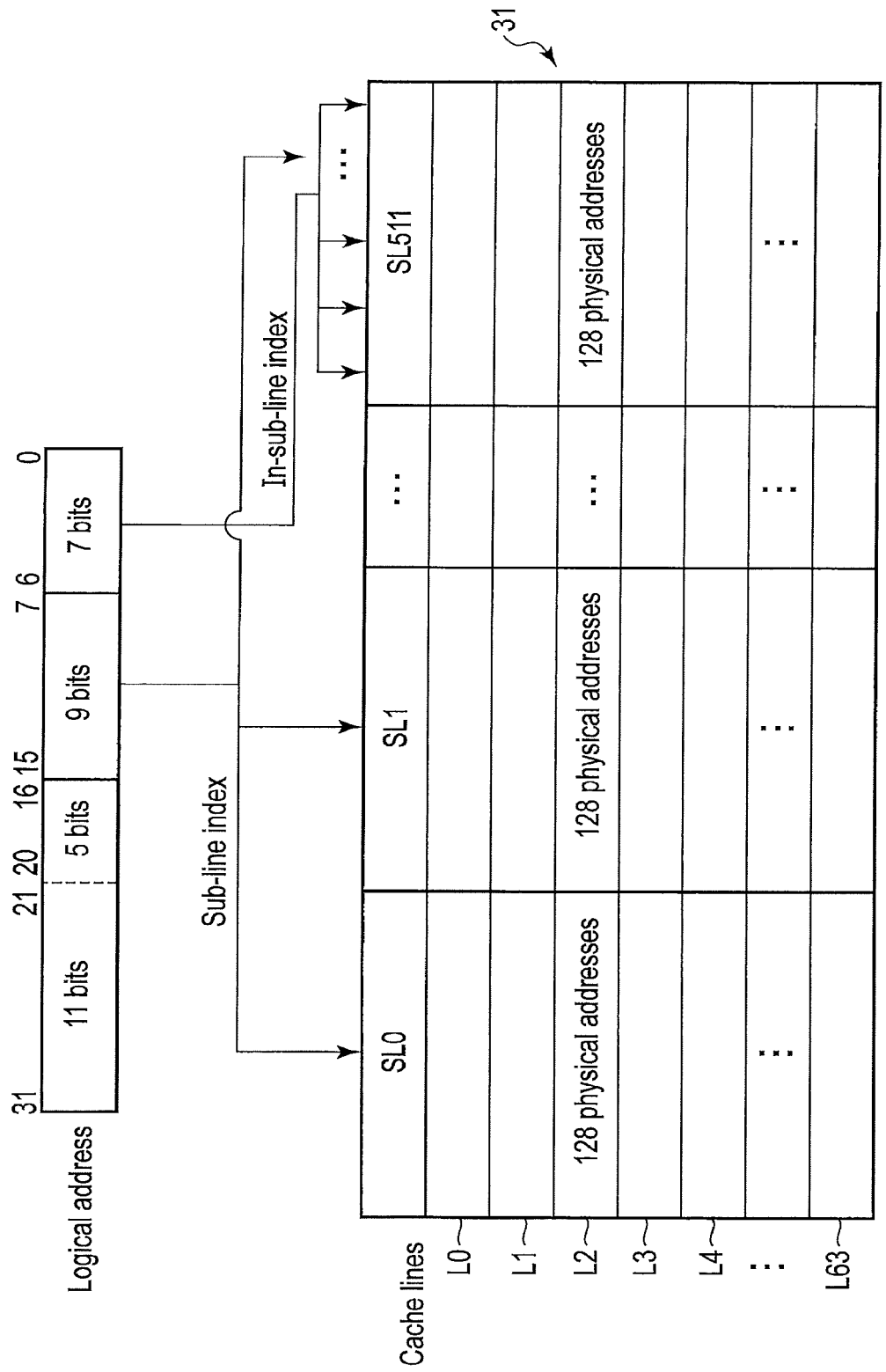
F I G. 6

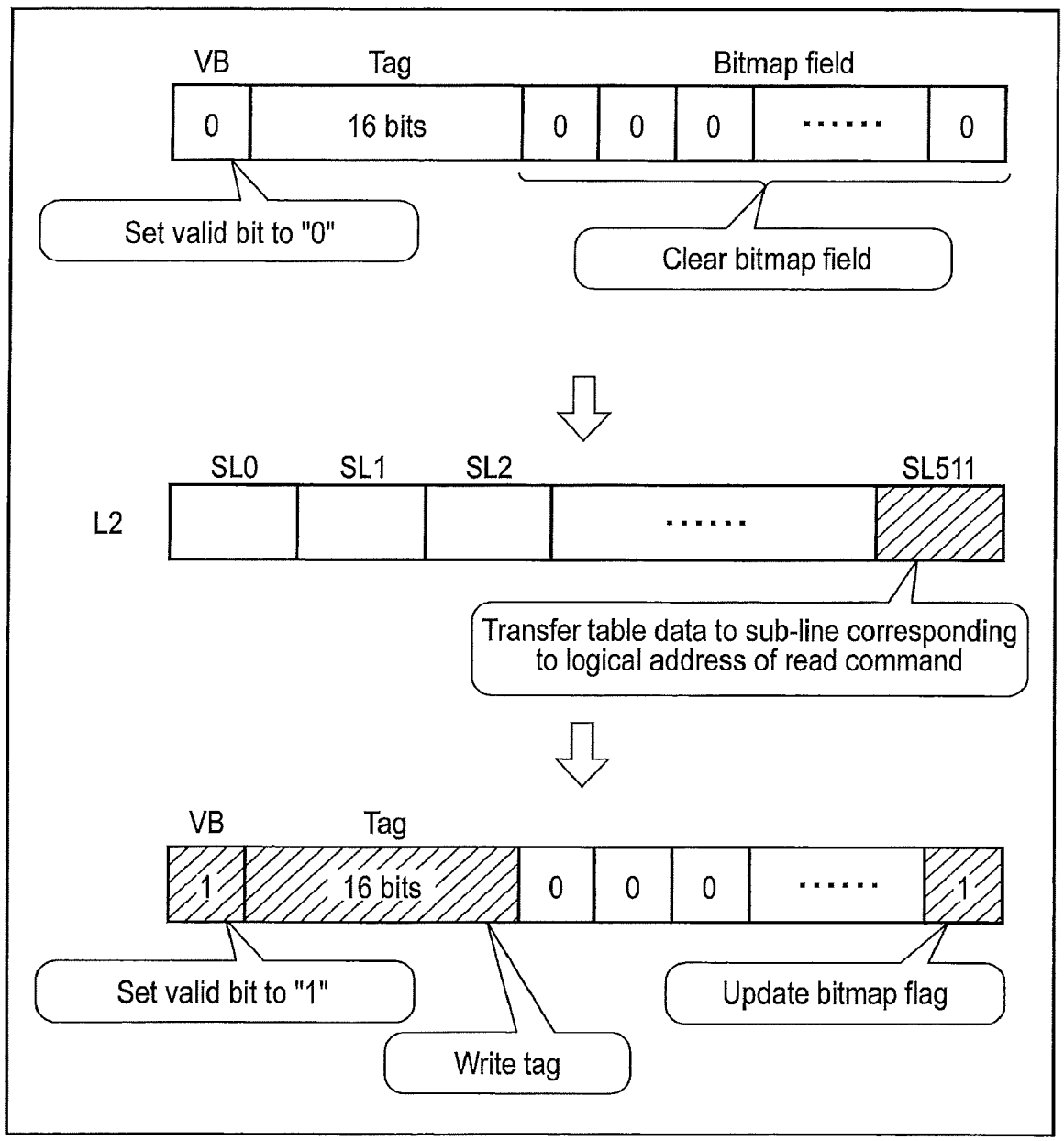
F I G. 11

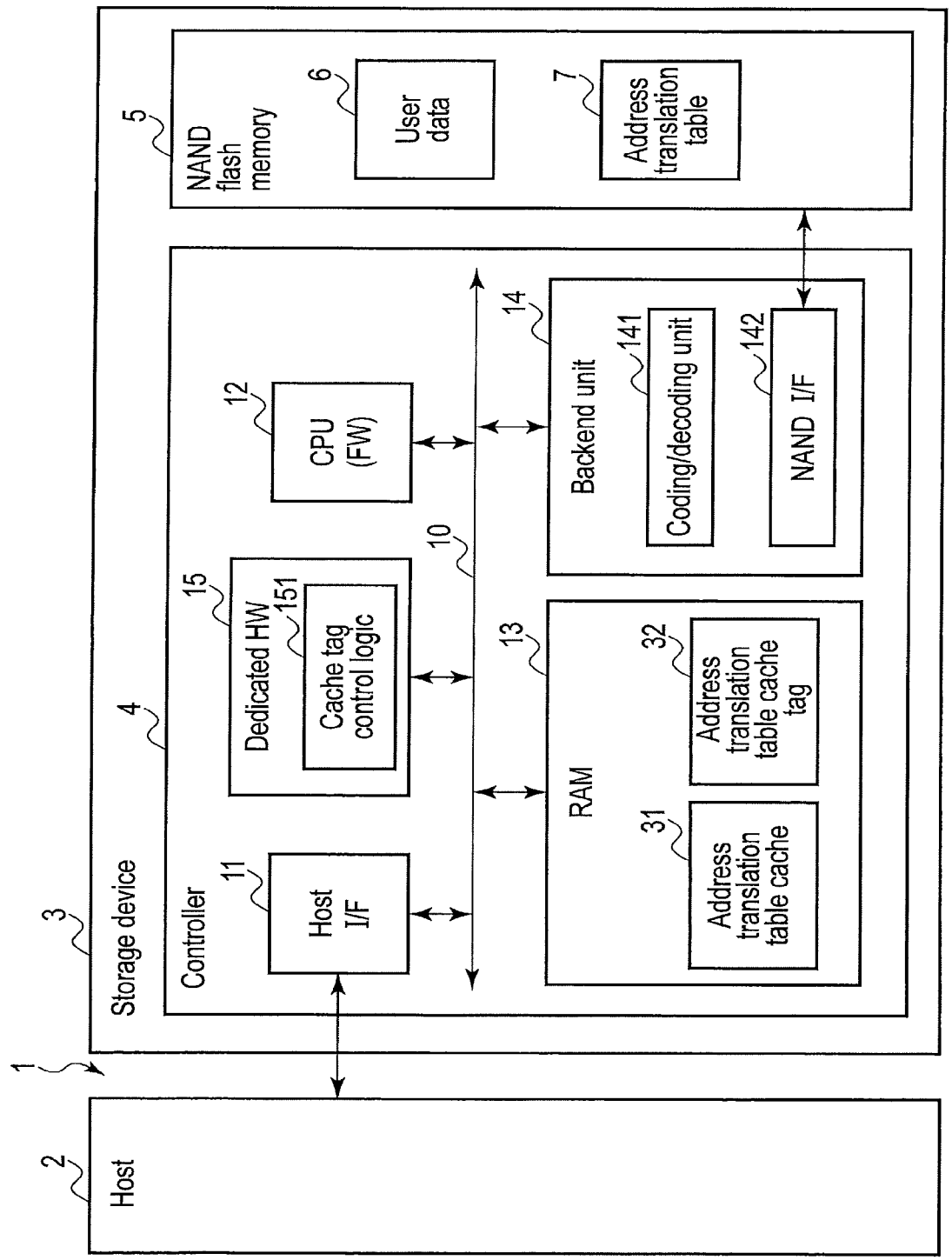
F I G. 12

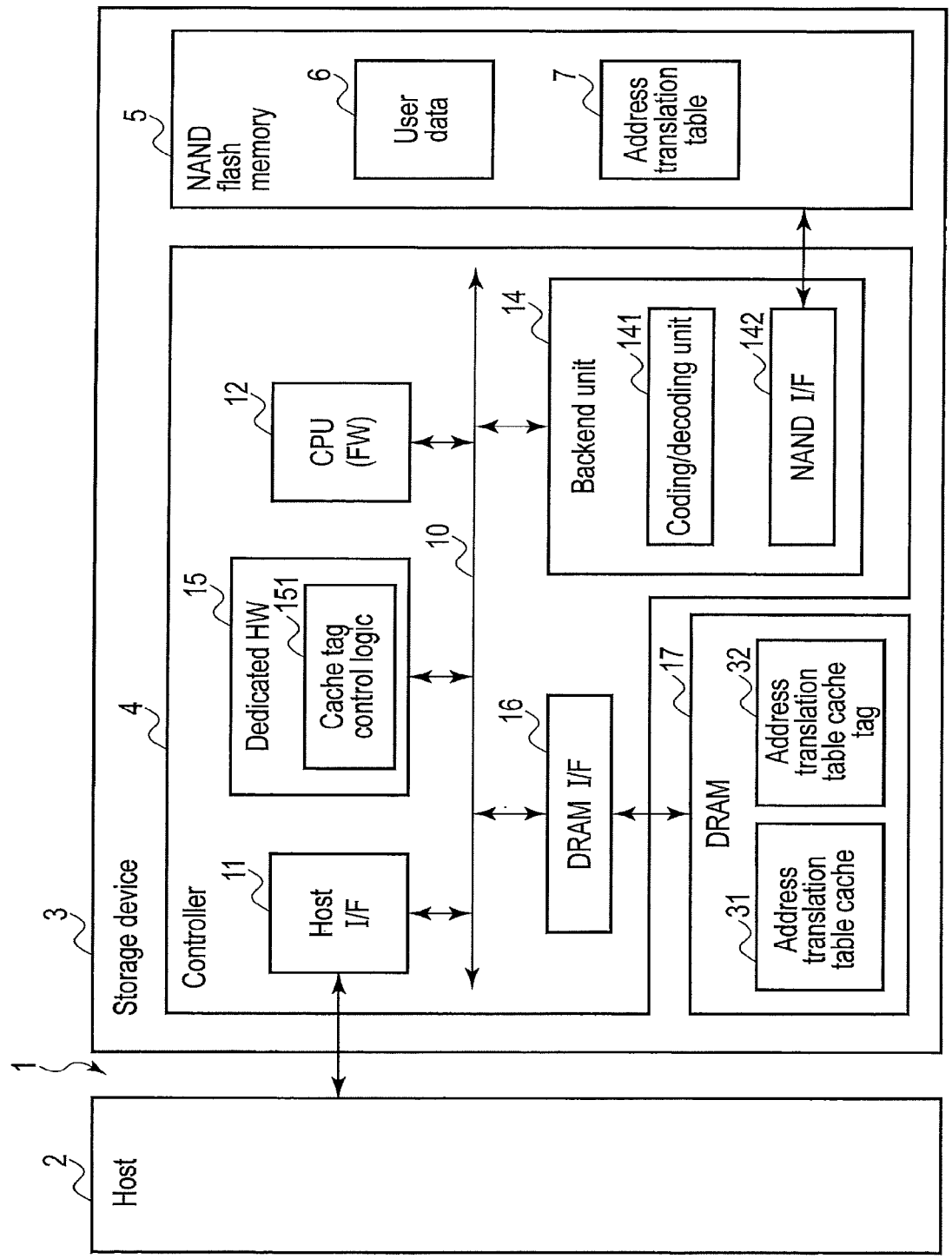
F I G. 13

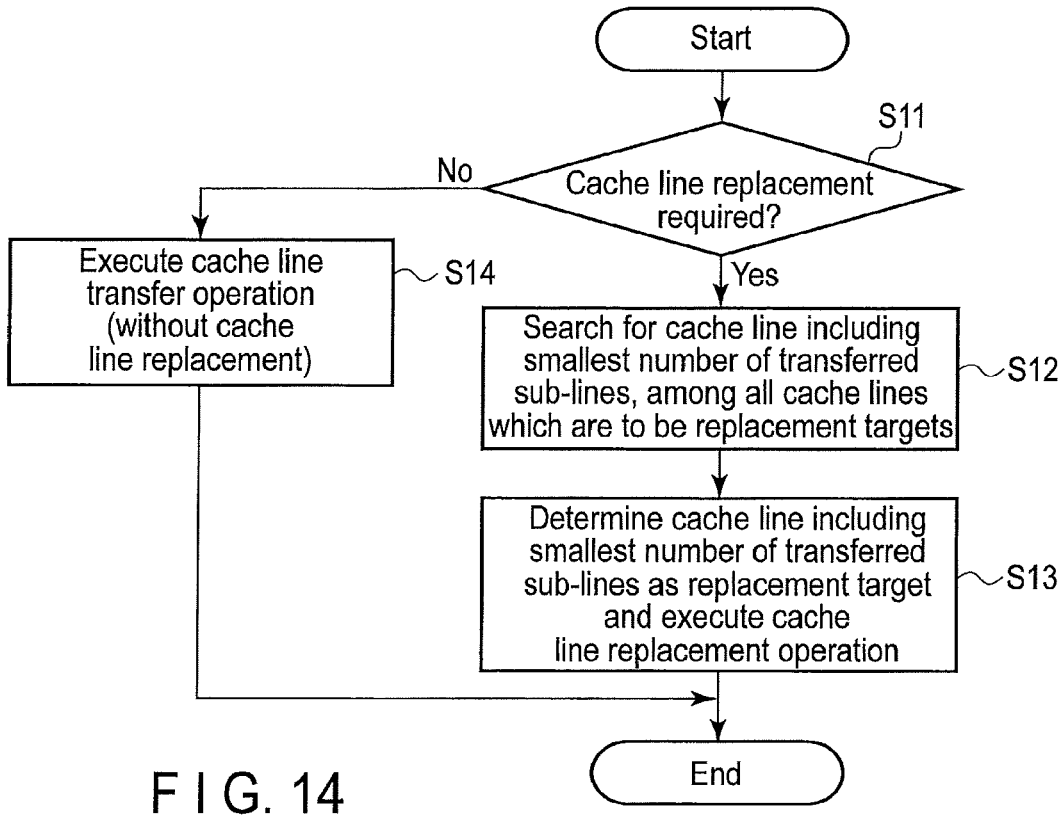
F I G. 14
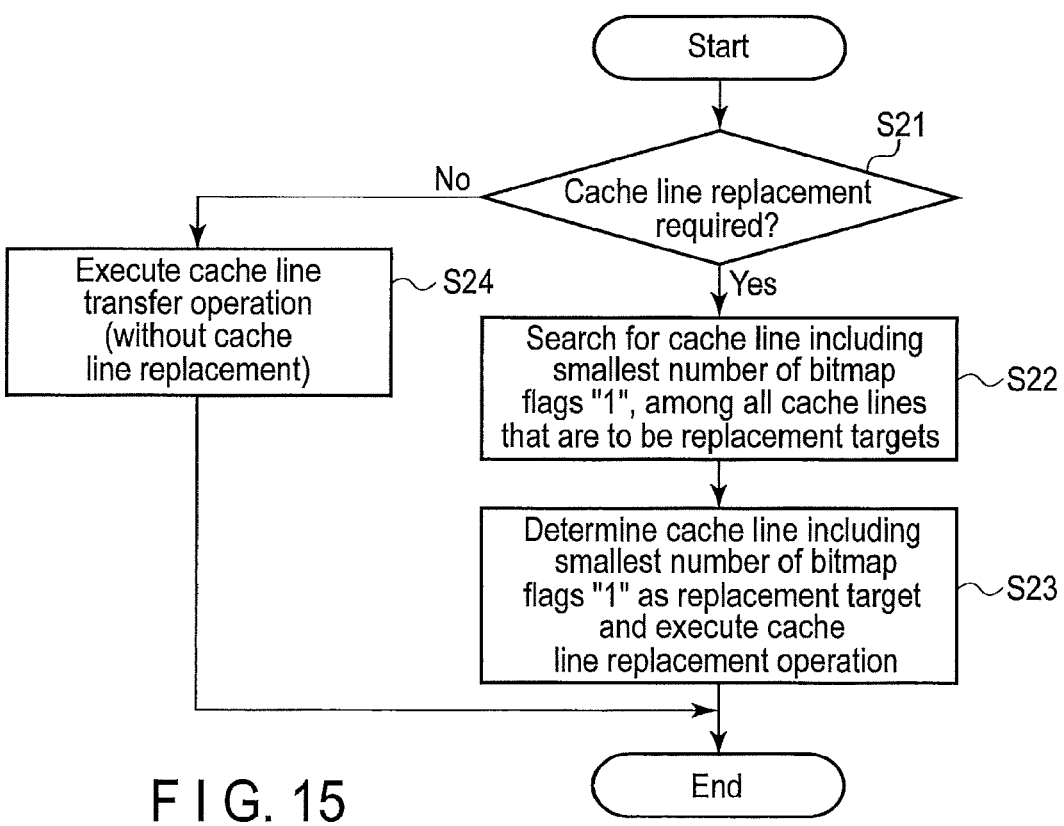
F I G. 15

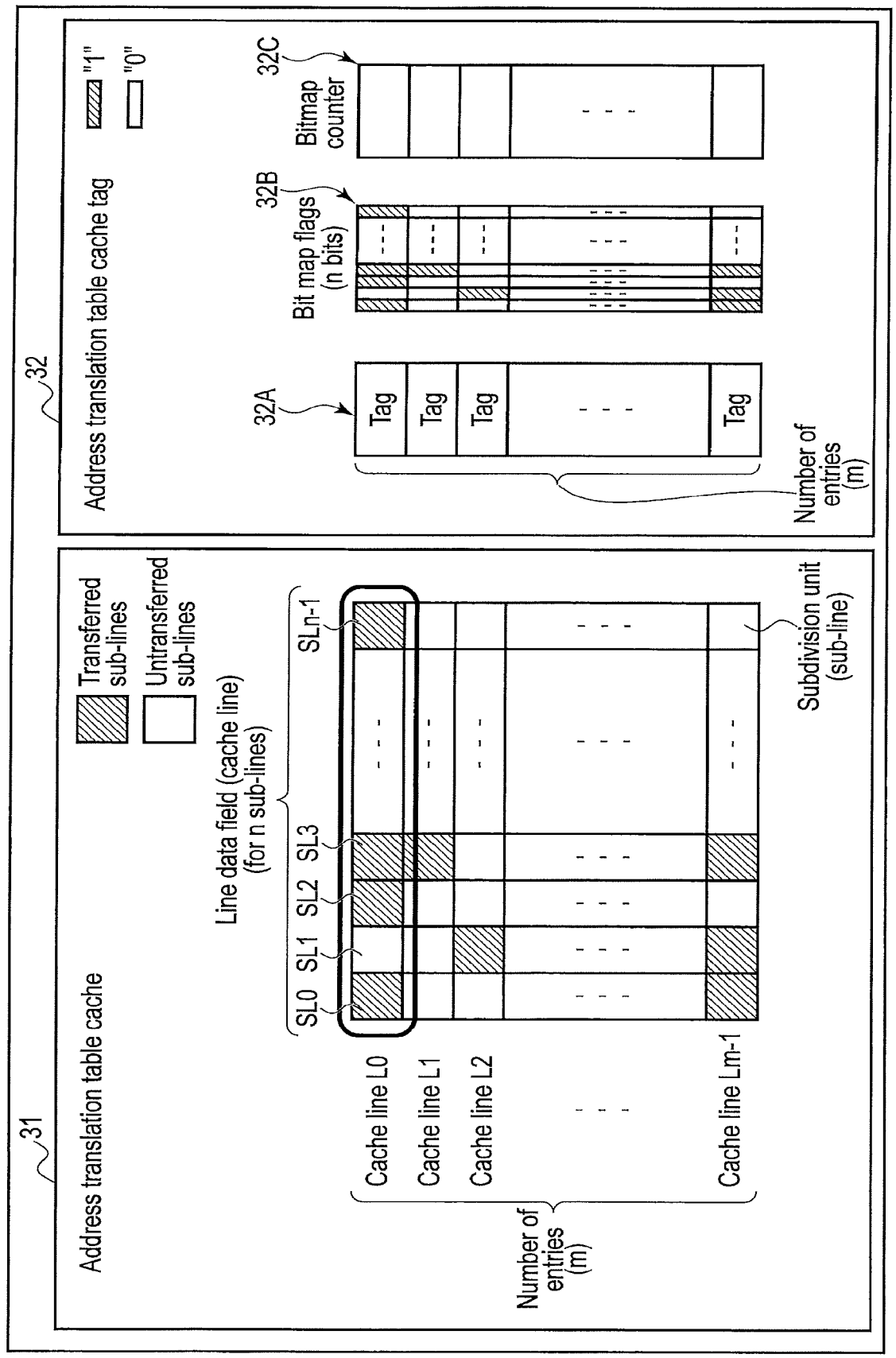
F I G. 18

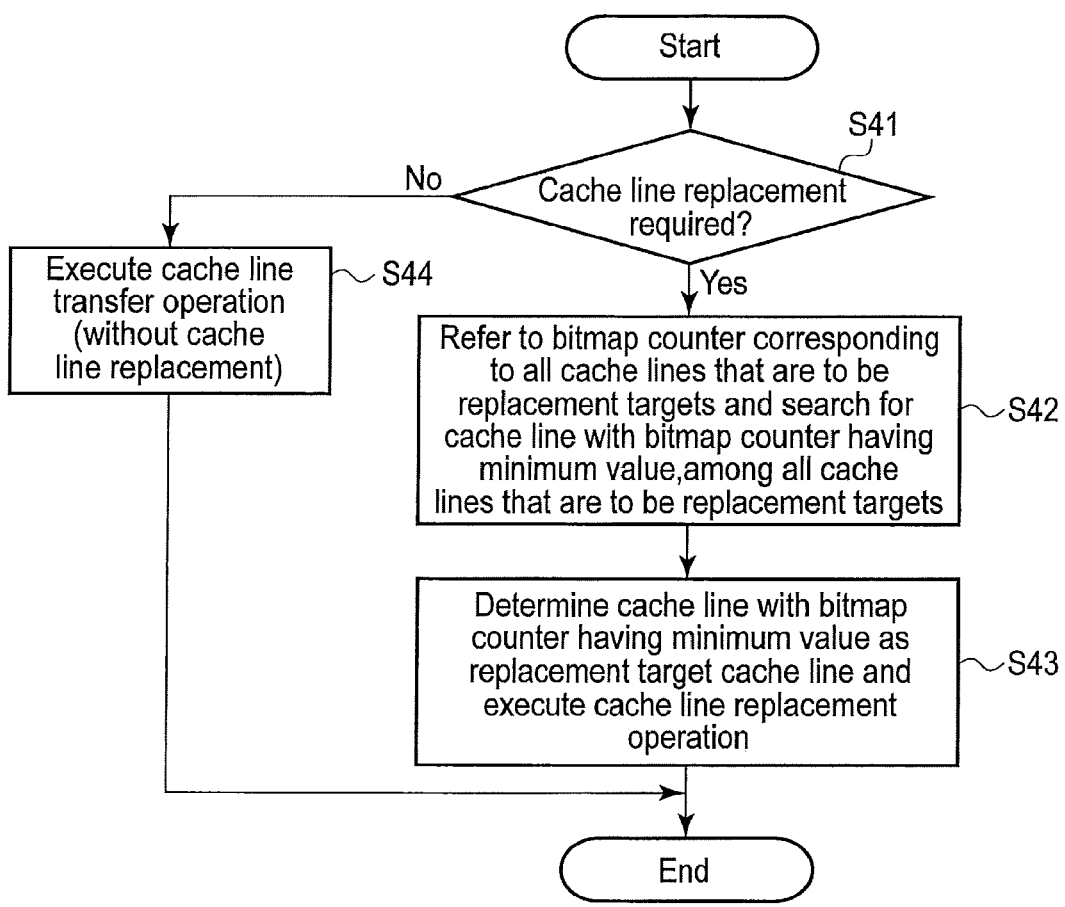
F I G. 20

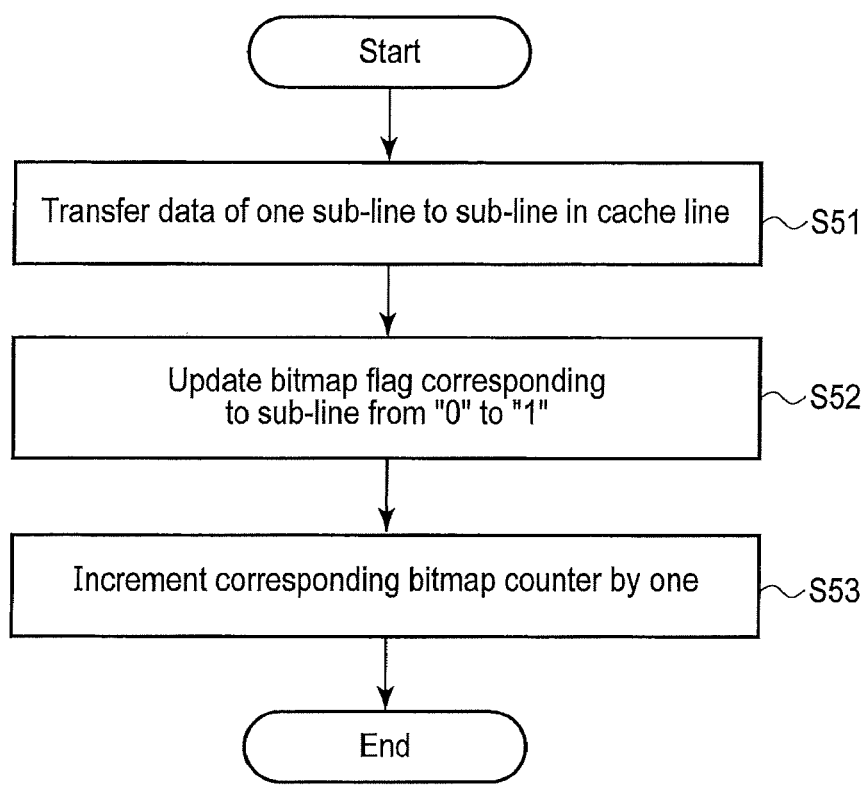
F I G. 21

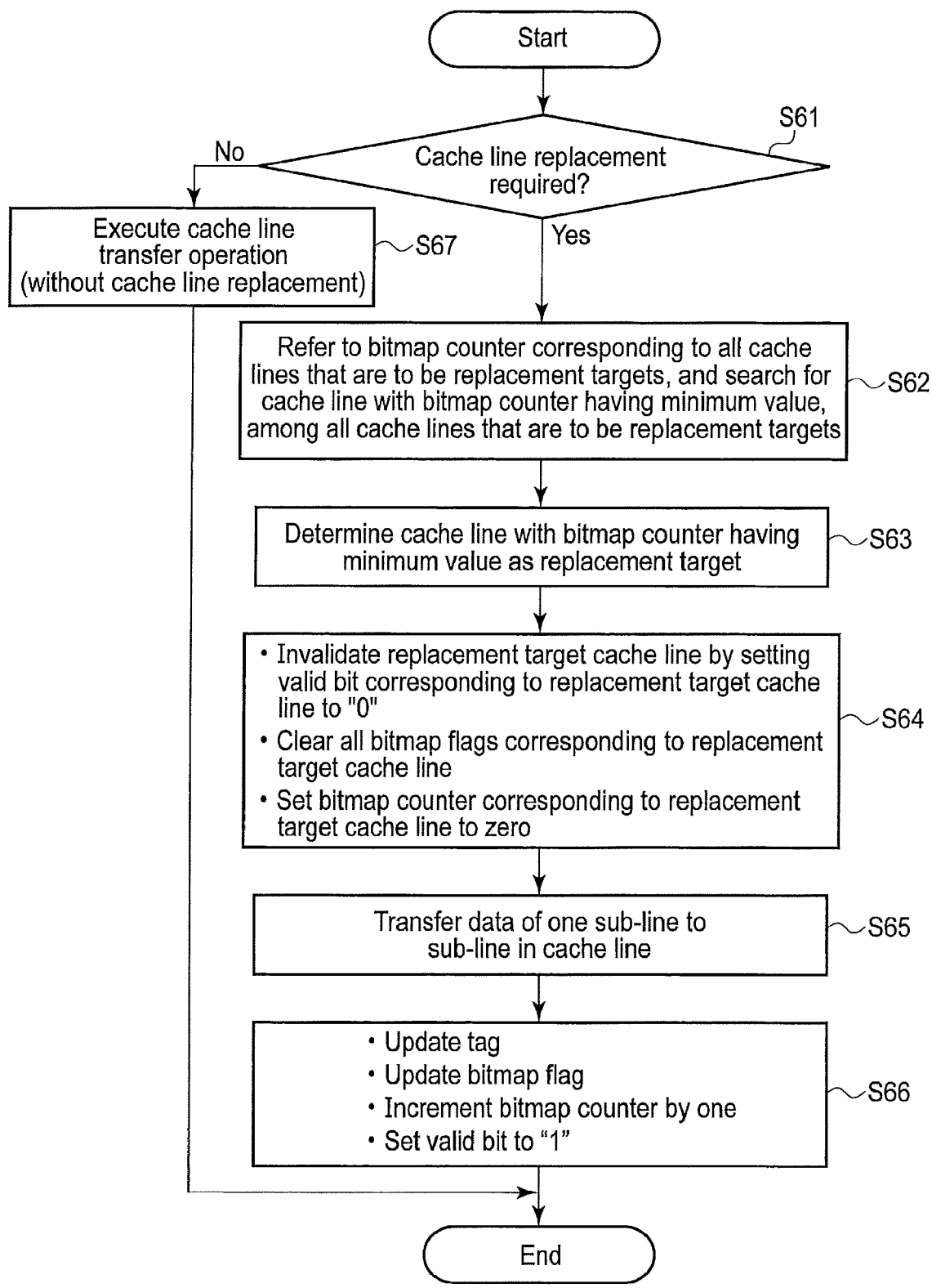
F I G. 22

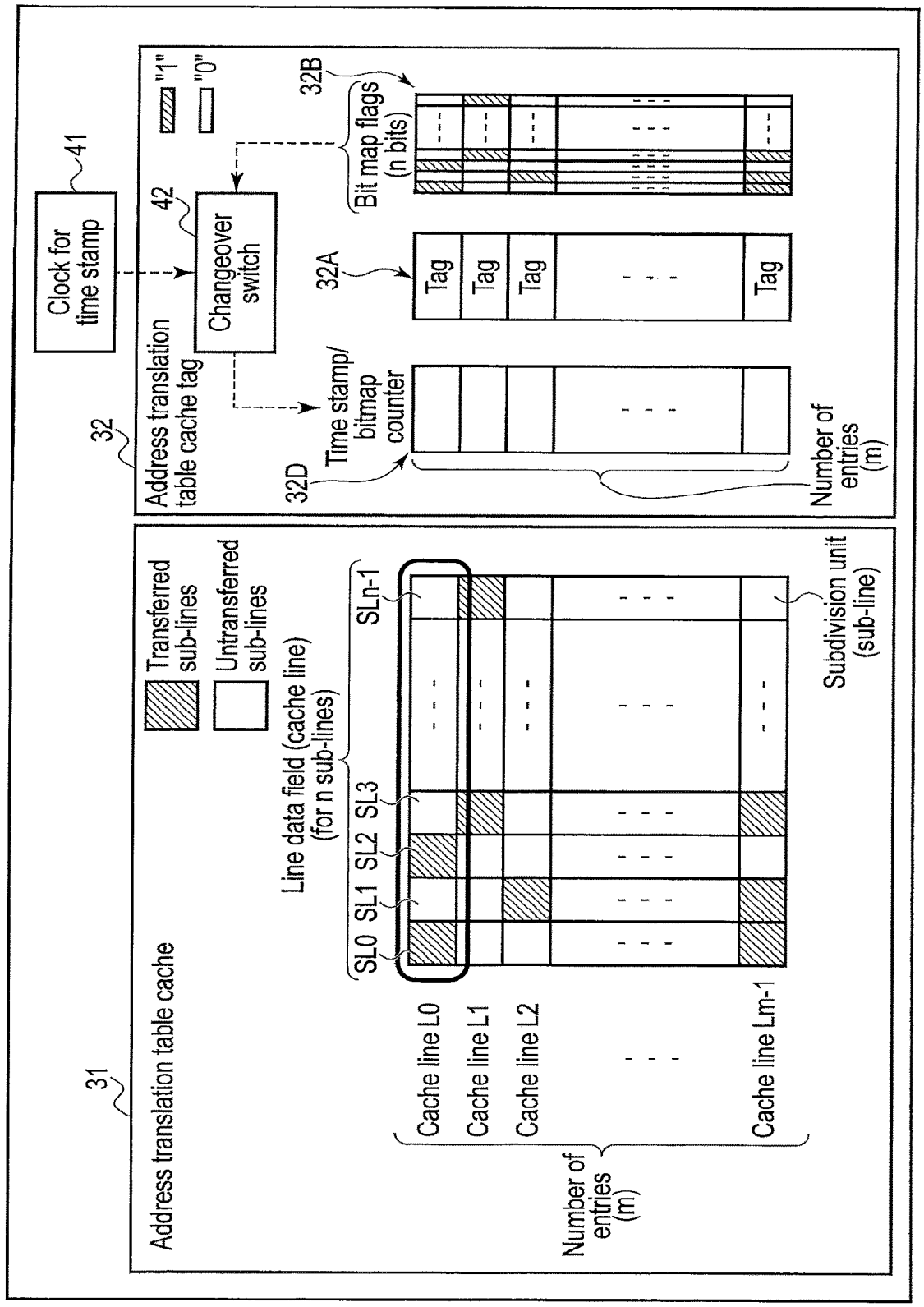
F I G. 23

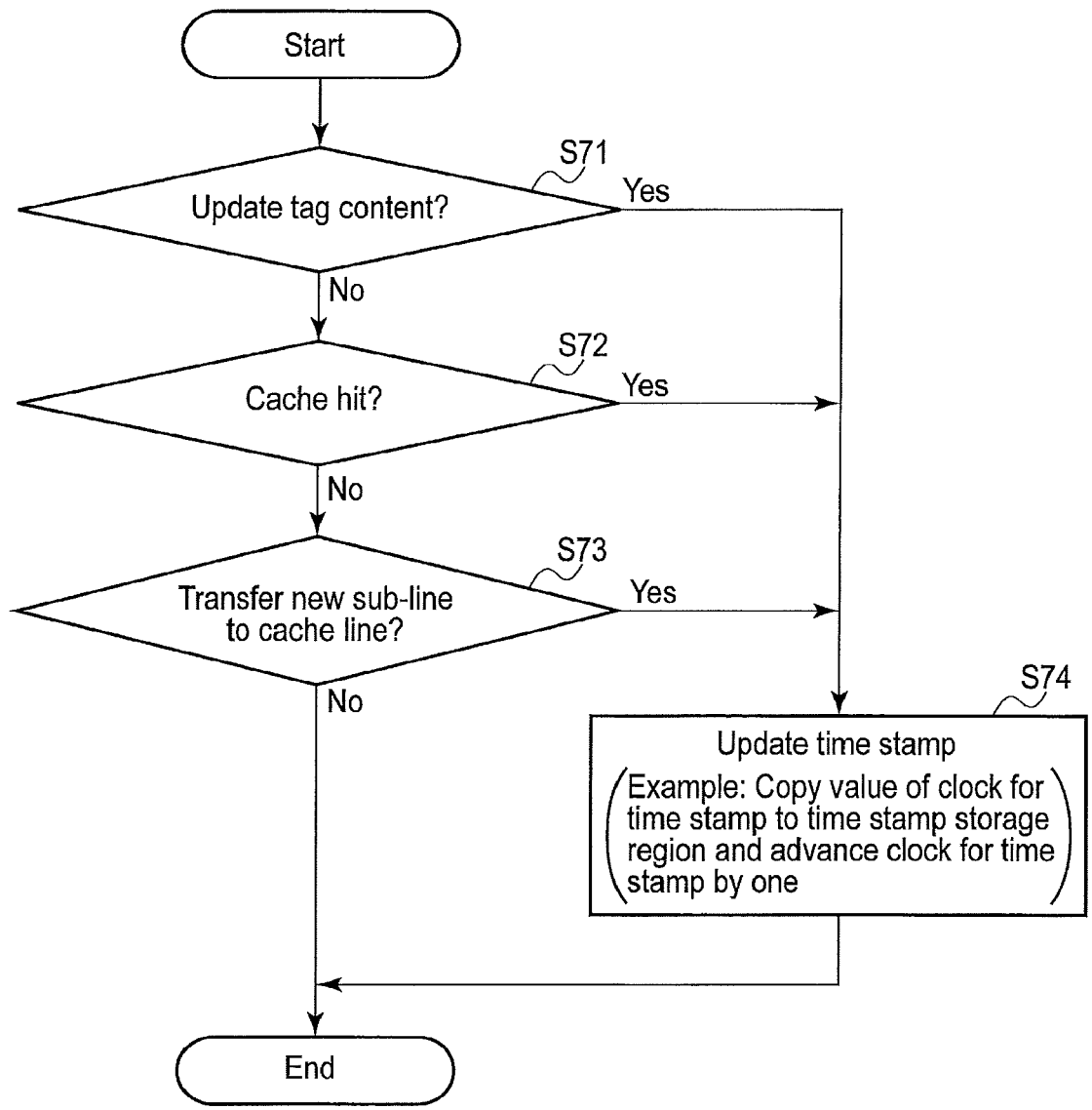
F I G. 24

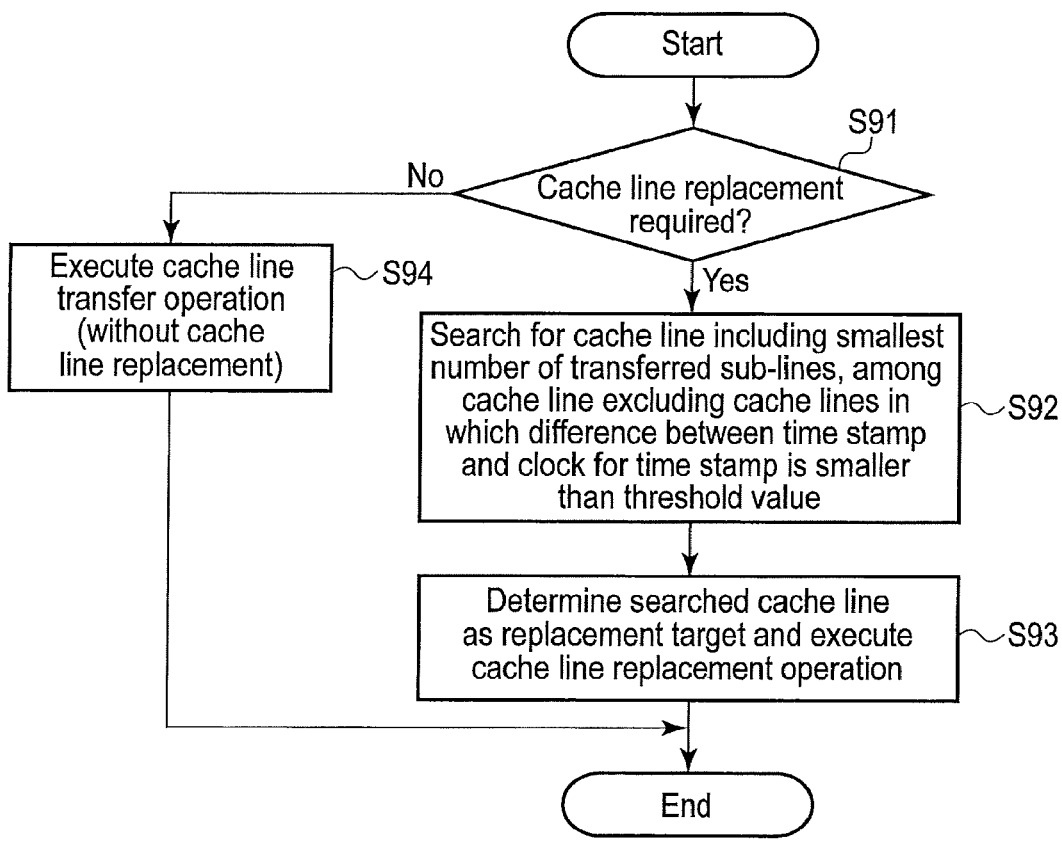
F I G. 27

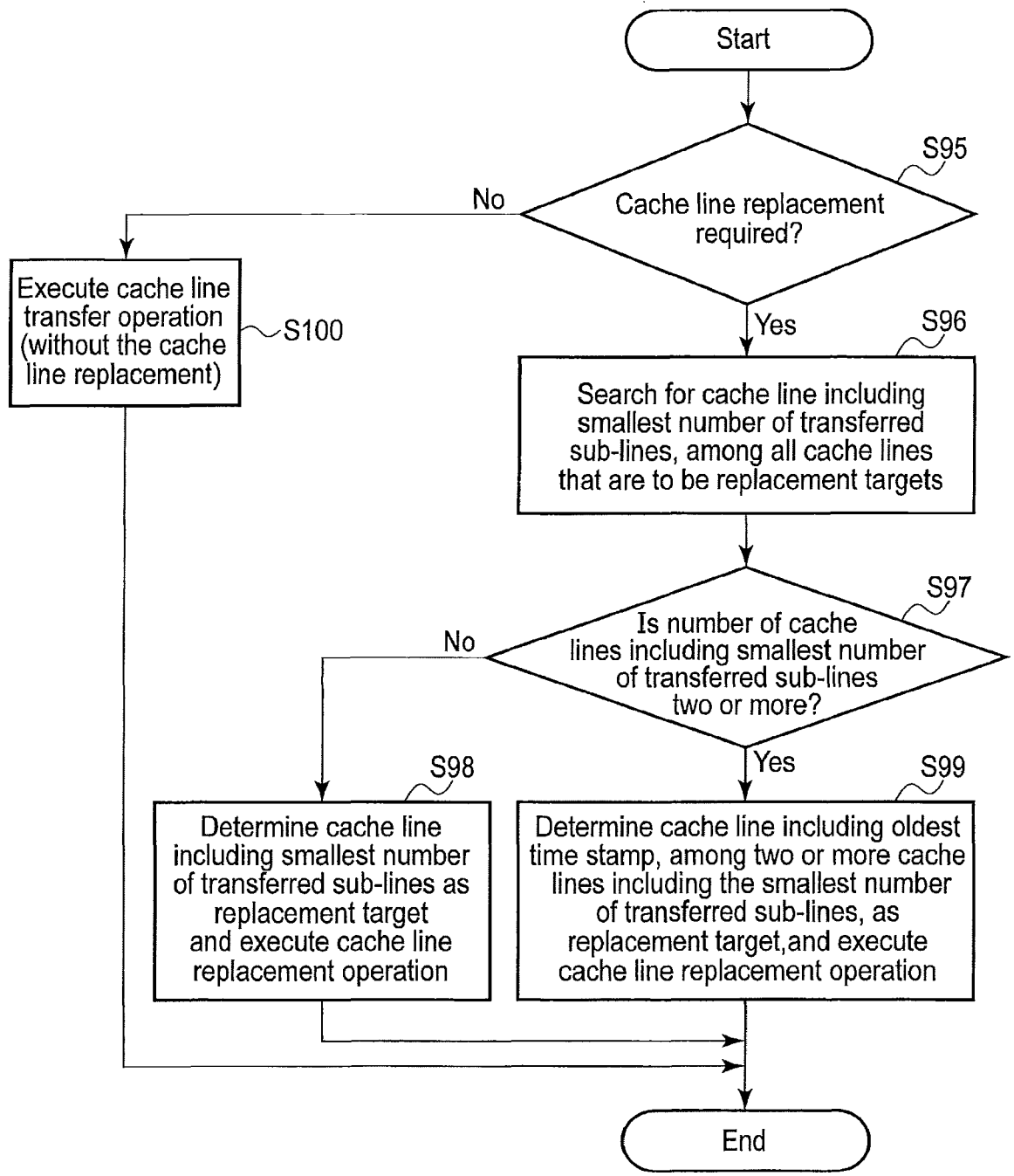
F I G. 28

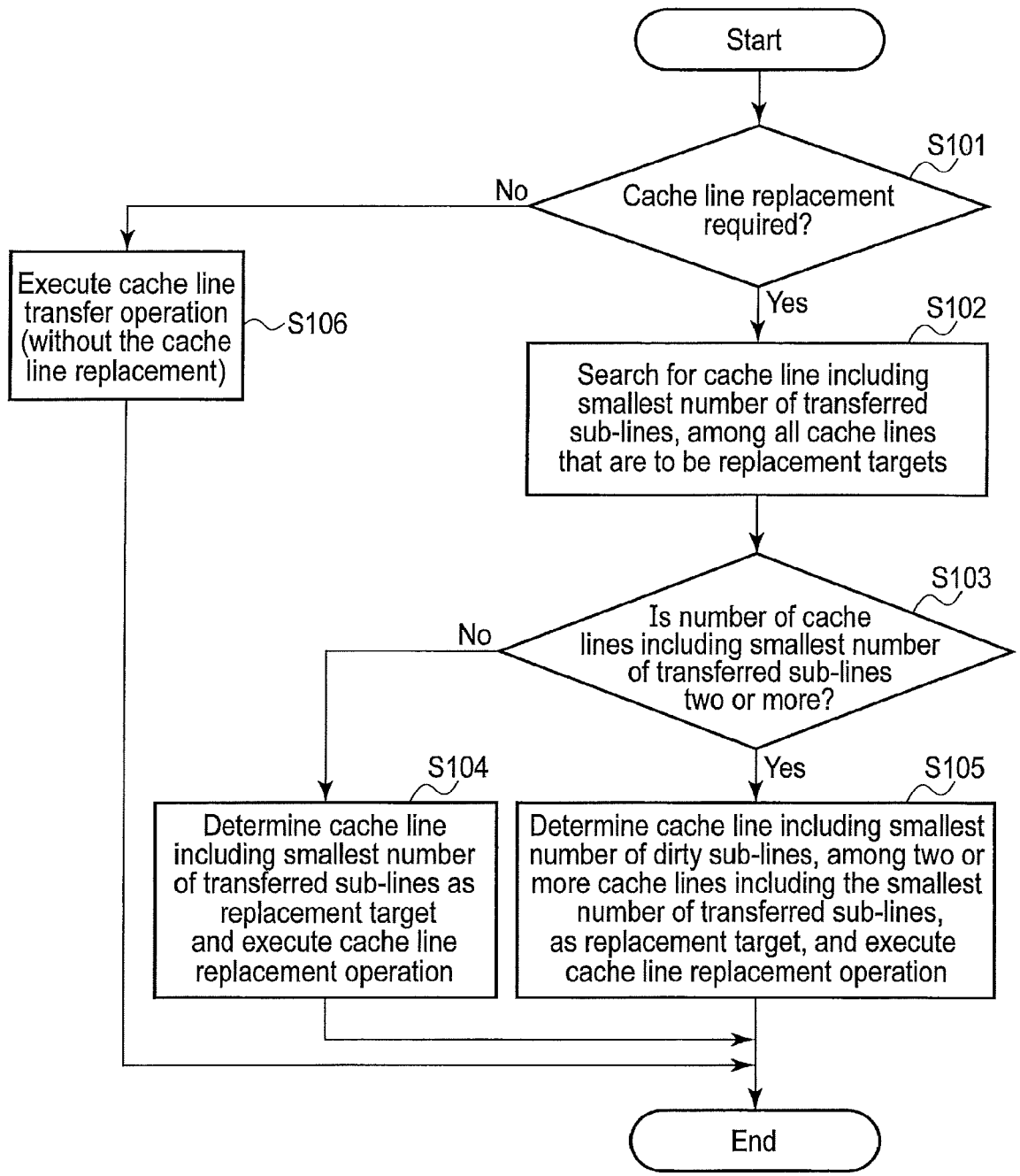
F I G. 30

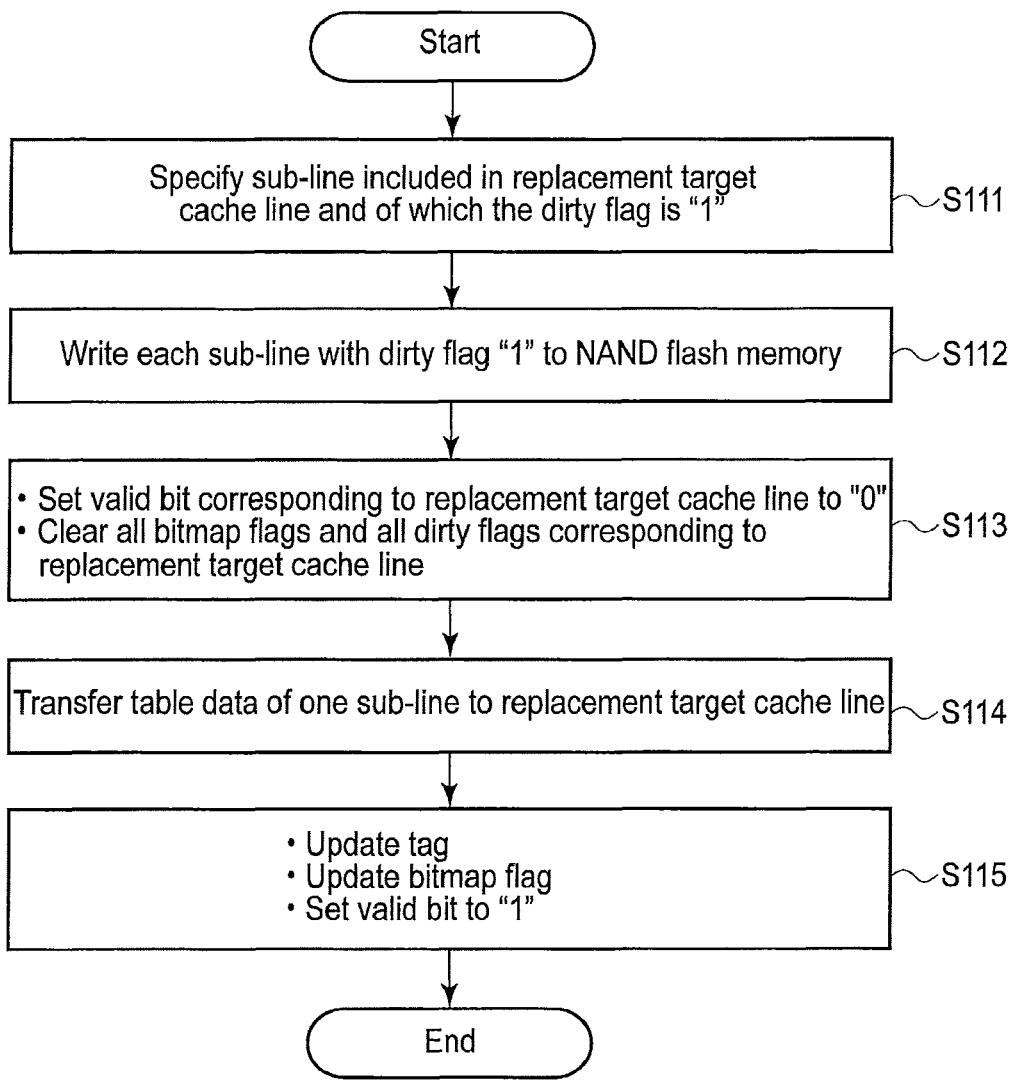
F I G. 31

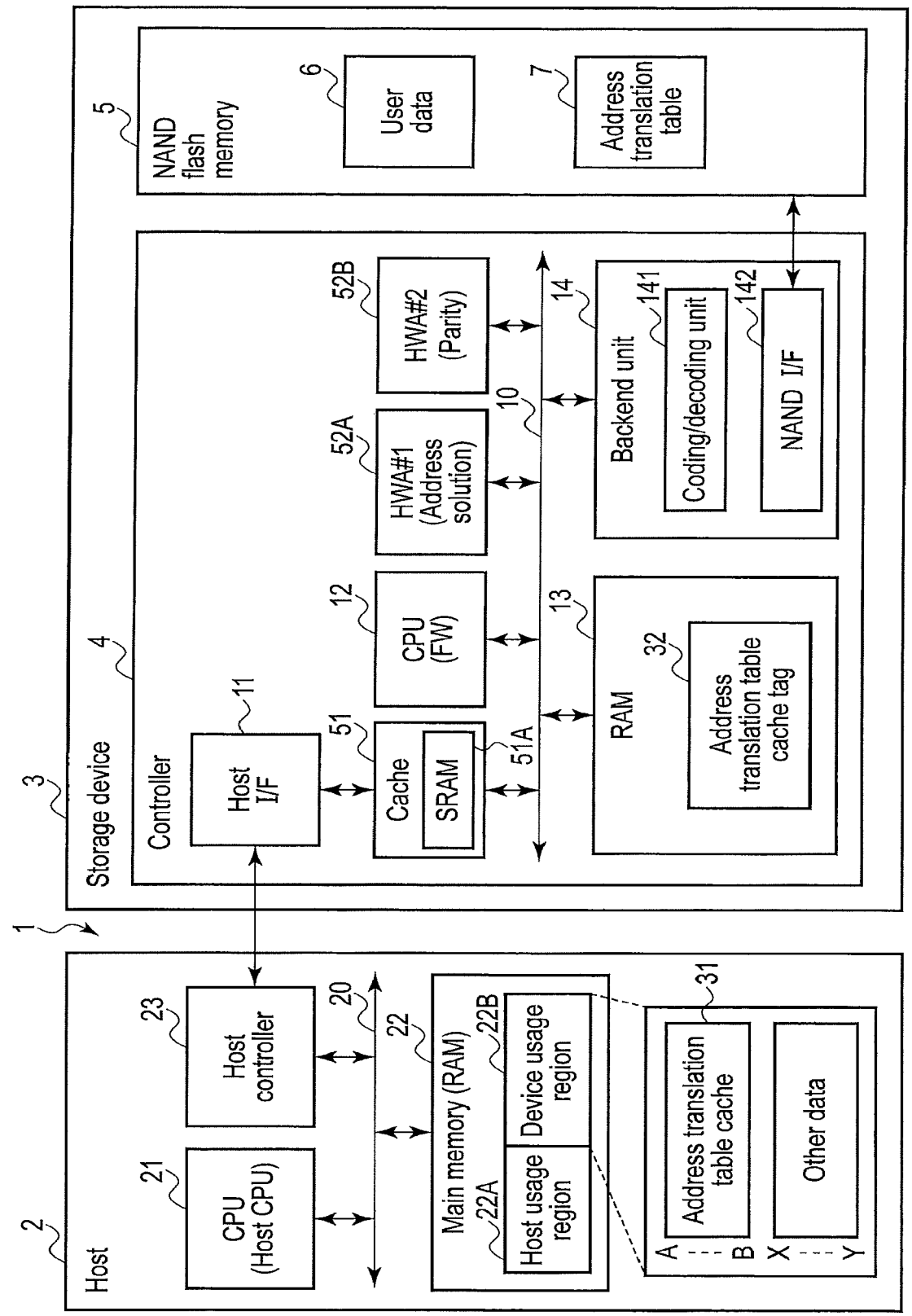
F I G. 34

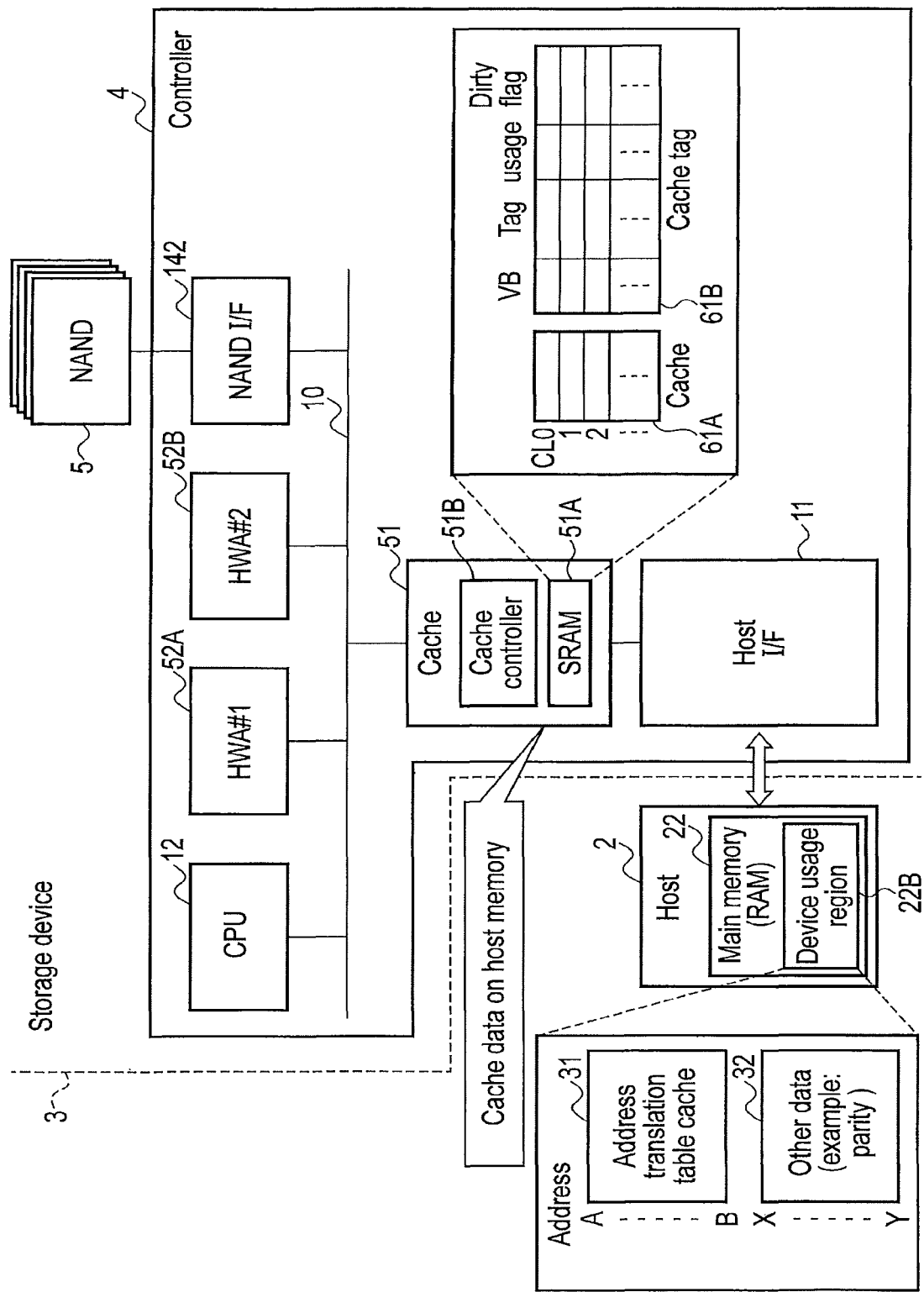
F I G. 35

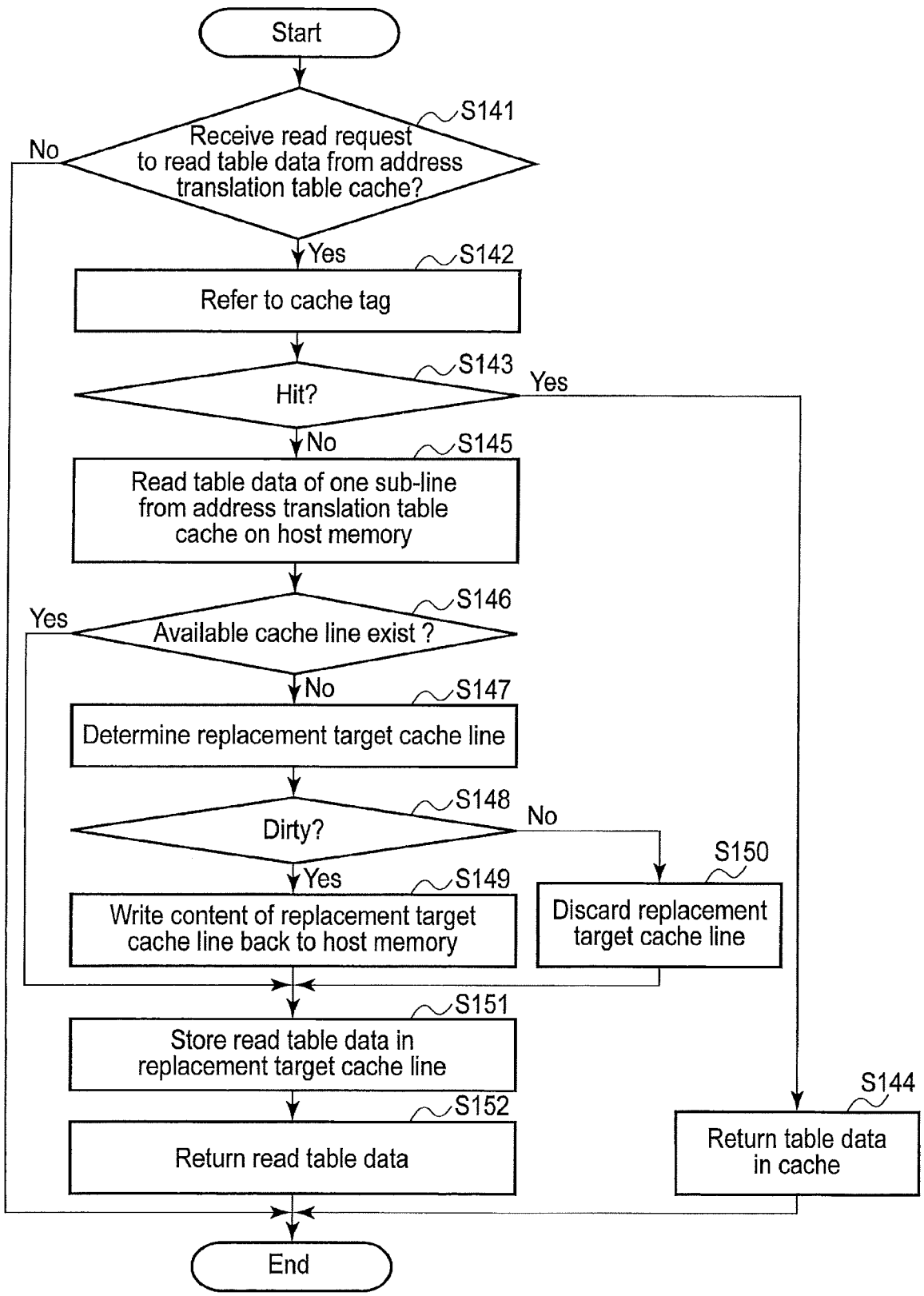
F I G. 37

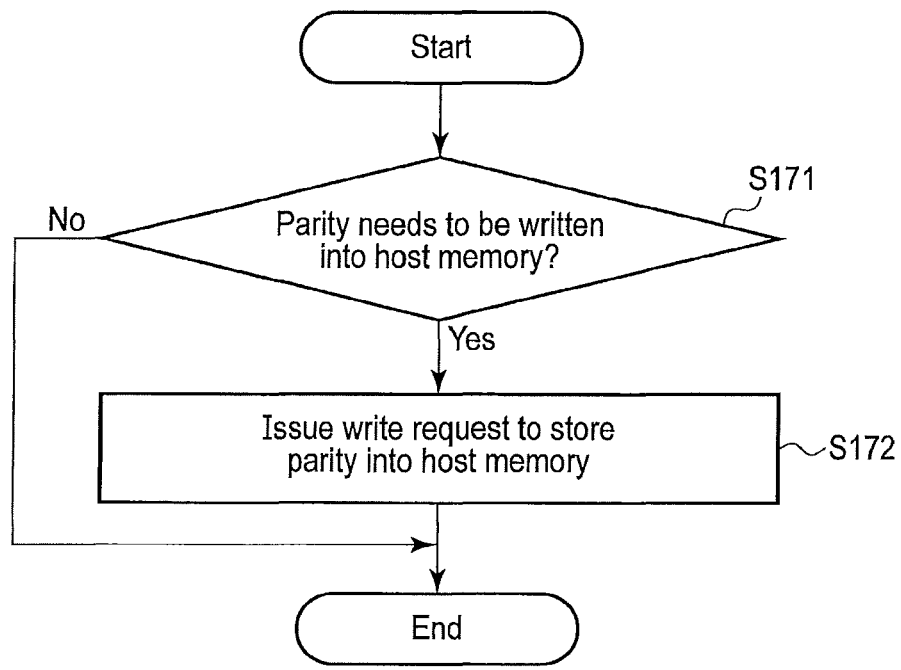
F I G. 39
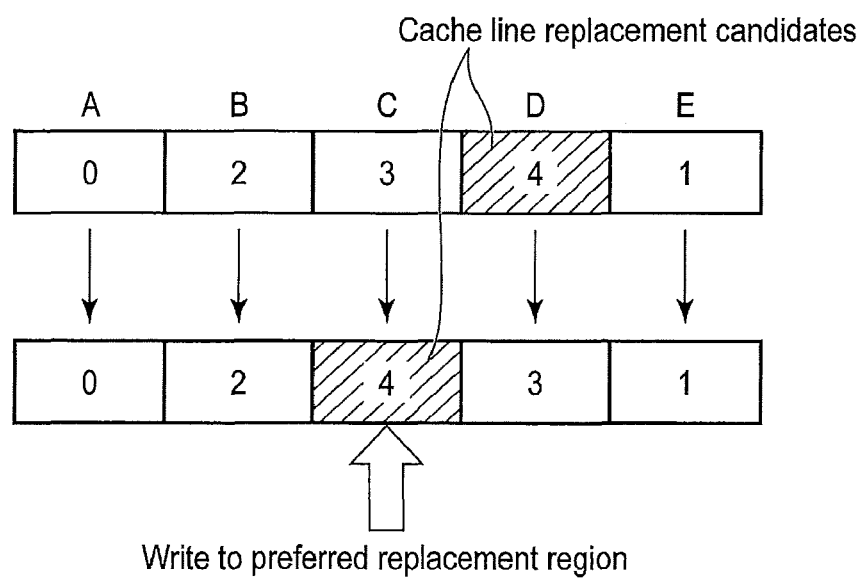
F I G. 40

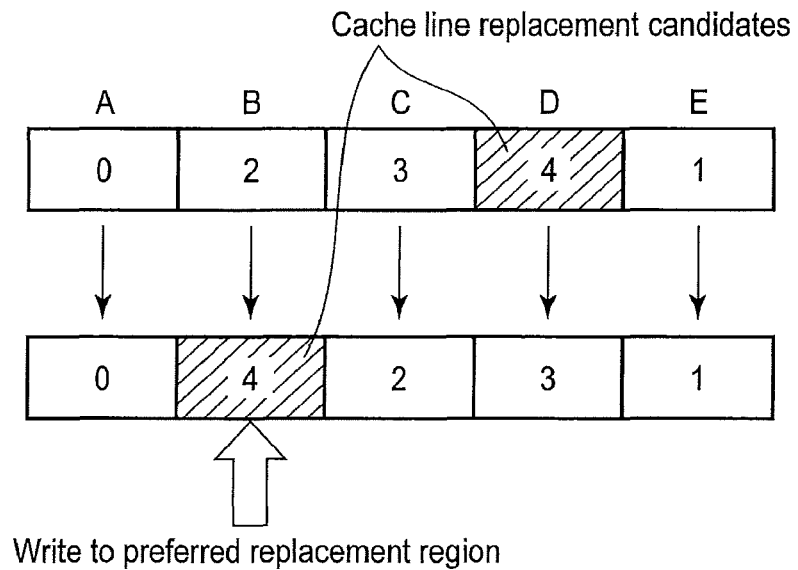
F I G. 41
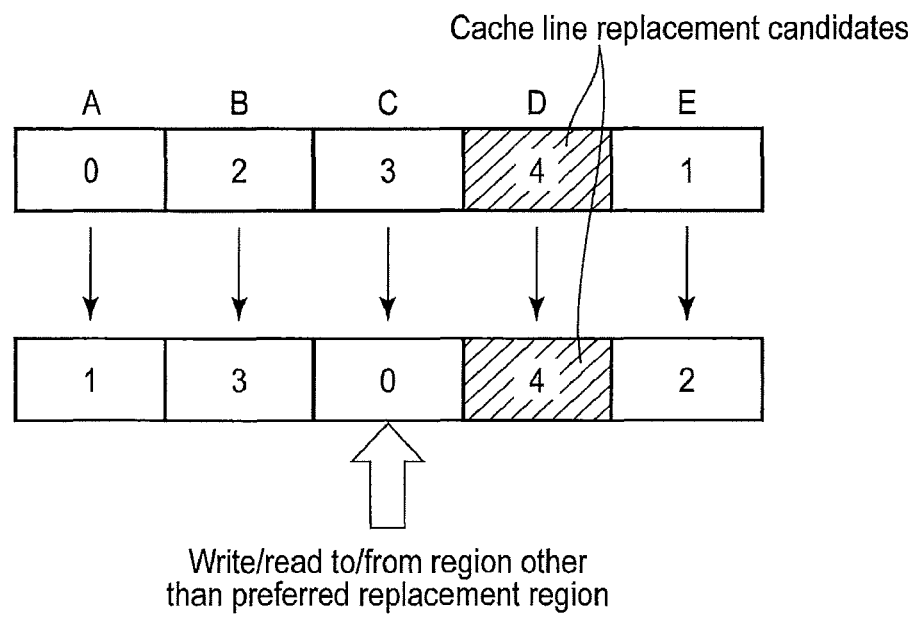
F I G. 42

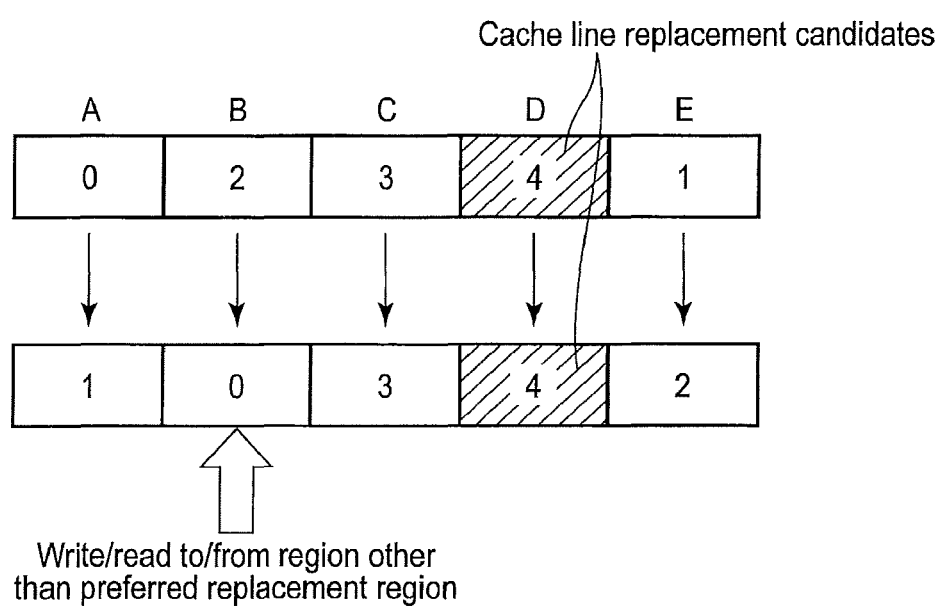
F I G. 43

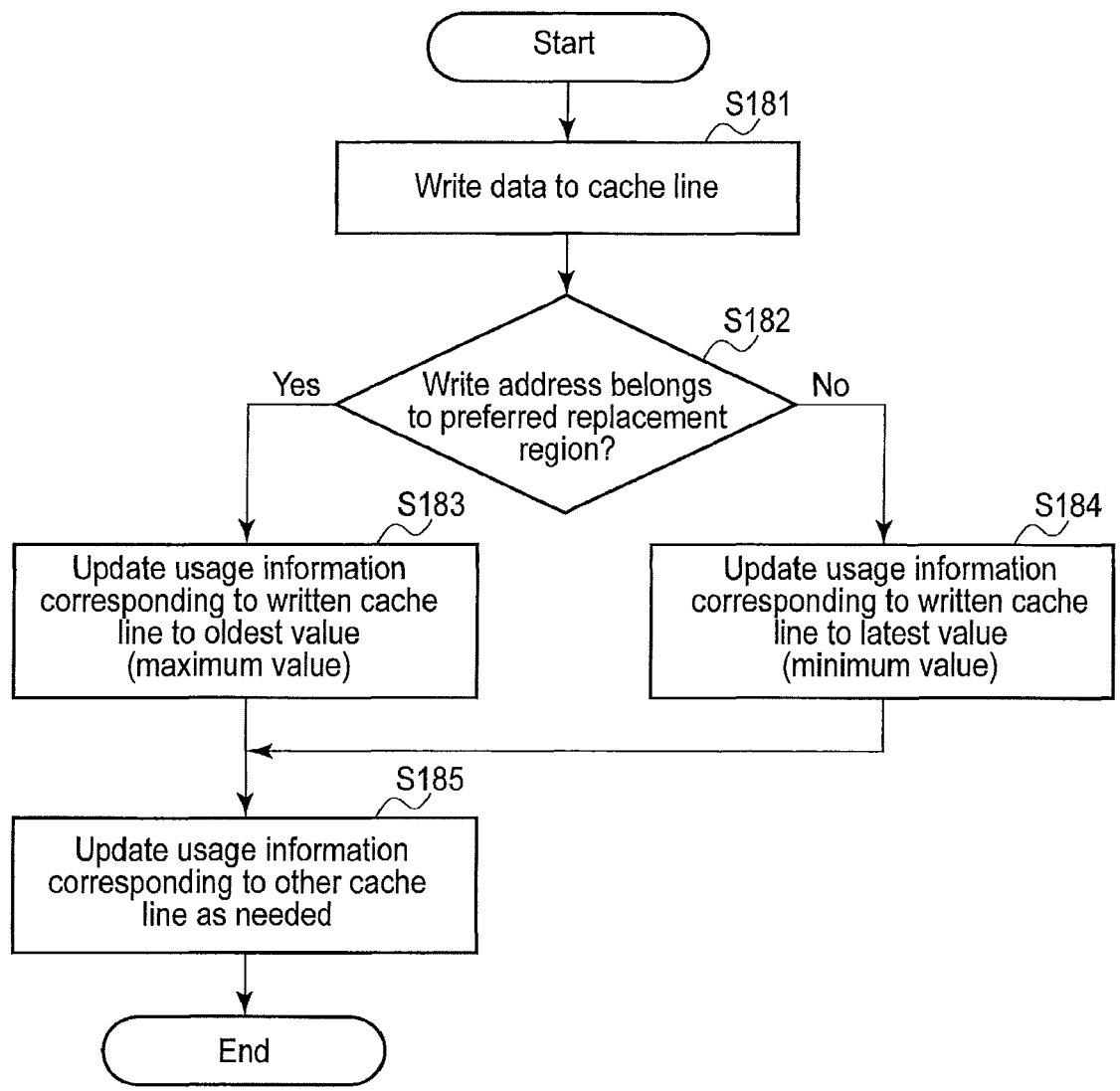
F I G. 44

MEMORY SYSTEM CONTROLLING A CACHE OF A NONVOLATILE MEMORY

CROSS-REFERENCE TO RELATED APPLICATIONS

This application is based upon and claims the benefit of priority from Japanese Patent Application No. 2018-012649, filed Jan. 29, 2018, the entire contents of which are incorporated herein by reference.

FIELD

Embodiments described herein relate generally to a technology of controlling a nonvolatile memory.

BACKGROUND

Memory systems implemented with nonvolatile memories have recently been prevalent widely.

As such memory systems, a universal flash storage (UFS) device implemented with a NAND flash memory, a solid state drive (SSD) implemented with a NAND flash memory, and the like are well known. The SSD is used as a main storage of various computing devices.

In the memory systems, address translation for translating a logical address into a physical address of the nonvolatile memory is executed. If the time required for the address translation becomes long, performance of the memory systems might degrade.

Implement of memory systems capable of improving the performance is accordingly desired.

BRIEF DESCRIPTION OF THE DRAWINGS

FIG. 3 is a diagram illustrating an example of a relationship between an address translation table cache and an address translation table cache tag, which are managed in the memory system of the first embodiment.

FIG. 6 is a diagram illustrating a configuration example of the address translation table cache illustrated in FIG. 3.

FIG. 11 is a diagram illustrating a cache line invalidation operation, a sub-line transfer operation, and a cache line validation operation, which are executed in the cache control processing illustrated in FIG. 10.

FIG. 12 is a block diagram illustrating a configuration of placing the address translation table cache and the address translation table cache tag in RAM built in a controller in the memory system of the first embodiment.

FIG. 13 is a block diagram illustrating a configuration of placing the address translation table cache and the address translation table cache tag in DRAM provided outside of the controller in the memory system of the first embodiment.

FIG. 14 is a flowchart illustrating a procedure of an operation of determining a replacement target cache line executed in the memory system of the first embodiment.

FIG. 15 is a flowchart illustrating a procedure of the operation of determining a replacement target cache line executed in the memory system of the first embodiment by using plural bitmap flags corresponding to each cache line.

FIG. 18 is a diagram illustrating an example of a relationship between the address translation table cache and the address translation table cache tag that includes bitmap counters, which are managed in the memory system of the first embodiment.

FIG. 20 is a flowchart illustrating a procedure of an operation of determining a replacement target cache line executed in the memory system of the first embodiment by using the bitmap counter corresponding to each cache line.

FIG. 21 is a flowchart illustrating a procedure of a sub-line transfer operation executed in the memory system of the first embodiment in a case where the address translation table cache tag includes the bitmap counter corresponding to each cache line.

FIG. 22 is a flowchart illustrating a procedure of the cache line replacement operation executed in the memory system of the first embodiment in a case where the address translation table cache tag includes the bitmap counter corresponding to each cache line.

FIG. 23 is a diagram illustrating an example of a relationship between the address translation table cache and the address translation table cache tag that includes a shared storage region for a time stamp and a bitmap counter, which are managed in the memory system of the first embodiment.

FIG. 24 is a flowchart illustrating a procedure of a time stamp update operation executed in the memory system of the first embodiment.

FIG. 27 is a flowchart illustrating a procedure of an operation of determining a replacement target cache line executed in the memory system of the second embodiment, by using plural bitmap flags corresponding to each cache line, and a time stamp corresponding to each cache line.

FIG. 28 is a flowchart illustrating another procedure of the operation of determining a replacement target cache line executed in the memory system of the second embodiment, by using plural bitmap flags corresponding to each cache line, and a time stamp corresponding to each cache line.

FIG. 30 is a flowchart illustrating a procedure of an operation of determining a replacement target cache line executed in the memory system of the third embodiment, by using plural bitmap flags corresponding to each cache line, and plural dirty flags corresponding to each cache line.

FIG. 31 is a flowchart illustrating a procedure of a cache line replacement operation executed in the memory system of the third embodiment.

FIG. 34 is a block diagram illustrating a configuration example of an information processing system that includes a memory system of a fifth embodiment.

FIG. 35 is a block diagram illustrating a configuration of cache configured to cache data to be written to a host memory, the cache being managed in the memory system of the fifth embodiment.

FIG. 37 is a flowchart illustrating a procedure of an operation executed by the cache illustrated in FIG. 33 when receiving a read request to read table data from the address translation table cache.

FIG. 39 is a flowchart illustrating a procedure of an operation of writing a parity for erasure correction for data written to a nonvolatile memory, which is executed by the CPU or the hardware accelerator (HWA) in the memory system of the fifth embodiment.

FIG. 40 is a diagram for explanation of an operation of allocating usage information to a cache line where write data to be written to a preferred replacement region in the host memory is stored, the usage information enabling the cache line to be likely replaced.

FIG. 41 is a diagram for explanation of an operation of allocating usage information to the cache line where write data to be written to the preferred replacement region in the host memory is stored, the usage information enabling the cache line to be likely replaced.

FIG. 42 is a diagram for explanation of an operation of allocating usage information to a cache line where write data to be written to a region other than the preferred replacement region in the host memory is stored, the usage information enabling the cache line to be unlikely replaced.

FIG. 43 is a diagram for explanation of an operation of allocating usage information to the cache line where write data to be written to the preferred replacement region in the host memory is stored, the usage information enabling the cache line to be likely replaced.

FIG. 44 is a flowchart illustrating a procedure of a usage information update operation executed by the cache illustrated in FIG. 35.

DETAILED DESCRIPTION

Figure 1:
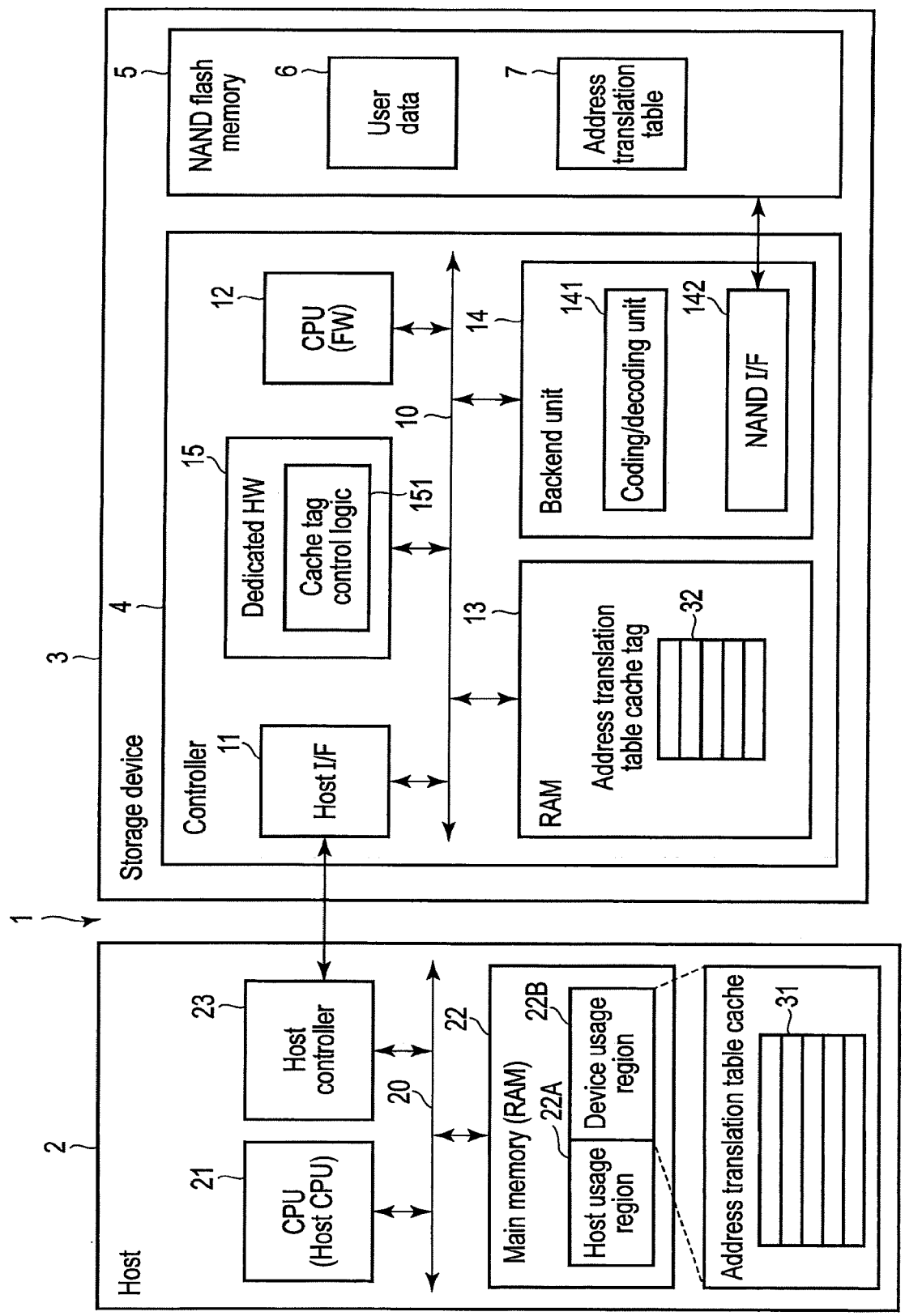
FIG. 1 is a block diagram illustrating a configuration example of an information processing system that includes a memory system according to a first embodiment.

Various embodiments will be described hereinafter with reference to the accompanying drawings.

In general, according to one embodiment, a memory system connectable to a host, comprises a nonvolatile memory and a controller. The controller is electrically connected to the nonvolatile memory and is configured to manage, by using a first cache tag, a first cache which stores a part of a logical-to-physical address translation table stored in the nonvolatile memory. The first cache includes a plurality of cache lines each including a plurality of sub-lines. The first cache tag includes a plurality of entries respectively corresponding to the cache lines. Each of the entries of the first cache tag includes a tag indicating which region of the logical-to-physical address translation table is stored in a corresponding cache line, and a plurality of bitmap flags respectively corresponding to the sub-lines in the corresponding cache line. Each of the bitmap flags indicates whether data of the logical-to-physical address translation table is already transferred to a corresponding sub-line.

The controller is configured to determine, when replacing one of the cache lines of the first cache, a cache line that includes the smallest number of sub-lines to which data of the logical-to-physical address translation table is already transferred, among candidates for the replacement, as a cache line to be replaced.

First Embodiment

First, a configuration of an information processing system 1 that includes a memory system according to a first embodiment will be explained with reference to FIG. 1.

This memory system is a storage device configured to write data to a nonvolatile memory, and read data from the nonvolatile memory. The memory system is implemented as, for example, a storage device 3 based on a NAND flash technology. The storage device 3 may be realized as an embedded storage device such as a universal flash storage (UFS) or may also be realized as a solid-state drive (SSD).

The information processing system 1 includes a host (host device) 2 and the storage device 3. The host 2 may be a personal computer, a server, a cellular telephone, an imaging device, a mobile terminal such as a tablet or a smartphone, a game console, or a vehicle-mounted terminal such as a car navigation system.

The storage device 3 may be used as an external storage device of the information processing device which functions as the host 2. If the storage device 3 is implemented as the embedded storage device, the storage device 3 is built in the information processing device. If the storage device 3 is implemented as the SSD, the storage device 3 may be built in the information processing device or may be connected to the information processing device via a cable or a network.

As the interface between the host 2 and the SSD 3, SCSI, Serial Attached SCSI (SAS), ATA, Serial ATA (SATA), PCI Express (PCIe), Ethernet (registered trademark), Fibre channel, NVM Express (NVMe) (registered trademark), universal serial bus (USB), Mobile Industry Processor Interface (MIPI), UniPro, and the like, may be used.

The storage device 3 includes a controller 4 and a non-volatile memory (hereinafter referred to as NAND flash memory) 5. The NAND flash memory 5 is not limited but may include plural NAND flash memory chips. The controller 4 is electrically connected to the NAND flash memory 5 and operates as a memory controller configured to control the NAND flash memory 5. The controller 4 may be implemented by a circuit such as a system-on-a-chip (SoC).

The NAND flash memory 5 stores user data 6, and management information such as a logical-to-physical address translation table (L2P table) 7. The logical-to-physical address translation table 7 is hereinafter simply referred to as an address translation table 7. The address translation table 7 manages mapping between logical addresses and physical addresses of the NAND flash memory 5. The logical addresses are addresses used by the host 2 for addressing locations in a logical space of the storage device 3. As the logical address, a logical block address (LBA) may be used. The physical address is indicative of a physical storage location in the NAND flash memory 5 where data is stored. The address translation table 7 is used to translate a certain logical address into a physical address indicative of the physical storage location in the NAND flash memory 5 where data corresponding to the certain logical address is stored.

Figure 2:
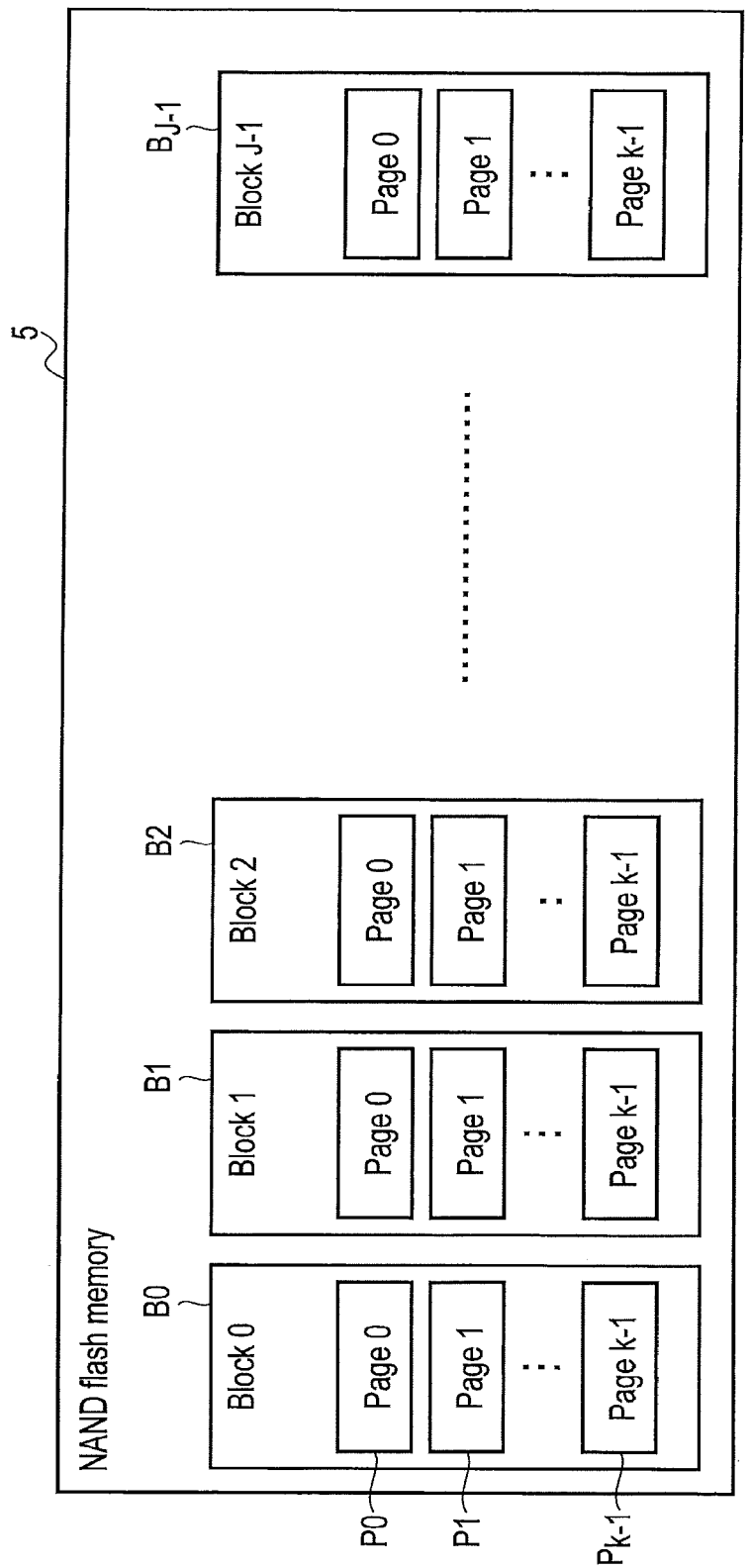
FIG. 2 is a diagram illustrating a configuration example of a nonvolatile memory in the memory system of the first embodiment.

The NAND flash memory 5 includes one or more NAND flash memory chips each including a memory cell array. The memory cell array includes plural memory cells arrayed in a matrix. The memory cell array of the NAND flash memory 5 includes plural blocks (physical blocks) B0 to BJ−1 as illustrated in FIG. 2. Each of the blocks B0 to Bj−1 functions as an erase operation units. That is, each of the blocks B0 to Bj−1 is a unit for erasing of data.

The blocks B0 to Bj−1 include plural pages (physical pages). That is, each of the blocks B0 to Bj−1 includes pages P0, P1, . . . , and Pk−1. Each of the pages includes plural memory cells connected to the same word line. In the NAND memory 5, reading and writing of data are executed in a unit of page. That is, each of the pages P0, P1, . . . , and Pk−1 is a unit for reading and writing of data.

In FIG. 1, the controller 4 may function as a flash translation layer (FTL) configured to execute data management of the NAND flash memory 5 and block management of the NAND flash memory 5.

The data management includes, for example, (1) management of mapping information indicative of the correspondence between logical addresses and physical addresses, (2) processing for concealing read/write operations in page units, and erase operation in block units, and the like. The management of mapping between the logical addresses and the physical addresses is executed by using the address translation table 7. The controller 4 manages mapping between the logical addresses and the physical addresses in units of predetermined management sizes, by using the address translation table 7. A physical address corresponding to a certain logical address is indicative of the latest physical storage location in the NAND flash memory 5 to which the data of the certain logical address is written.

Writing of data to a page is enabled only once per erase cycle. For this reason, the controller 4 writes update data corresponding to a certain logical address, not to the physical storage location where previous data corresponding to this logical address is stored, but to another physical storage location. Then, the controller 4 updates the address translation table 7, associates the logical address with said another physical storage location, and invalidates the previous data.

The block management includes management of defective blocks (bad blocks), wear leveling, garbage collection, and the like. Wear leveling is an operation of leveling the wear of blocks.

Garbage collection is an operation of increasing the number of free blocks to which data can be written. In garbage collection, the controller 4 copies valid data in several blocks where the valid data and invalid data exist together to another block (for example, a free block). The valid data means data associated with a certain logical address. For example, data referred to by the address translation table 7 (i.e., data linked to a logical address as the latest data) is valid data and might be read later by the host 2. The invalid data means data which is not associated with any logical addresses. The data which is not associated with any logical addresses is data which will not be read any more by the host 2. Then, the controller 4 updates the address translation table 7 and maps the logical addresses of copied valid data to copy destination physical addresses, respectively. A block which contains only invalid data after valid data have been copied to another block is treated as a free block. The block can be therefore reused after an erase operation on this block is performed.

The host 2 sends various commands to the storage device 3. The commands include a read command, a write command, an unmap command, and the like. The read command is a command to request the storage device 3 to read data. The read command includes a logical address (e.g., a start LBA) corresponding to data to be read, and the length of the data to be read.

When the controller 4 receives the read command from the host 2, the controller 4 acquires the physical address corresponding to the start LBA in the read command, by referring to the address translation table 7. The controller 4 reads the data from the physical storage location of the NAND flash memory 5, which corresponds to the acquired physical address, and sends the read data to the host 2.

The write command is a command to request the storage device 3 to write data. The write command includes a logical address (e.g., a start LBA) of write data (i.e., data to be written), and the length of the write data. The controller 4 writes the write data to an available physical storage location in the NAND flash memory 5. Furthermore, the controller 4 maps the physical address corresponding to the physical storage location to which the write data is written, to the logical address corresponding to the write data, by updating the address translation table 7.

When writing data corresponding to a certain LBA (x) to a physical address (y) in the NAND flash memory 5, the controller 4 may execute read-modify-write to update the address translation table 7.

In the read-modify-write, the controller 4 may first read table data that includes the current physical address corresponding to the LBA (x) from the address translation table 7 in the NAND flash memory 5. This table data is a data set having a predetermined size and may include plural physical addresses corresponding to consecutive logical addresses.

The controller 4 updates a part of the read table data. In table data update, the controller 4 updates a part of the table data, i.e., the current physical address corresponding to the LBA (x), to the physical address (y). For example, in a case where the physical address has a 32-bit (4-byte) size and the table data has a 512-byte size, the controller 4 updates only 4 bytes in the table data having the 512-byte size. Then, the controller 4 writes the updated table data to the NAND flash memory 5 to update the address translation table 7.

The controller 4 can use a part of a main memory 22 in the host 2 as a memory region for the storage device 3. For example, the controller 4 may use a part of the main memory 22 as a cache for storing a part of data (e.g., user data or management information) used by the controller 4.

The main memory 22 in the host 2 may be a random access memory such as a DRAM. The main memory 22 includes a host usage region 22A and a device usage region 22B. Operating system (OS) and user program which are to be executed by the host 2 are loaded into the host usage region 22A. The device usage region 22B is used as a memory region exclusive for the storage device 3. The address translation table 7 may be as an example of the data stored (cached) in the device usage region 22B. In this case, the controller 4 can store at least a part of the address translation table 7 into the device usage region 22B as address translation table cache 31.

In general, the capacity of the device usage region 22B can be remarkably larger than built-in RAM provided in the storage device 3. Accordingly, address translation table cache 31 with a large capacity of can be implemented by using the device usage region 22B of the host 2. The device usage region 22B is not limited to this but, for example, may be implemented by unified memory (UM) of the universal flash storage (UFS) or host memory buffer (HMB) of NVMe.

In general, the address translation table cache 31 is empty in an initial state immediately after the power of the storage device 3 is turned on. The address translation data (hereinafter referred to as table data) used for the logical-to-physical address translation is only cached to the address translation table cache 31. At the time of the initial state, the controller 4 may transfer specific address translation data assumed to be used for logical-to-physical address translation (for example, address translation data corresponding to a specific logical address range) from the address translation table 7 to the address translation table cache 31. The specific address translation data can be thereby preliminarily cached to the address translation table cache 31.

If a physical address corresponding to a logical address designated by the host 2 exists in the address translation table cache 31, that is, table data that includes at least this physical address is in the address translation table cache 31 (i.e., cache hit), the controller 4 reads this physical address (i.e., through reading the table data that includes this physical address) from the address translation table cache 31 in the host memory (i.e., device usage region 22B of the main memory 22) instead of reading the address translation table 7 in the NAND flash memory 5. Thereby, it is possible to reduce the number of times by which the address translation table 7 in the NAND flash memory 5 is read, when a read command is received from the host 2, or when read-modify-write for updating the address translation table 7 is executed. Thus, the performance of the storage device 3 can be improved.

Next, a configuration of the controller 4 will be explained.

The controller 4 may include a host interface 11, CPU 12, RAM 13, a backend unit 14, dedicated hardware (HW) 15.

The host interface 11, CPU 12, RAM 13, the backend unit 14, and the dedicated hardware (HW) 15, are interconnected via a bus 10.

The host interface 11 functions as a circuit which receives various commands such as a write command and a read command from the host 2. Furthermore, the host interface 11 can transmit a command for write access to the device usage region 22B, a command for read access to the device usage region 22B, and the like to the host 2.

The CPU 12 is a processor configured to control operations of the host interface 11, the backend unit 14, the dedicated hardware (HW) 15 and the like. The CPU 12 executes various types of processing by executing a control program (firmware: FW) stored in ROM (not shown). The CPU 12 executes various commands received from the host 2, in addition to the above-explained FTL processing. The operations of the CPU 12 are controlled by the firmware executed by the CPU 12. Several parts or all parts of the command processing may be executed by the dedicated hardware 15.

The RAM 13 is a built-in RAM provided in the storage device 3. The RAM 13 may be a static RAM (SRAM) built in the controller 4. The RAM 13 is used as a work area for the CPU 12, and is also used to store the control program, various tables, and the like.

One of the typical approaches to improve the performance of the storage device 3 is to provide built-in RAM with a large-capacity and to hold information necessary for the processing in the built-in RAM. However, this approach might increase the costs of the storage device 3 (controller 4) or prevent downsizing of the controller 4.

In the first embodiment, a necessary capacity of the built-in RAM can be decreased since the controller 4 uses the device usage region 22B of the host 2 as a work memory (here, address translation table cache 31) for the controller 4.

In the first embodiment, the RAM 13 is used as an address translation table cache tag 32 for managing the address translation table cache 31.

The address translation table cache tag 32 stores cache management information necessary for determination of cache hit/miss and the like of the address translation table cache 31.

The address translation table cache tag 32 exists not in the device usage region 22B, but in the RAM 13 in the controller 4. The controller 4 can therefore immediately determine cache hit/miss of the address translation table cache 31 without accessing the device usage region 22B.

In general, the size of the address translation table 7 is very large. Typically, the size of the address translation table 7 is approximately one thousandth of the capacity of the storage device 3.

For example, if the capacity of the NAND flash memory 5 in the storage device 3 is 128G bytes, the necessary size of the address translation table 7 is approximately 128M bytes. Furthermore, to increase the hit rate of the address translation table cache 31, the address translation table cache 31 with a large capacity is required.

In a case where the address translation table cache 31 with a large capacity is placed in the device usage region 22B, the capacity necessary for the tag memory for the address translation table cache 31 (e.g., address translation table cache tag 32) should also be large.

In general, if a cache line size is increased, a large capacity of cache can be managed with a small capacity of the tag memory (e.g., address translation table cache tag 32).

However, in the case in which the cache line size is increased, cache line fill (also called cache line refill) to transfer data from the NAND flash memory 5 to a cache line of the address translation table cache 31 takes much time when cache miss occurs.

In the first embodiment, the controller 4 divides each of enlarged cache lines into plural smaller subdivision units (i.e., plural sub-lines), and manages information indicating whether or not data is already transferred, in units of the sub-lines. By this configuration, when a cache miss has occurred, it becomes possible to fill, instead of filling the entirety of one cache line of the address translation table cache 31, only a part (e.g., one sub-line) of this one cache line. Thereby, the cost of the cache line fill (i.e., cache miss penalty), which is caused by a cache miss, can be minimized. Each entry of the address translation table cache tag 32 includes plural bitmap flags corresponding to plural sub-lines included in the corresponding cache line, in order to determine whether or not data is already transferred, in units of the sub-line. Details of the configuration of the address translation table cache tag 32 that includes the bitmap flags will be explained later with reference to FIG. 3 and the following figures.

The backend unit 14 includes a coding/decoding unit 141 and a NAND interface 142. The coding/decoding unit 141 may function as, for example, an error-correcting code (ECC) encoder and an ECC decoder. When data is to be written to the NAND flash memory 5, the coding/decoding unit 141 encodes the data (i.e., data to be written) and adds an ECC to the data as a redundant code. When data is read from the NAND flash memory 5, the coding/decoding unit 141 executes error correction of the read data by using the ECC added to the read data.

The NAND interface 142 functions as a NAND controller configured to control the NAND flash memory 5.

The dedicated hardware 15 may include a cache tag control logic 151 configured to control the address translation table cache tag 32. The cache tag control logic 151 may include a circuit configured to execute an operation of determining the cache hit/miss, an operation of updating cache control information such as tags held by the address translation table cache tag 32, and the like.

Next, a configuration of the host 2 will be explained.

The host 2 may include a CPU (host CPU) 21, main memory 22, and host controller 23. The CPU 21, the main memory 22, and the host controller 23 are interconnected through a bus 20.

The CPU 21 is a processor configured to control components in the host 2. The CPU 21 executes various programs loaded from the storage device 3 or other storage devices to the main memory 22. These programs include operating system, file system, and various application programs.

The host controller 23 is a controller configured to interface with the storage device 3. The host controller 23 transmits a write command, a read command, and the like to the storage device 3, under control of host software such as the file system and a device driver. In addition, the host controller 23 receives from the storage device 3 a write request for a device usage region which requests writing of data to the device usage region 22B and a read request for a device usage region which requests reading of data from the device usage region 22B.

FIG. 3 illustrates a relationship between the address translation table cache 31 and the address translation table cache tag 32, which are managed by the storage device 3.

The address translation table cache 31 includes plural (m) entries, i.e., plural cache lines L0 to Lm−1. Each of the cache lines L0 to Lm−1 includes plural (n) sub-lines SL0 to SLn−1. Each of the sub-lines SL0 to SLn−1 may store table data having a predetermined size. The table data having the predetermined size may include plural physical addresses corresponding to consecutive plural logical addresses.

For example, if the bit width of one physical address is 32 bits (4 bytes) and the size of one sub-line is 512 bytes, the table data that includes 128 physical addresses per one sub-line is stored. In general, since access to the NAND flash memory 5 has spatial locality, a cache line configuration in which each of the cache lines has plural sub-lines and each sub-line is capable of storing plural physical addresses corresponding to plural consecutive logical addresses enables the hit rate of the address translation table cache 31 to be increased.

The size (cache line size) of each of the cache lines L0 to Lm−1 is n times as large as a cache line that includes only one sub-line. The cache configuration of the address translation table cache 31 that includes the cache line enlarged by n times enables the number (m) of necessary cache lines to be reduced to 1/n. This means that the number of tags (cache tags), which are necessary for indicating which region of the address translation table 7 is cached to each cache line, can be reduced to 1/n. In this cache configuration, although plural bitmap flags respectively corresponding to the plural sub-lines need to be added, the capacity necessary to store the bitmap flags is 1 bit per sub-line. Therefore, the capacity in the cache configuration is smaller than that in the configuration in which each sub-line includes a tag.

In the mapping between the address translation table 7 and the address translation table cache 31, the address translation table 7 may be logically divided into plural lines (in other words, plural regions) each having the same size as the cache line size (sub-line size multiplied by n) of the address translation table cache 31. The contents of m regions among the plural regions included in the address translation table 7 are cached to the address translation table cache 31.

The address translation table cache 31 may be a set-associative cache or a full-associative cache. A case where the address translation table cache 31 is implemented as the full-associative cache, which is not limited, will be mainly explained below.

The address translation table cache tag 32 includes m entries corresponding to the cache lines L0 to Lm−1 of the address translation table cache 31. In m entries, m tags 32A indicating which regions of the address translation table 7 are stored in the cache lines L0 to Lm−1, are stored. In other words, each tag indicates which table data of the address translation table 7 is stored in the corresponding cache line. Each of m tags 32A includes an address corresponding to the table data stored in the corresponding cache line.

Furthermore, each of the entries of the address translation table cache tag 32 includes plural bitmap flags (n bits) 32B respectively corresponding to plural (n) sub-lines included in the corresponding cache line.

Each of the bitmap flags 32B indicates whether the table data is already transferred to the corresponding sub-line or not, i.e., whether the corresponding sub-line is valid or not. The memory region in the RAM 13 storing the plural bitmap flags 32B corresponding to each of the plural cache lines is also referred to as the bitmap memory.

In general cache control, data needs to be transferred to the cache in units of cache lines.

In the first embodiment, since each of the entries of the address translation table cache tag 32 includes the tag 32A and the plural bitmap flags 32B, the controller 4 can determine the cache hit/miss in units of sub-lines, based on the tag 32A and the plural bitmap flags 32B. Therefore, when the cache miss occurs, the controller 4 can execute a partial cache line fill operation (in other words, sub-line transfer) of transferring the only table data that includes the physical address corresponding to the logical address to be translated, to the cache line. In other words, the controller 4 transfers the table data to the address translation table cache 31 in units of not the cache lines, but in units of the sub-lines.

A configuration of storing only one physical address in one sub-line may be employed.

When the controller 4 receives a read command from the host 2, the controller 4 executes the following hit/miss determination processing by referring to the tags 32A and the bitmap flags 32B in the address translation table cache tag 32.

The controller 4 first refers to the address translation table cache tag 32 and determines whether a target cache line, which is associated with a tag that includes an upper bit portion of the logical address (for example, LBA) designated by the read command received from the host 2, exists in the address translation table cache 31 or not (hereinafter referred to as cache line hit/miss determination). Here, the target cache line means a cache line in which at least a part of table data that includes a desired physical address is stored. The tag that includes the upper bit portion of the logical address means a tag that includes an address which matches the upper bit portion (i.e., tag field) of the logical address. Hereinafter, the tag that includes the upper bit portion of the logical address is referred to as a tag which matches the upper bit portion (i.e., tag field) of the logical address.

Furthermore, the controller 4 refers to a specific bitmap flag corresponding to the target cache line and determines whether or not table data is already transferred to a specific sub-line in which the physical address corresponding to this logical address designated by the read command is to be stored (hereinafter referred to as bitmap hit/miss determination).

The bitmap hit/miss determination may be executed only when it is determined that the target cache line exists in the address translation table cache 31 by the cache line hit/miss determination or may be executed simultaneously with the cache line hit/miss determination.

When the address translation table cache 31 is the full-associative cache, the controller 4 searches for a target cache line by comparing the tag field of the logical address included in the read command with all of the tags 32A in the address translation table cache tag 32. If the tag 32A which matches the tag field of the logical address is detected, the controller 4 determines the cache line associated with this tag 32A as the target cache line.

On the other hand, if the address translation table cache 31 is the set-associative cache, the controller 4 compares the tag field of the logical address included in the read command with several tags 32A designated by the index (cache line index) of the logical address. If the tag field of the logical address matches one of the several tags 32A, the controller 4 determines the cache line associated with this tag 32A as the target cache line.

In the bitmap hit/miss determination, the following processing is executed.

It is assumed here that the cache line L0 is detected as the target cache line.

In this case, the controller 4 refers to a bitmap flag 32B associated with a specific sub-line in the detected cache line L0 and determines whether table data is already transferred to the specific sub-line or not. The specific sub-line in the cache line L0 means a sub-line in which the physical address corresponding to the logical address designated by the read command received from the host 2 is to be stored. This sub-line can be specified by the value of the logical address.

If the bitmap flag 32B associated with the specific sub-line is a value indicative of validity (for example, "1"), the controller 4 determines that the table data that includes the desired physical address corresponding to the logical address is already transferred to this sub-line. On the other hand, if the bitmap flag associated with the specific sub-line is a value indicative of invalidity (for example, "0"), the controller 4 determines that the table data that includes the desired physical address corresponding to the logical address is not yet transferred to this sub-line.

For example, if the specific sub-line in the cache line L0 is SL2, the controller 4 can determine whether the desired physical address exists in the cache line L0 or not, by referring to the bitmap flag 32B associated with the sub-line SL2 of the cache line L0. If the bitmap flag 32B associated with the sub-line SL2 is a value indicative of invalidity (for example, "0"), the controller 4 transfers only the table data of one sub-line that includes the physical address corresponding to the logical address to only the sub-line SL2 of the cache line L0 from the address translation table 7. The only specific sub-line SL2 of the cache line L0 is filled with the table data. Then, the controller 4 updates the bitmap flag 32B associated with the sub-line SL2 to a value indicative of validity (for example, "1").

Thus, the cache line L0 is refilled in units of the sub-lines. With the passing of time, plural sub-lines of the cache line L0 are gradually filled with the table data.

Figure 4:
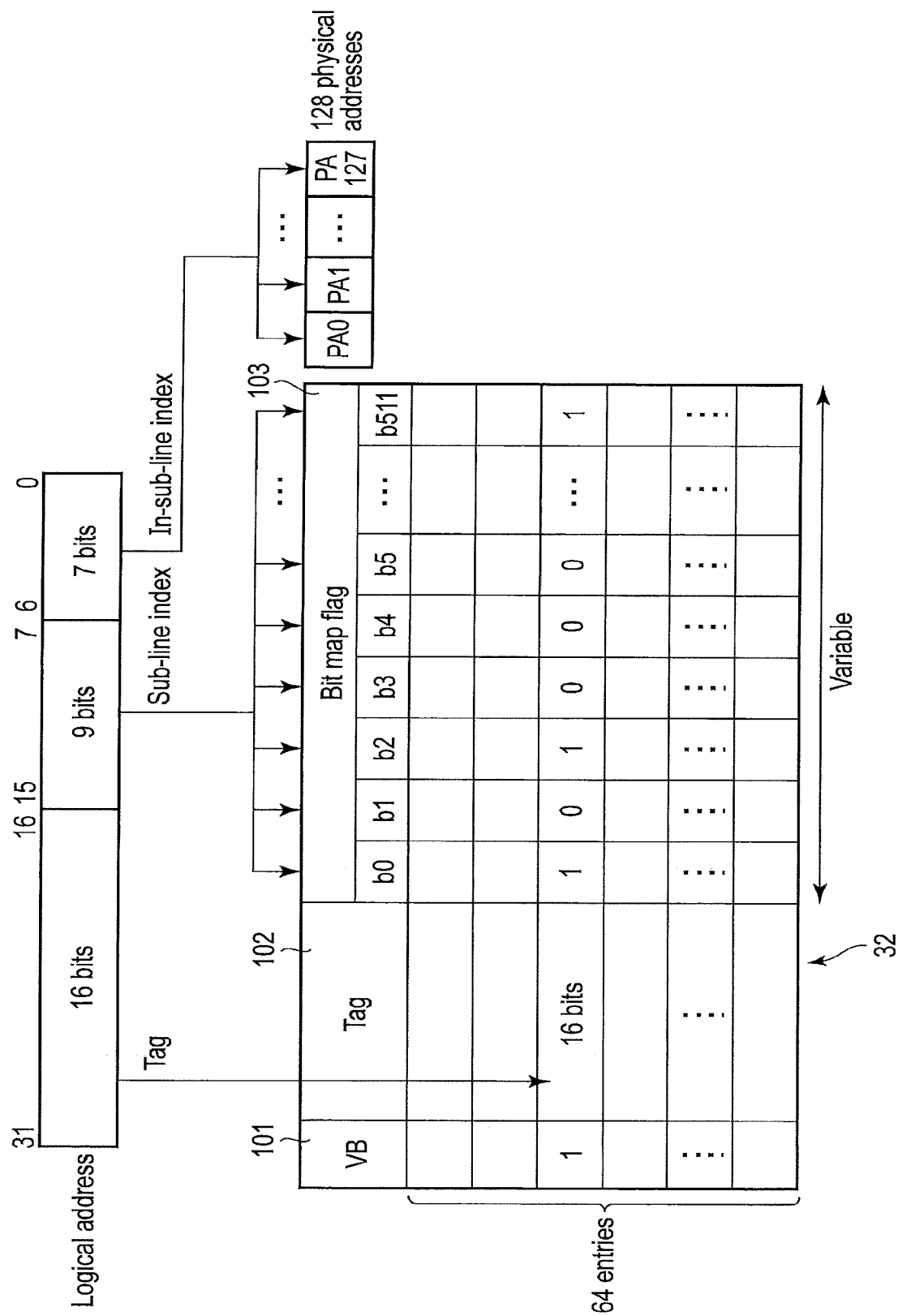
FIG. 4 is a diagram illustrating a configuration example of the address translation table cache tag illustrated in FIG. 3.

FIG. 4 illustrates a configuration example of the address translation table cache tag 32.

It is assumed here that the address translation table cache 31 is implemented as a full-associative cache. It is assumed that the address translation table cache tag 32 includes 64 entries, i.e., the number (m) of cache lines of the address translation table cache 31 is 64.

The 64 entries of the address translation table cache tag 32 correspond to 64 cache lines of the address translation table cache 31, respectively. Each of 64 entries of the address translation table cache tag 32 may include valid bit (VE) 101, tag 102, and bitmap flag field 103 that includes plural bitmap flags.

The valid bit (VB) 101 indicates whether the corresponding cache line is valid or not. A feature that a cache line is valid indicates that this cache line is active, i.e., that the table data is stored in at least one of the sub-lines of this cache line.

The logical address used to access the storage device 3 by the host 2 is divided into three fields, i.e., a tag field, a sub-line index, and an in-sub-line index.

The in-sub-line index specifies one of the plural physical addresses included in one sub-line. In other words, the in-sub-line index is used to select (or, designate) one of the plural physical addresses stored in one sub-line. A lower bit portion of the logical address is used as the in-sub-line index. The number of bits (i.e., bit width) of the in-sub-line index is determined in accordance with the number of physical addresses included in one sub-line. For example, if the sub-line size is 512 bytes and the physical address has a 32-bit width, 128 physical addresses (PA0 to PA127) corresponding to consecutive 128 logical addresses are stored in each of the sub-lines, and the number of bits (i.e., bit width) of the in-sub-line index is therefore 7 bits.

The sub-line index specifies one of n sub-lines included in one cache line. In other words, the sub-line index is used to select (or, designate) one of n sub-lines stored in one cache line. For example, if the cache line is enlarged to the cache line size that includes 512 sub-lines, the number of bits (i.e., bit width) of the sub-line index is 9 bits. In this case, the bitmap flag field 103 of each of the entries includes 512 bitmap flags (b0 to b511) corresponding to 512 sub-lines. A bit portion on the upper side than the in-sub-line index of the logical address is used as the sub-line index.

In the case of referring to the bitmap flag field 103, one bitmap flag, which is specified by the sub-line index of the logical address, is selected from the 512 bitmap flags.

The uppermost bit portion of 16 bits excluding the sub-line index and the in-sub-line index is used as the tag field. In this case, the upper bit portion (16 bits) of the logical address is stored in the tag 102 of each of the entries of the address translation table cache tag 32.

Figure 5:
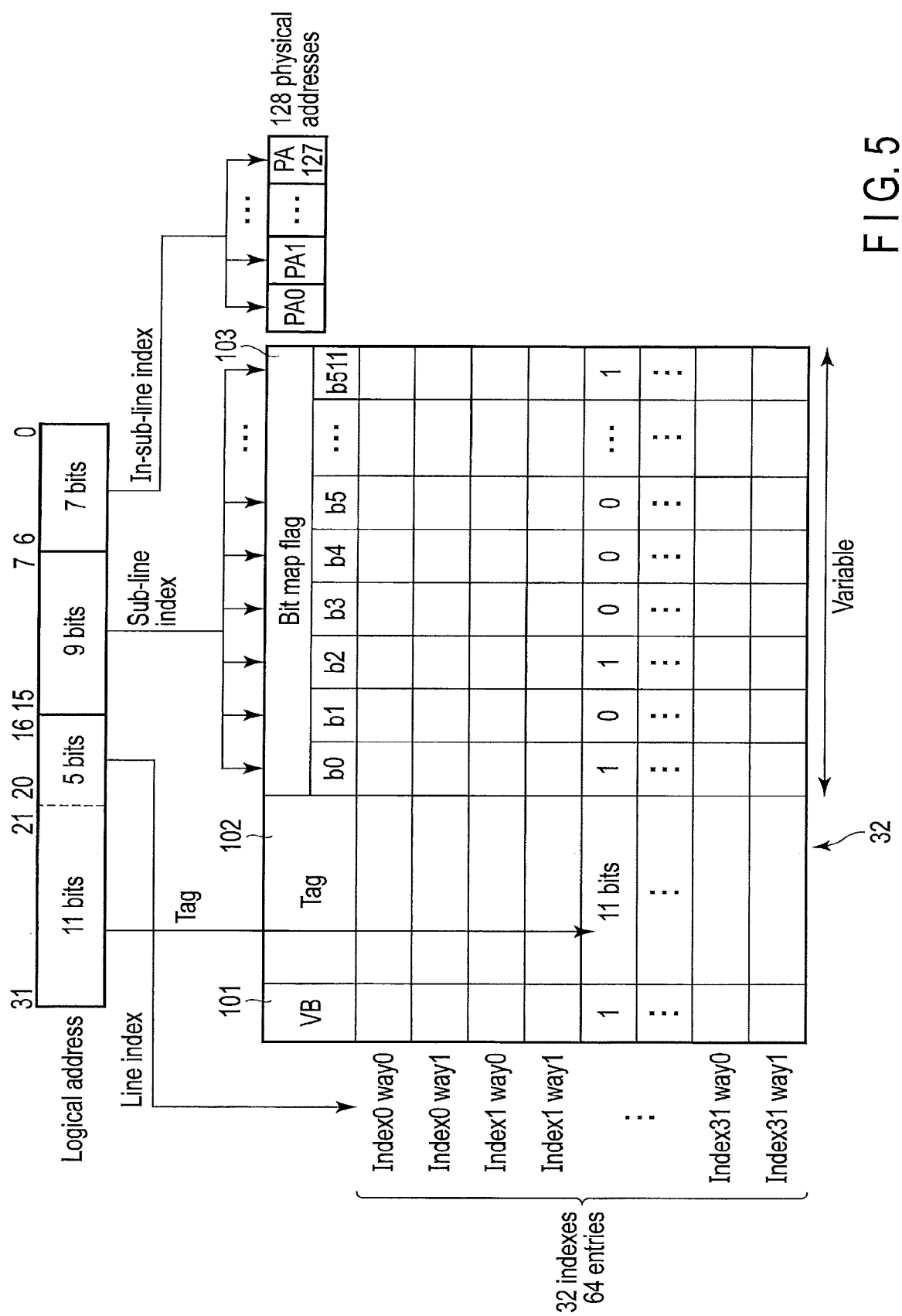
FIG. 5 is a diagram illustrating another configuration example of the address translation table cache tag illustrated in FIG. 3.

FIG. 5 illustrates a configuration example of the address translation table cache tag 32 corresponding to a case where the address translation table cache 31 is a set-associative cache.

It is assumed here that, for example, the address translation table cache 31 is a two-way set-associative cache.

The 64 entries of the address translation table cache tag 32 correspond to the 64 cache lines of the address translation table cache 31, respectively. The 64 entries are divided into way 0/1 (i.e., two ways) of Index0 to Index31. For each of the two ways in which the line index matches the Index, the tag in the entry corresponding to the way and the tag field are compared with each other, and cache hit/miss is thereby determined.

Since 5 bits on the upper side than the sub-line index are used as the line index to identify one of 32 indexes (Index0 to Index31), the tag field is 11 bits.

FIG. 6 illustrates a configuration of the address translation table cache 31 corresponding to the address translation table cache tag 32 illustrated in FIG. 4 or FIG. 5.

The address translation table cache 31 includes 64 cache lines L0 to L63. Each of the cache lines L0 to L63 includes 512 sub-lines SL0 to SL511. Each line (i.e., each region) of the address translation table 7 is stored in any one of the 64 cache lines L0 to L63. If the address translation table cache 31 is a two-way set-associative cache, the 64 cache lies are divided into way 0/1 (two ways) of Index0 to Index31.

Figure 7:
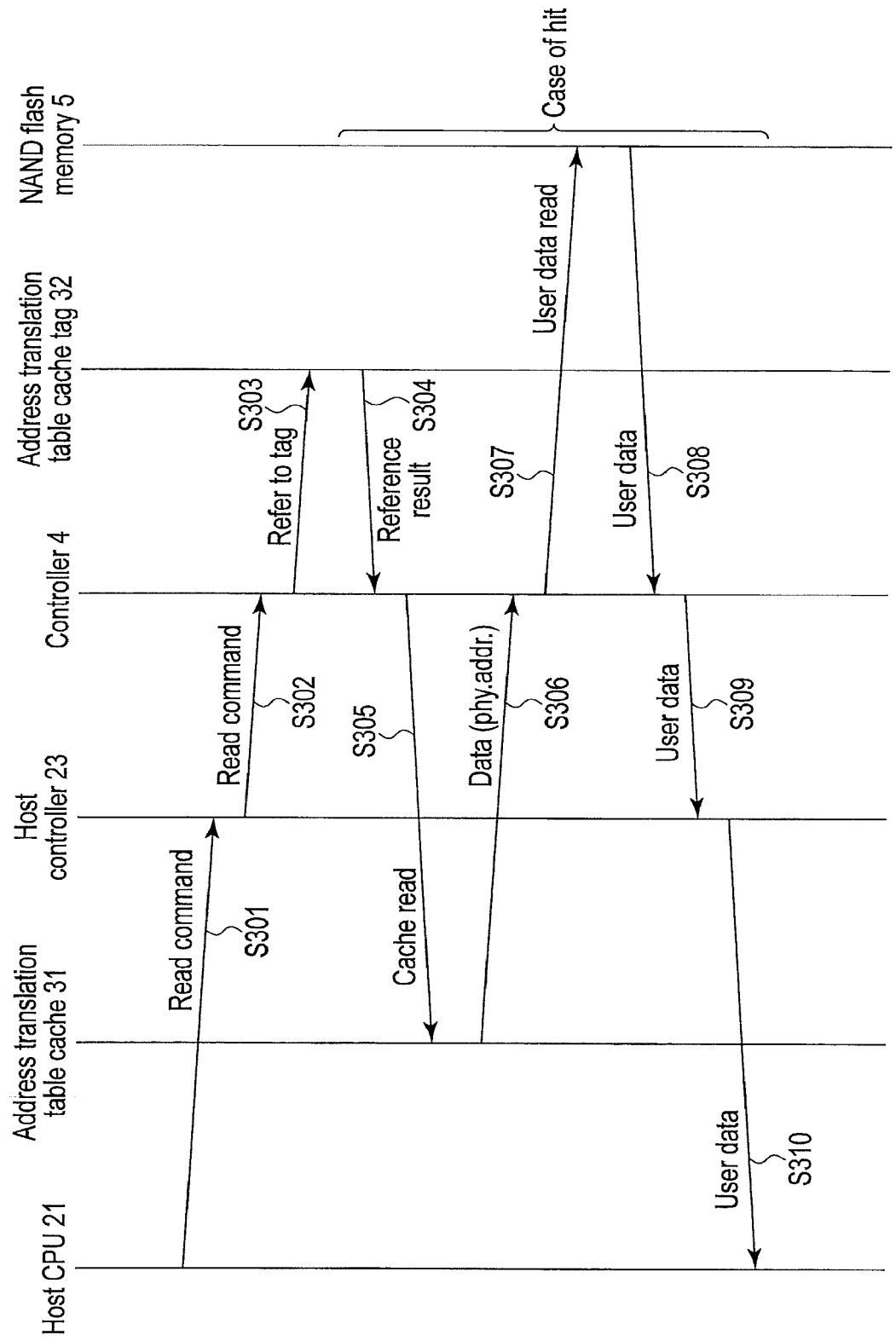
FIG. 7 is a sequence diagram illustrating a processing sequence of cache control processing executed in the memory system of the first embodiment in a case of a cache hit.

FIG. 7 is a sequence diagram illustrating a processing sequence of cache control processing executed by the controller 4 in a case of a cache hit in a data read operation.

The host CPU 21 transmits a read command to the controller 4 of the storage device 3 via the host controller 23 (steps S301 and S302). When the controller 4 receives the read command from the host 2, the controller 4 refers to the address translation table cache tag 32 (step S303), and determines whether the address translation table cache 31 is in a state of cache hit, cache line hit (also called bitmap miss), or cache miss, based on the reference result (step S304).

The cache hit is indicative of a state that the cache line associated with the tag which matches the upper bit portion of a logical address included in the read command exists and that the table data is already transferred to the sub-line in which the physical address corresponding to this logical address is to be stored. In other words, the cache hit is a state that the region of the address translation table 7 that includes the desired physical address is cached in the cache line and that the table data that includes the desired physical address is already transferred to the sub-line in which the desired physical address is to be stored.

The cache line hit (bitmap miss) is indicative of a state that the cache line associated with the tag which matches the upper bit portion of the logical address included in the read command exists, but the table data is not yet transferred to the sub-line in which the physical address corresponding to this logical address is to be stored.

The cache miss is indicative of a state that the cache line associated with the tag which matches the upper bit portion of the logical address included in the read command does not exist in the address translation table cache 31.

In the case of the cache hit, the controller 4 reads the table data that includes the physical address corresponding to this logical address, from the address translation table cache 31 in the device usage region 22B, via the host controller 23 (steps S305 and S306). The controller 4 extracts the physical address specified by the value of the in-sub-line index of this logical address, from the table data read from the address translation table cache 31. The controller 4 read-accesses the NAND flash memory 5 by using this physical address and reads user data designated by the logical address included in the read command from the NAND flash memory 5 (steps S307 and S308). The controller 4 transmits the user data to the host CPU 21 via the host controller 23 (steps S309 and S310).

Figure 8:
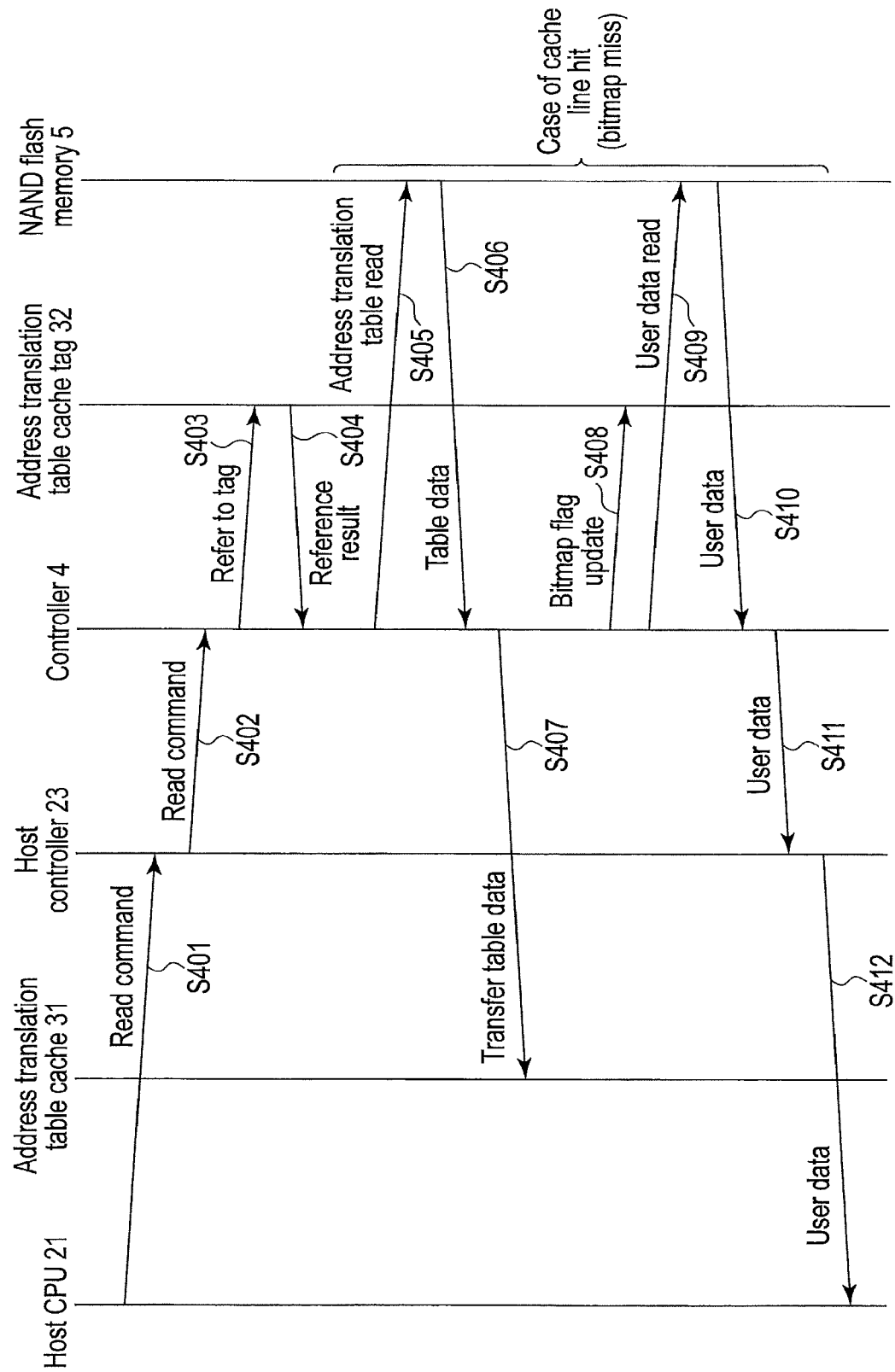
FIG. 8 is a sequence diagram illustrating a processing sequence of cache control processing executed in the memory system of the first embodiment in a case of a cache line hit (i.e., bitmap miss).

FIG. 8 is a sequence diagram illustrating a processing sequence of cache control processing executed by the controller 4 in a case of a cache line hit (i.e., bitmap miss) in a data read operation.

The host CPU 21 transmits a read command to the controller 4 of the storage device 3 via the host controller 23 (steps S401 and S402). When the controller 4 receives the read command from the host 2, the controller 4 refers to the address translation table cache tag 32 (step S403), and determines whether the address translation table cache 31 is in a state of cache hit, cache line hit (also called bitmap miss), or cache miss, based on the reference result (step S404).

In a case of the cache line hit (bitmap miss), the controller 4 reads the table data for of sub-line that includes the physical address corresponding to a logical address included in the read command, from the address translation table 7 in the NAND flash memory 5 (steps S405 and S406). The controller 4 transfers the table data to a specific sub-line in the cache line that is hit by the cache line hit. This specific sub-line is specified by the value of the sub-line index of this logical address.

The controller 4 updates the bitmap flag associated with the specific sub-line in the cache line that is hit by the cache line hit to a value indicative of validity (for example, "1") (step S408).

The controller 4 extracts the physical address specified by the value of the in-sub-line index of this logical address, from the table data read from the address translation table 7. The controller 4 read-accesses the NAND flash memory 5 by using this physical address and reads user data designated by the logical address in the read command from the NAND flash memory 5 (steps S409 and S410). The controller 4 transmits the user data to the host CPU 21 via the host controller 23 (steps S411 and S412).

Figure 9:
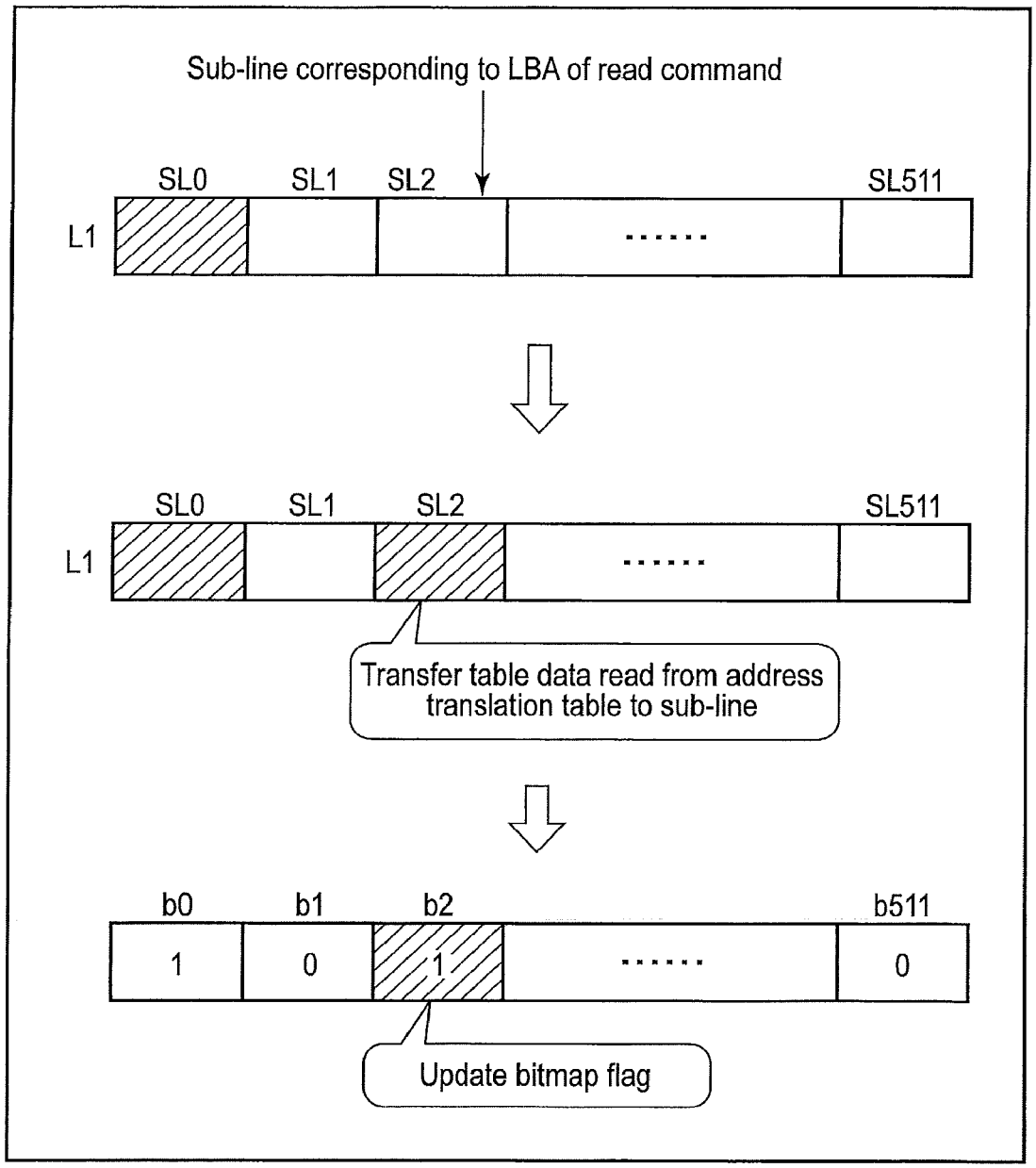
FIG. 9 is a diagram illustrating a sub-line transfer operation and a bitmap flag update operation, which are executed in the cache control processing illustrated in FIG. 8.

FIG. 9 illustrates a sub-line transfer operation and a bitmap flag update operation, which are executed in a case of the cache line hit (bitmap miss).

In FIG. 9, a hatched portion in the cache line represents a sub-line in which the table data is already transferred, and a non-hatched portion represents a sub-line in which the table data is not yet transferred. The sub-line in which the table data is already transferred is also referred to as "transferred sub-line". In bitmap flag fields (b0 to b511), the hatched portion represents the bitmap flag newly updated to a value indicative of validity (for example, "1").

In FIG. 9, it is assumed that a specific line in the address translation table 7 corresponding to a logical address (for example, LBA) in a read command is mapped to a cache line L1 and that only sub-line SL0 (i.e., the hatched portion) of the cache line L1 is the transferred sub-line. The controller 4 refers to the address translation table cache tag 32, finds the tag matching the tag field of the logical address in the read command, and thereby specifies the cache line L1 as the cache line which stores a part of the specific line corresponding to the logical address in the read command. The table data is not transferred to the sub-line SL2 in which the table data that includes the physical address corresponding to the logical address in the read command is to be stored. In this case, the bitmap flag (b2) corresponding to the sub-line SL2 of the cache line L1 is set to a value indicative of invalidity (for example, "0"). Therefore, the controller 4 can determine the cache line hit (bitmap miss) by referring to the bitmap flag (b2) corresponding to the sub-line SL2 of the cache line L1.

The controller 4 reads the table data of one sub-line that includes the physical address corresponding to the logical address in the read command, from the address translation table 7 in the NAND flash memory 5, and transfers the only table data to the sub-line SL2 of the cache line L1. Then, the controller 4 updates the bitmap flag (b2) corresponding to the sub-line SL2 of the cache line L1, from a value indicative of invalidity (for example, "0") to a value indicative of validity (for example, "1").

Figure 10:
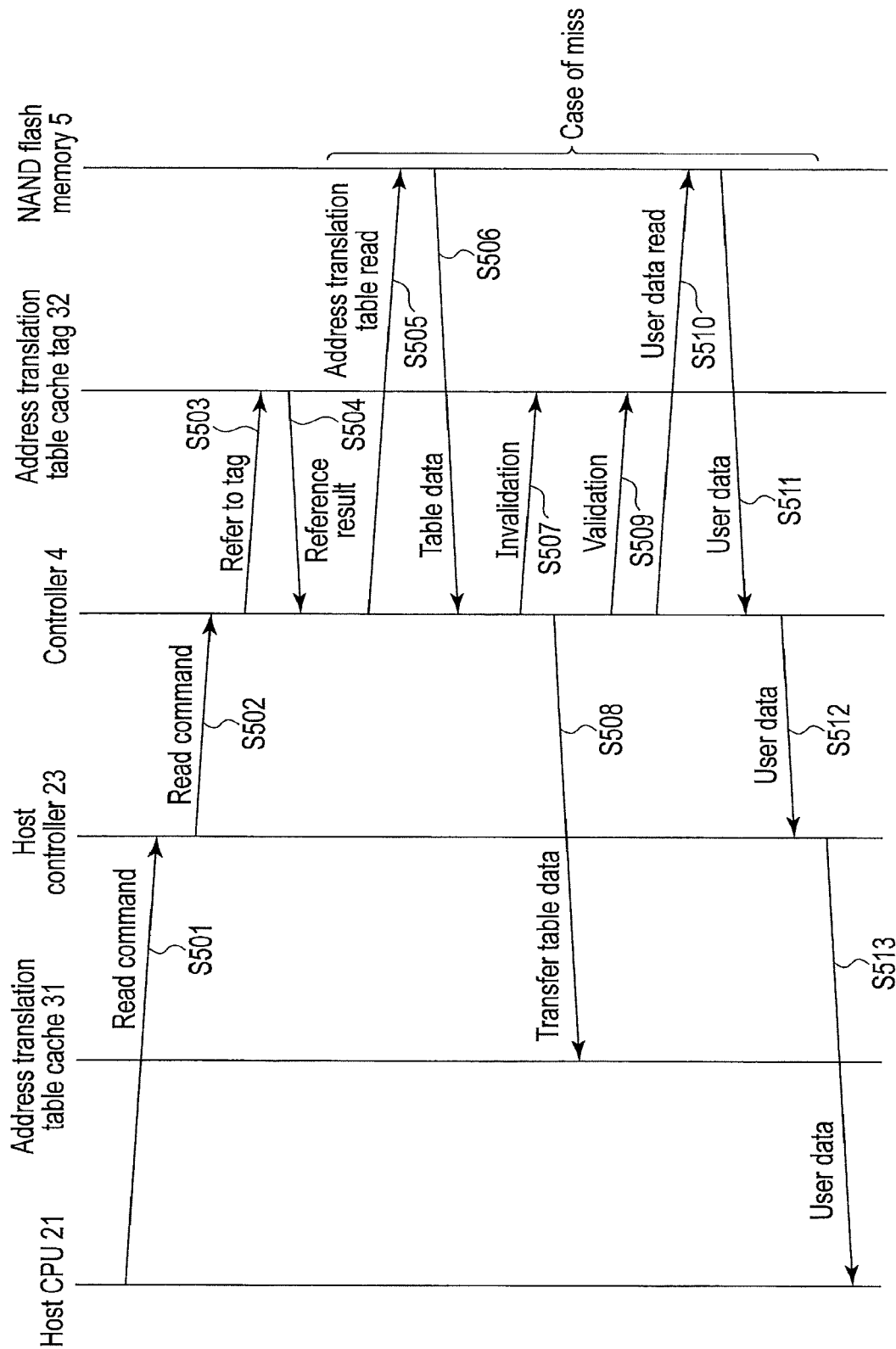
FIG. 10 is a sequence diagram illustrating a processing sequence of cache control processing executed in the memory system of the first embodiment in a case of a cache miss.

FIG. 10 illustrates a sequence diagram illustrating a processing sequence of cache control processing executed by the controller 4 in a case of a cache miss in a data read operation.

The host CPU 21 transmits a read command to the controller 4 of the storage device 3 via the host controller 23 (steps S501 and S502). When the controller 4 receives the read command from the host 2, the controller 4 refers to the address translation table cache tag 32 (step S503), and determines whether the address translation table cache 31 is in a state of cache hit, cache line hit (also called bitmap miss), or cache miss, based on the reference result (step S504).

In a case of the cache miss, the controller 4 reads the table data of one sub-line that includes the physical address corresponding to a logical address included in the read command, from the address translation table 7 in the NAND flash memory 5 (steps S505 and S506). If all of the cache lines that are to be replacement targets (i.e., all of candidates for the replacement target cache line) are being used, i.e., if unused cache lines which do not store any table data do not exist in the candidates for replacement target cache line, the controller 4 determines the replacement target cache line from the cache lines. The replacement target cache line means a cache line to be replaced, i.e., a cache line to be evicted from the address translation table cache 31. If the address translation table cache 31 is a full-associative cache, all of the cache lines in the address translation table cache 31 can be the candidates for replacement target cache line. On the other hand, if the address translation table cache 31 is an n-way set associative cache (n>1), n ways corresponding to a certain specific set defined by this logical address are the candidates for replacement target cache line.

The controller 4 evicts the cache line determined as the replacement target from the address translation table cache 31. In other words, the controller 4 invalidates the replacement target cache line by updating the entry of the address translation table cache tag 32, which corresponds to the cache line determined as the replacement target (step S507). In this case, all of the sub-lines in the replacement target cache line are invalidated.

The controller 4 transfers the only table data of one sub-line read from the address translation table 7, to the specific sub-line of the replacement target cache line in the address translation table cache 31 (step S508).

The controller 4 executes validation processing for validating the replacement target cache line by updating the entry of the address translation table cache tag 32, which corresponds to the replacement target cache line (step S509).

The controller 4 extracts the physical address specified by the value of the in-sub-line index of this logical address, from the table data read from the address translation table 7. The controller 4 read-accesses the NAND flash memory 5 by using this physical address and reads user data designated by the logical address in the read command from the NAND flash memory 5 (steps S510 and S511). The controller 4 transmits the user data to the host CPU 21 via the host controller 23 (steps S512 and S513).

FIG. 11 illustrates a cache line invalidation operation, a sub-line transfer operation, and a cache line validation operation, which are executed in a case of the cache miss.

In FIG. 11, a hatched portion in the cache line represents a sub-line in which the table data is already transferred, and a non-hatched portion represents a sub-line in which the table data is not yet transferred. In the entry of the address translation table cache tag 32 (valid bit VB, tag, and bitmap field), a hatched portion represents a newly updated portion.

If a tag matching a tag field of a logical address in a read command does not exist in the address translation table cache tag 32, the controller 4 detects the occurrence of a cache miss. The controller 4 determines the cache line to be replaced (i.e., replacement target cache line). It is assumed here that the cache line L2 is determined as the replacement target.

The controller 4 may first invalidate the cache line L2. In this case, the controller 4 updates the valid bit corresponding to the cache line L2 to a value indicative of invalidity (for example, "0") and then clears all of the bitmap flags corresponding to the cache line L2 to a value indicative of invalidity (for example, "0").

The controller 4 reads the table data of one sub-line corresponding to the logical address in the read command, from the address translation table 7, and transfers the table data to a specific sub-line (for example, sub-line SL511) of the cache line L2 in which the table data is to be stored. Then the controller 4 validates the cache line L2. In this case, the controller 4 writes the value of the tag field of the logical address in the read command to the address translation table cache tag 32 as the tag corresponding to the cache line L2. Furthermore, the controller 4 updates the bitmap flag associated with the sub-line SL511 of the cache line L2 to a value indicative of validity (for example, "1") and updates the valid bit corresponding to the cache line L2 to a value indicative of validity (for example, "1").

Note that the address translation table cache 31 does not need to be stored in the host memory, but the address translation table cache 31 may be stored in RAM (SRAM) 13 in the controller 4 together with the address translation table cache tag 32 as illustrated in FIG. 12 or stored in dynamic RAM (DRAM) 17 provided outside of the controller 4 together with the address translation table cache tag 32 as illustrated in FIG. 13. In the configuration illustrated in FIG. 13, the controller 4 includes a circuit configured to control the DRAM 17, i.e., a DRAM interface 16.

Next, an operation of determining a replacement target cache line in the first embodiment will be explained.

As mentioned above, if replacement (or, eviction) of the cache line is required due to a cache miss, the controller 4 determines the replacement target cache line of the address translation table cache 31.

As a replacement policy for determining the replacement target cache line, least recently used (LRU) policy of evicting the least recently used cache line is well known.

However, if the LRU policy is employed, plural transferred sub-lines may be invalidated together.

For example, it is assumed that the cache line L0 includes plural transferred sub-lines and each of cache lines L1 and L2 includes only one transferred sub-line as illustrated in FIG. 3. If the cache lines L1 and L2 are used comparatively recently, the cache line L0 is the least recently used cache line, and the cache line L0 that includes the plural transferred sub-lines is determined as the replacement target. In this case, all of the plural transferred sub-lines in the cache line L0 are invalidated and evicted from the cache line L0. As a result, the cache hit rate may be lowered and the performance of the storage device 3 may be deteriorated.

Thus, in the configuration that each cache line includes plural sub-lines, all of the transferred sub-lines in the replacement target cache line are evicted from the address translation table cache 31. In the first embodiment, when replacing one cache line due to the cache miss, the controller 4 determines the cache line having the smallest number of sub-lines to which table data is already transferred, among the cache lines which are to be replacement targets, as the replacement target. In other words, the controller 4 invalidates the cache line having the smallest number of sub-lines to which table data is already transferred and thereby evicts the cache line from the address translation table cache 31. Then, the controller 4 reads the table data of one sub-line from the NAND flash memory 5 and transfers the read table data to one of the plural sub-lines in the replacement target cache line.

It is assumed that, for example, the cache line L0 includes plural transferred sub-lines and each of cache lines L1 and L2 includes only one transferred sub-line as illustrated in FIG. 3. In this case, the controller 4 determines the cache line L1 or the cache line L2 as the replacement target.

As a result, the cache line that includes a large number of transferred sub-lines can be left in the address translation table cache 31. Therefore, since a state in which the address translation table cache 31 holds a large number of transferred sub-lines can be maintained even after the cache line replacement, improvement of the hit rate of the address translation table cache 31 can be attempted.

The flowchart of FIG. 14 illustrates a procedure of an operation of determining a replacement target cache line.

For example, when a cache miss occurs, the controller 4 determines whether the cache line replacement is required or not (step S11). In step S11, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S11), the controller 4 searches for the cache line that includes the smallest number of transferred sub-lines, among all of the cache lines that are to be replacement targets (step S12).

If the address translation table cache 31 is a full-associative cache, all of the cache lines in the address translation table cache 31 can be the candidates for replacement target cache line. For this reason, in step S12, the controller 4 searches for the cache line that includes the smallest number of transferred sub-lines, among all of the cache lines of the address translation table cache 31. In addition, each of the entries of the address translation table cache tag 32 may further include a lock flag. In this configuration, a cache line corresponding to an entry in which a value indicative of validity (for example, "1") is set at the lock flag may be excluded from the replacement targets.

In step S12, the controller 4 specifies the cache line that includes the smallest number of transferred sub-lines, by comparing the number of transferred sub-lines among the cache lines which are to be replacement targets.

The controller 4 determines the cache line that includes the smallest number of transferred sub-lines as the replacement target, and executes the cache line replacement operation of transferring the table data of one sub-line read from the NAND flash memory 5 to one sub-line of the plural sub-lines in the replacement target cache line (step S13).

As the method of specifying the number of transferred sub-lines, a method of reading plural bitmap flags respectively corresponding to cache lines may be employed.

Each of the bitmap flags corresponds to one sub-line. The bitmap flags corresponding to the sub-lines in which data are not transferred are set to values indicative of invalidity (for example, "0"). If the controller 4 transfers the table data to a certain sub-line, the controller 4 sets the bitmap flag corresponding to this sub-line to a value indicative of validity (for example, "1"). If the cache line replacement is required, the controller 4 refers to plural bitmap flags corresponding to all of the cache lines that are to be replacement targets, searches for the cache line that includes the smallest number of bitmap flags having a value indicative of validity (for example, "1"), among all of the cache lines that are to be replacement targets, and sets the cache line that includes the smallest number of bitmap flags having a value indicative of validity (for example, "1") as the replacement target. The cache line that includes the smallest number of bitmap flags having a value indicative of validity (for example, "1") is the cache line that includes the smallest number of transferred sub-lines.

If an unused cache line exists in the cache lines which are to be replacement targets (i.e., in all of candidates for replacement target cache line), the controller 4 determines that the cache line replacement is not required.

If the cache line replacement is not required (NO in step S11), the controller 4 executes the cache line transfer operation (without the cache line replacement), i.e., the operation of transferring the table data to one of plural sub-lines in the unused cache line (step S14).

The flowchart of FIG. 15 illustrates a procedure of an operation of determining a replacement target cache line using plural bitmap flags corresponding to each cache line.

For example, when a cache miss occurs, the controller 4 determines whether the cache line replacement is required or not (step S21). In step S21, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S21), the controller 4 refers to plural bitmap flags corresponding to all of the cache lines that are to be replacement targets, and searches for the cache line that includes the smallest number of bitmap flags having a value indicative of validity (for example, "1"), among all of the cache lines that are to be replacement targets (step S22). In step S22, the controller 4 specifies the cache line that includes the smallest number of bitmap flags "1" by comparing the number of bitmap flags "1" among the cache lines which are to be replacement targets.

The controller 4 determines the cache line that includes the smallest number of bitmap flags of a value indicative of validity (for example, "1") as the replacement target, and executes the cache line replacement operation of transferring the table data of one sub-line read from the NAND flash memory 5 to one sub-line of the plural sub-lines in the replacement target cache line (step S23).

If an unused cache line exists in the cache lines which are to be replacement targets (i.e., in all of candidates for replacement target cache line), the controller 4 determines that the cache line replacement is not required.

If the cache line replacement is not required (NO in step S21), the controller 4 executes the cache line transfer operation (without the cache line replacement), i.e., the operation of transferring the table data to one of the plural sub-lines in the unused cache line (step S24).

Figure 16:
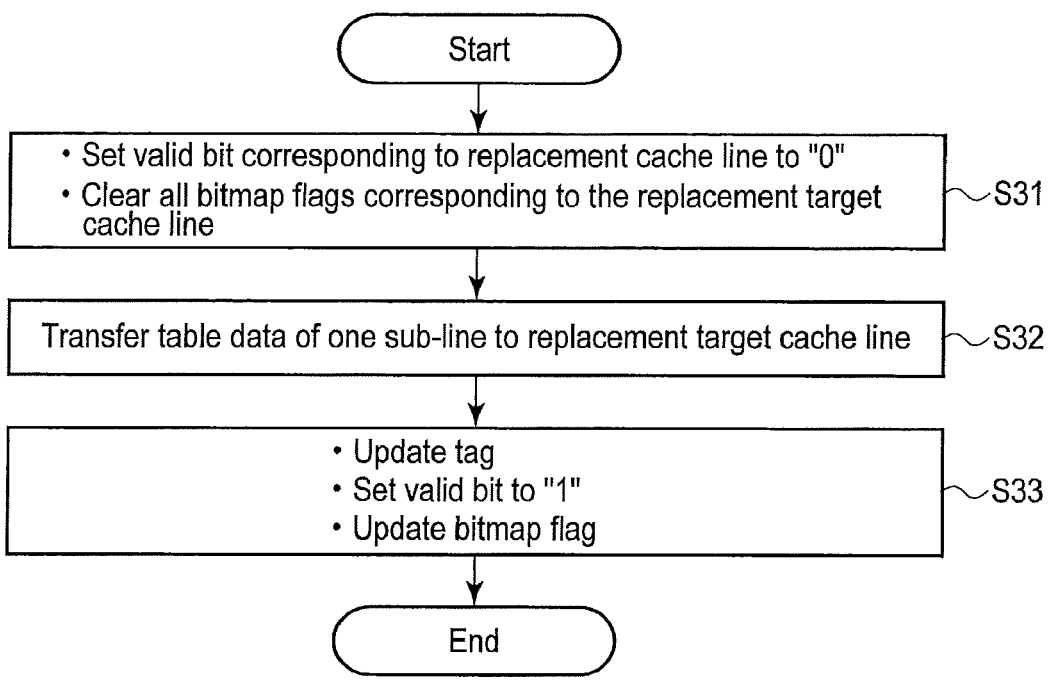
FIG. 16 is a flowchart illustrating a procedure of a cache line replacement operation executed in the memory system of the first embodiment.

The flowchart of FIG. 16 illustrates a procedure of a cache line replacement operation.

The controller 4 invalidates the replacement target cache line by setting the valid bit (VB) corresponding to the replacement target cache line to a value indicative of invalidity (for example, "0"), and further invalidates all of the sub-lines in the replacement target cache line by clearing all of the bitmap flags to a value indicative of invalidity (for example, "0") (step S31). The controller 4 reads the table data of one sub-line that includes the desired physical address, from the address translation table 7 in the NAND flash memory 5, and transfers the read table data of one sub-line to one specific sub-line in the replacement target cache line (step S32). This specific sub-line is determined by the logical address included in a read command which causes the cache miss.

The controller 4 executes an operation of updating the content of the tag corresponding to the replacement target cache line to the tag field in the logical address included in the read command, an operation of updating the bitmap flag corresponding to the specific sub-line (i.e., sub-line to which the table data is transferred) in the replacement target cache line, to a value indicative of validity (for example, "1"), and an operation of updating the valid bit (VB) corresponding to the replacement target cache line to a value indicative of validity (for example, "1") (step S33).

Figure 17:
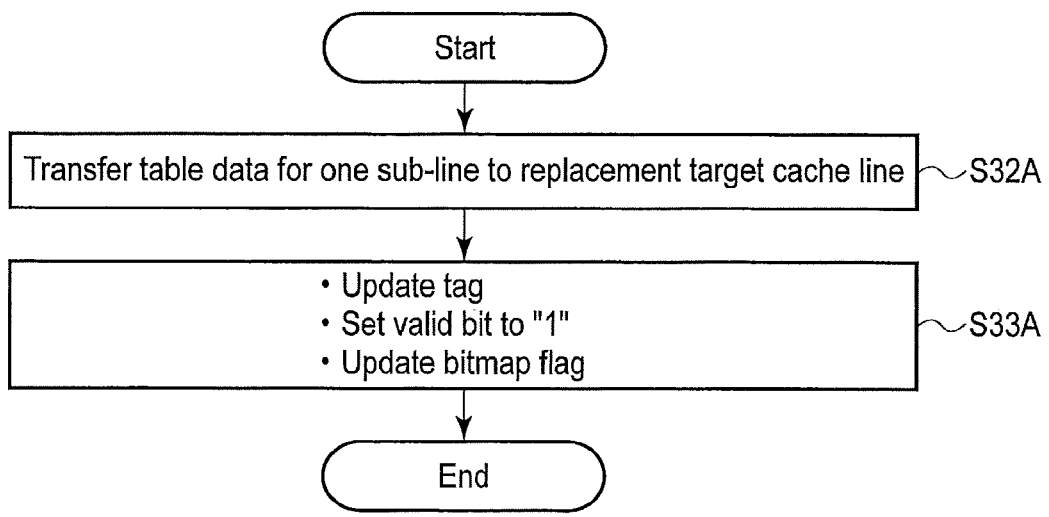
FIG. 17 is a flowchart illustrating a procedure of a cache line transfer operation executed in the memory system of the first embodiment.

The flowchart of FIG. 17 illustrates a procedure of a cache line transfer operation (without the cache line replacement).

The controller 4 reads the table data of one sub-line that includes the desired physical address, from the address translation table 7 in the NAND flash memory 5, and transfers the read table data of one sub-line to one specific sub-line in an unused cache line (step S32A). This specific sub-line is determined by the logical address included in a read command which causes the cache miss.

The controller 4 executes an operation of updating the content of the tag corresponding to the unused cache line to the tag field in the logical address included in the read command, an operation of updating the bitmap flag corresponding to the specific sub-line (i.e., sub-line to which the table data is transferred) in the unused cache line, to a value indicative of validity (for example, "1"), and an operation of updating the valid bit (VB) corresponding to the unused cache line to a value indicative of validity (for example, "1") (step S33A).

FIG. 18 illustrates a configuration example of the address translation table cache tag 32 that includes bitmap counters.

Each of the entries of the address translation table cache tag 32 illustrated in FIG. 18 holds not only the tag 32A and the plural bitmap flags 32B, but also a bitmap counter 32C.

The bitmap counter 32C of each entry of the address translation table cache tag 32 is indicative of the number of bitmap flags of a value indicative of validity (for example, "1"), which are included in the n-bit bitmap flags.

The bitmap counter 32C is required to have a specified bit number (i.e., $\log_2$ [the number of the bitmap flags (n)]) enough to completely count the number of the bitmap flags of a value indicative of validity (for example, "1"), but may be a counter which saturates at a certain threshold value (i.e., upper limit) smaller than n.

If the cache line replacement is required, the controller 4 refers to the bitmap counter 32C corresponding to each of the cache lines which are to be the replacement targets, searches for the cache line that includes the smallest value of the bitmap counter 32C, among the cache lines which are to be the replacement targets, and determines the cache line that includes the smallest value of the bitmap counter 32C as the replacement target. The cache line that includes the smallest value of the bitmap counter 32C is the cache line that includes the smallest number of transferred sub-lines.

The replacement target cache line can be thereby determined more efficiently than reading the plural bitmap flags corresponding to each of the cache lines which are to be replacement targets.

In a case of determining the replacement target cache line by using plural bitmap flags corresponding to each cache line, the bitmap flags corresponding to each of all of the cache lines that are to be the replacement targets (the bitmap flags corresponding to each of all of the cache lines if the cache is the full-associative cache) need to be searched at every cache line replacement. If a large number of sub-lines are included in one cache line, determination of the replacement target cache line may take much time since the amount of data which needs to be read to determine the replacement target cache line is increased.

In a case of determining the replacement target cache line by using the bitmap counter 32C corresponding to each cache line, the amount of data which needs to be read to determine the replacement target cache line can be decreased, and the time to determine the replacement target cache line can be shortened.

Figure 19:
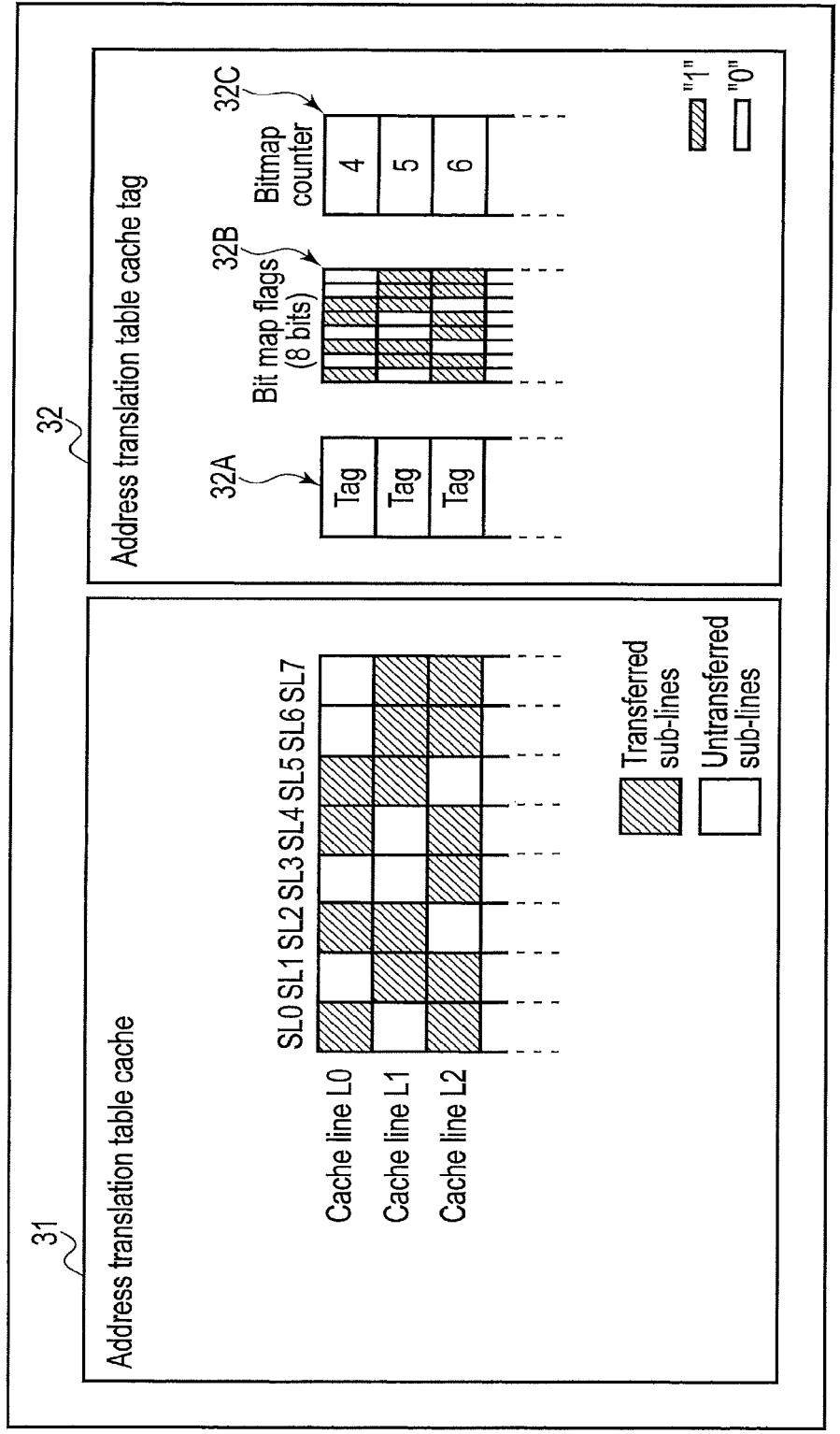
FIG. 19 is a diagram illustrating an example of each bitmap counter value in the address translation table cache tag illustrated in FIG. 18.

FIG. 19 illustrates an example of several values of the bitmap counters 32C in the address translation table cache tag 32 illustrated in FIG. 18.

In FIG. 19, it is assumed that each of the cache lines includes eight sub-lines SL0 to SL7 to simplify the figure.

In the cache line L0, the sub-lines SL0, SL2, SL4, and SL5 are the transferred sub-lines. In this case, four bitmap flags 32B corresponding to the sub-lines SL0, SL2, SL4, and SL5 of the cache line L0 are set to values indicative of validity (for example, "1"), and the value of the bitmap counter 32C corresponding to the cache line L0 is set to four.

In the cache line L1, the sub-lines SL1, SL2, SL5, SL6, and SL7 are the transferred sub-lines. In this case, five bitmap flags 32B corresponding to the sub-lines SL1, SL2, SL5, SL6, and SL7 of the cache line L1 are set to values indicative of validity (for example, "1"), and the value of the bitmap counter 32C corresponding to the cache line L1 is set to five.

In the cache line L2, the sub-lines SL0, SL1, SL3, SL4, SL6, and SL7 are the transferred sub-lines. In this case, six bitmap flags 32B corresponding to the sub-lines SL0, SL1, SL3, SL4, SL6, and SL7 of the cache line L2 are set to values indicative of validity (for example, "1"), and the value of the bitmap counter 32C corresponding to the cache line L2 is set to six.

A flowchart of FIG. 20 illustrates a procedure of an operation of determining a replacement target cache line using the bitmap counter corresponding to each cache line.

For example, when a cache miss occurs, the controller 4 determines whether the cache line replacement is required or not (step S41). In step S41, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S41), the controller 4 refers to the bitmap counters corresponding to all of the cache lines that are to be the replacement targets, and searches for the cache line with the bitmap counter having the minimum value, among all of the cache lines that are to be the replacement targets (step S42). In step S42, the controller 4 specifies the cache line with the bitmap counter having the minimum value by comparing the values of the bitmap counters among the cache lines which are to be the replacement targets.

The controller 4 determines the cache line with the bitmap counter having the minimum value as the replacement target, and executes the cache line replacement operation of transferring the table data of one sub-line read from the NAND flash memory 5 to one of the plural sub-lines in the replacement target cache line (step S43).

If an unused cache line exists in the cache lines which are to be replacement targets (i.e., in all of candidates for replacement target cache line), the controller 4 determines that the cache line replacement is not required.

If the cache line replacement is not required (NO in step S41), the controller 4 executes the cache line transfer operation (without the cache line replacement), i.e., the operation of transferring the table data to one of the plural sub-lines in the unused cache line (step S44).

A flowchart of FIG. 21 illustrates a procedure of a sub-line transfer operation applied to the configuration that the address translation table cache tag 32 includes the bitmap counter corresponding to each cache line.

If a cache line hit (bitmap miss) or a cache miss occurs, the controller 4 transfers the table data of one sub-line read from the address translation table 7 of the NAND flash memory 5, to a specific sub-line in a certain cache line (step S51). If the cache line hit (bitmap miss) occurs, the cache line to which the table data is transferred is the cache line that is hit by the cache line hit. If the cache miss occurs, the cache line to which the table data is transferred is the replacement target cache line.

The controller 4 updates the value of the bitmap flag corresponding to the specific sub-line in the cache line to which the table data is transferred, from a value indicative of invalidity (for example, "0") to a value indicative of validity (for example, "1") (step S52).

Then, the controller 4 increments the bitmap counter corresponding to the cache line by one (step S53). Note that a case of where the controller 4 does not update the bitmap flag from "0" to "1" for some reason (for example, since the content of the cached table data is changed and the changed content is also reflected to the table data of the address translation table cache 31) even if the controller 4 executes the sub-line transfer, the controller 4 may not execute the operation of incrementing the corresponding bitmap count by one.

A flowchart of FIG. 22 illustrates a procedure of a cache line replacement operation applied to the configuration that the address translation table cache tag 32 includes the bitmap counter corresponding to each cache line.

For example, when a cache miss occurs, the controller 4 determines whether the cache line replace is required or not (step S61). In step S61, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S61), the controller 4 refers to the bitmap counters corresponding to all of the cache lines that are to be the replacement targets, and searches for the cache line with the bitmap counter having the minimum value, among all of the cache lines that are to be the replacement targets (step S62). In step S62, the controller 4 specifies the cache line with the bitmap counter having the minimum value by comparing the values of the bitmap counters among the cache lines which are to be replacement targets.

The controller 4 determines the cache line with the bitmap counter having the minimum value as the replacement target (step S63).

The controller 4 executes (1) an operation of invalidating the replacement target cache line by setting the valid bit (VB) corresponding to the replacement target cache line to a value indicative of invalidity (for example, "0"), (2) an operation of invalidating all of the sub-lines in the replacement target cache line by clearing to a value indicative of invalidity (for example, "0"), and (3) an operation of setting the value of the bitmap counter corresponding to the replacement target cache line to zero (step S64).

The controller 4 reads the table data of one sub-line that includes a desired physical address, from the address translation table 7 in the NAND flash memory 5, and transfers the read table data of one sub-line to one specific sub-line in the replacement target cache line (step S65). This specific sub-line is determined by a logical address included in a read command which causes the cache miss.

The controller 4 executes (1) an operation of updating the content of the tag corresponding to the replacement target cache line to the tag field in the logical address included in the read command, (2) an operation of updating the bitmap flag corresponding to the transferred sub-line in the replacement target cache line, to a value indicative of validity (for example, "1"), (3) an operation of incrementing the value of the bitmap counter corresponding to the replacement target cache line by one, and (4) an operation of updating the valid bit (VB) corresponding to the replacement target cache line to a value indicative of validity (for example, "1") (step S66).

If an unused cache line exists in the cache lines which are to be replacement targets (i.e., in all of candidates for replacement target cache line), the controller 4 determines that the cache line replacement is not required.

If the cache line replacement is not required (NO in step S61), the controller 4 executes the cache line transfer operation (without the cache line replacement), i.e., the operation of transferring the table data to one of plural sub-lines in the unused cache line (step S67).

FIG. 23 illustrates a configuration example of the address translation table cache tag 32 that includes a shared storage region for a time stamp and a bitmap counter.

Each of the entries of the address translation table cache tag 32 includes not only the tag 32A and the plural bitmap flags 32B, but also a shared storage region 32D for the time stamp and the bitmap counter.

The shared storage region 32D is used to selectively store the time stamp used to determine the replacement target cache line by the LRU policy or the bitmap counter. The time stamp for LRU policy is updated to be a larger value (or a smaller value) for the recently used cache line. In other word, the time stamp for LRU policy is updated such that a time stamp corresponding to a more recently used cache line is set at a value larger (or smaller) than values of the time stamps corresponding to the other cache lines. The controller 4 has an LRU mode and a bitmap counter mode as a replacement mode for determining the replacement target cache line. The LRU mode is a replacement mode of determining the replacement target cache line based on the LRU policy. In the LRU mode, the controller 4 manages the time stamp corresponding to each cache line, by using a clock 41 for the time stamp and the shared storage region 32D corresponding to each cache line. On the other hand, the bitmap counter mode is a replacement mode of determining the cache line having the smallest value of the bitmap counter as the replacement target. In the bitmap counter mode, the shared storage region 32D is used as the bitmap counter.

In other words, in a case where the LRU mode is used, the time stamp which is updated to be a large value (or a small value) for the recently used cache line is stored in the shared storage region 32D. On the other hand, in a case where the bitmap counter mode is used, the bitmap counter indicative of the number of the bitmap flags having a value indicative of validity, among the corresponding plural bitmap flags, is stored in the shared storage region 32D.

The address translation table cache tag 32 includes a changeover switch 42. The changeover switch 42 is a switch circuit configured to change a value to be stored in the shared storage region 32D corresponding to each cache line between the time stamp and the bitmap counter. The controller 4 can selectively use the LRU mode or the bitmap counter mode by controlling the changeover switch 42.

In the LRU mode, the changeover switch 42 selects the clock 41 for the time stamp. In contrast, in the bitmap counter mode, the changeover switch 42 selects the bitmap memory which holds the plural bitmap flags 32B corresponding to each cache line.

In the LRU mode, the controller 4 updates the time stamp held in the shared storage region 32D corresponding to each cache line when any one of the following Case 1, Case 2, and Case 3 occurs.
Case 1: A content of the corresponding tag 32A is updated.
Case 2: Cache hit of the corresponding cache line occurs.
Case 3: New sub-line is transferred to the corresponding cache line.

Case 1 includes the following (1) and (2).
(1) A new tag is stored in the tag corresponding to the replacement target cache line by the cache line replace operation.
(2) An invalid cache line is validated by storing a new tag in the tag corresponding to the invalid cache line (i.e., the corresponding valid bit is changed from "0" to "1").

As regards case 2, if the cache hit occurs, i.e., if the cache line associated with the tag which matches the upper bit portion of the logical address in a read command exists and the table data is already transferred to the sub-line in which the physical address corresponding to this logical address is to be stored, the controller 4 updates the time stamp corresponding to this cache line. If the cache line hit (bitmap miss) occurs, i.e., if the cache line associated with the tag which matches the upper bit portion of the logical address in a read command exists but the table data is not yet transferred to the sub-line in which the physical address corresponding to this logical address is to be stored, the controller 4 may update or may not update the time stamp corresponding to this cache line.

In Case 3, the controller 4 does not update the content of the tag 32A, but changes the bitmap flag corresponding to the newly transferred sub-line from a value indicative of invalidity to a value indicative of validity, and updates the time stamp corresponding to the cache line that includes this sub-line.

In the operation of updating the time stamp held in a certain shared storage region 32D, the controller 4 may first store the current value of the clock 41 for the time stamp in the shared storage region 32D and then update the current time of the clock 41 for time stamp such that the current value of the clock 41 for time stamp advances by one. Alternatively, the controller 4 may first update the current time of the clock 41 for time stamp such that the current value of the clock 41 for time stamp advances by one and then store the updated value of the clock 41 for time stamp in the shared storage region 32D.

A free-running clock which updates the count value irrespective of occurrence of events can also be employed as the clock 41 for the time stamp. In this case, when an event in which the time stamp needs to be updated occurs, the controller 4 may store the current count value of the free-running clock in the shared storage region 32D.

In the configuration illustrated in FIG. 23, if the shared storage region 32D corresponding to each cache line is selected to store the time stamp by the changeover switch 42 (i.e., LRU mode), the cache line corresponding to the oldest time stamp (i.e., the least recently used cache line) can be the replacement target. In contrast, if the shared storage region 329 corresponding to each cache line is selected to store the bitmap counter by the changeover switch 42 (i.e., bitmap counter mode), the cache line that includes the smallest number of transferred sub-lines can be set to the replacement target.

In this case, the time stamp value may be set to indicate a newer time as a larger value. Thus, even in a case which of the LRU mode and the bitmap counter mode is employed, the controller 4 may execute the operation of searching for the cache line having the smallest value stored in the shared storage region 32D, among all of the cache lines that are to be the replacement targets. If each shared storage region 32D holds the time stamp, the cache line having the smallest value of the shared storage region 32D is the cache line corresponding to the oldest time stamp, i.e., the least recently used cache line. If each shared storage region 32D holds the bitmap counter, the cache line having the smallest value of the shared storage region 32D is the cache line corresponding to the smallest number of transferred sub-lines.

A flowchart of FIG. 24 illustrates a procedure of a time stamp update operation.

In the LRU mode, if any one of events "update tag content", "cache hit occurs", and "transfer new sub-line to cache line" occurs (YES in step S71, YES in step S72, or YES in step S73), the controller 4 updates the time stamp in the corresponding shared storage region 32D (step S74). In step S74, the controller 4 may copy the current value of the clock 41 for the time stamp to the shared storage region 32D that is used as a time stamp storage region in the LRU mode and advance the current value of the clock 41 for the time stamp by one.

Figure 25:
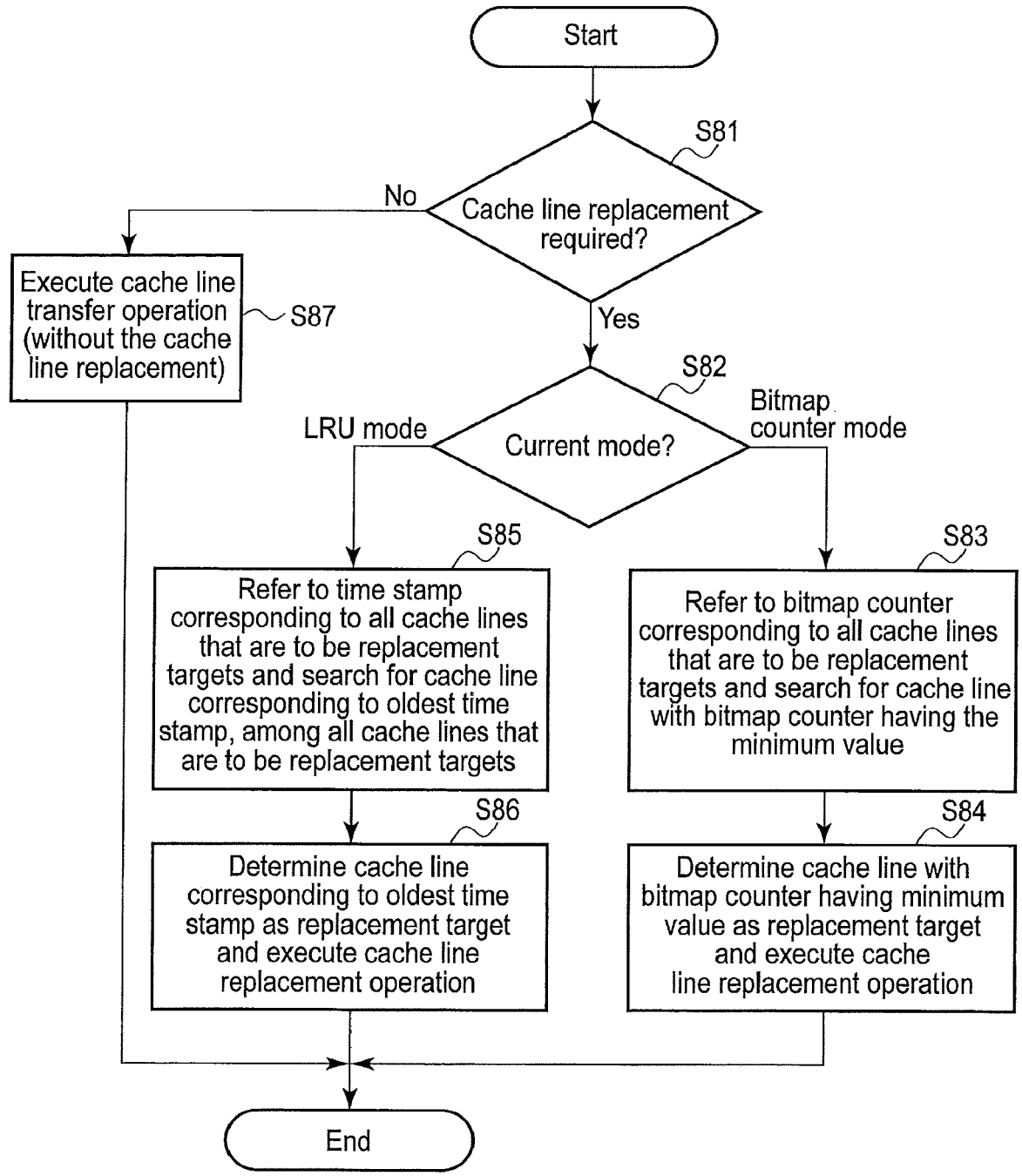
FIG. 25 is a flowchart illustrating a procedure of the operation of determining a replacement target cache line executed in the memory system of the first embodiment in a case where the address translation table cache tag includes the shared storage region for the time stamp and the bitmap counter corresponding to each cache line.

A flowchart of FIG. 25 illustrates a procedure of the operation of determining a replacement target cache line using values (i.e., a time stamp or a bitmap counter) of the shared storage region corresponding to each cache line.

For example, when a cache miss occurs, the controller 4 determines whether the cache line replacement is required or not (step S81). In step S81, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S81), the controller 4 determines whether the current mode is the LRU mode or the bitmap counter mode (step S82).

If the current mode is the bitmap counter mode, i.e., if the shared storage region 32D corresponding to each cache line is used to store the bitmap counter, the controller 4 refers to the bitmap counters (i.e., values of the storage region 32D) corresponding to all of the cache lines that are to be replacement targets, and searches for the cache line with the bitmap counter having the minimum value, among all of the cache lines that are to be replacement targets (step S83). In step S83, the controller 4 specifies the cache line with the bitmap counter having the minimum value by comparing the values of the bitmap counters among the cache lines which are to be replacement targets.

The controller 4 determines the cache line with the bitmap counter having the minimum value as the replacement target, and executes the cache line replacement operation of transferring the table data of one sub-line read from the NAND flash memory 5 to one of the plural sub-lines in the replacement target cache line (step S84).

On the other hand, if the current mode is the LRU mode, i.e., if the shared storage region 32D corresponding to each cache line is used to store the time stamp, the controller 4 refers to the time stamps (i.e., values of the storage region 32D) corresponding to all of the cache lines that are to be replacement targets, and searches for the cache line corresponding to the oldest time stamp, among all of the cache lines that are to be replacement targets (step S85). In step S85, the controller 4 specifies the cache line corresponding to the oldest time stamp, by comparing the time stamps among the cache lines which are to be replacement targets.

The controller 4 determines the cache line corresponding to the oldest time stamp as the replacement target, and executes the cache line replacement operation of transferring the table data of one sub-line read from the NAND flash memory 5 to one of the plural sub-lines in the replacement target cache line (step S86).

If an unused cache line exists in the cache lines which are to be replacement targets (i.e., in all of candidates for replacement target cache line), the controller 4 determines that the cache line replacement is not required.

If the cache line replacement is not required (NO in step S81), the controller 4 executes the cache line transfer operation (without the cache line replacement), i.e., the operation of transferring the table data to one of the plural sub-lines in the unused cache line (step S87).

As explained above, according to the first embodiment, when executing the cache line replacement, the cache line that includes the smallest number of transferred sub-lines is determined with priority as the replacement target, thereby the cache line that includes a small number of sub-lines in which the table data (i.e., address translation data) is cached can be evicted from the address translation table cache 31 with priority. Therefore, the content of the cache line that includes a large number of transferred sub-lines is not discarded, and can be maintained in the address translation table cache 31. As a result, since the address translation table cache 31 that holds a large number of transferred sub-lines can be maintained even after the cache replacement, improvement of the hit rate of the address translation table cache 31 can be achieved.

Second Embodiment

An operation of determining a replacement target cache line by using both of a time stamp and the number of transferred sub-line will be hereinafter explained as a second embodiment.

A hardware configuration of a storage device 3 according to the second embodiment is the same as that in the first embodiment and only portions different from the first embodiment will be mainly explained.

Figure 26:
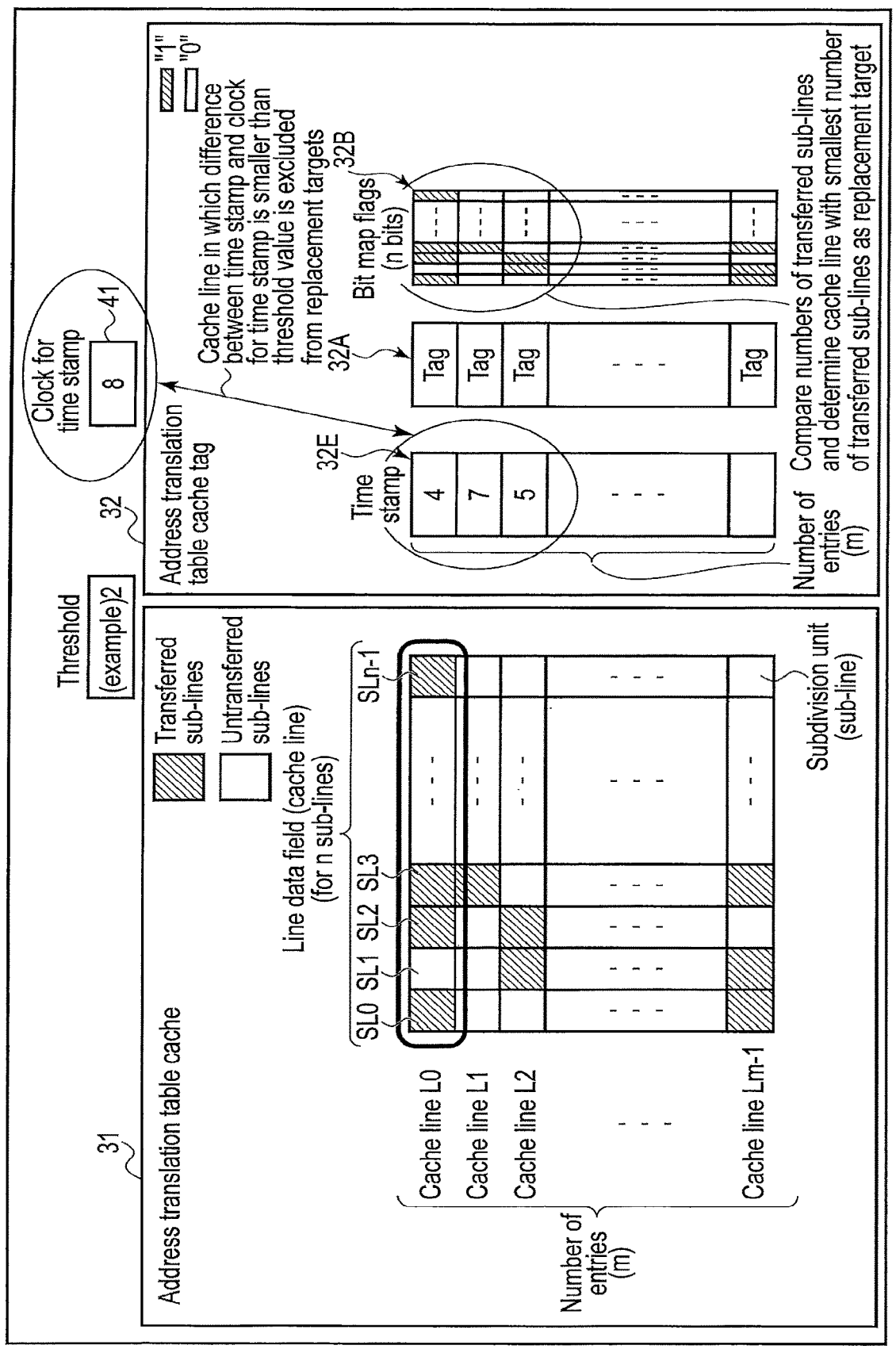
FIG. 26 is a diagram illustrating an example of a relationship between an address translation table cache and an address translation table cache tag, which are managed in a memory system of a second embodiment.

As illustrated in FIG. 26, in the second embodiment, each of the entries of an address translation table cache tag 32 holds not only a tag 32A and plural bitmap flags 32B, but also a time stamp 32E.

Values of plural time stamps 32E which correspond to plural cache lines, respectively, are updated based on a value of a clock 41 for time stamp, similarly to a time stamp stored in the above-explained shared storage region 32D. The controller 4 of the storage device 3 updates the time stamp in the same procedure as the time stamp update operation explained in the first embodiment, when any one of the following Cases 1, 2, and 3 occurs.

Case 1: A content of corresponding tag 32A is updated.
Case 2: Cache hit of corresponding cache line occurs.
Case 3: New sub-line is transferred to corresponding cache line.

In the second embodiment, the time stamp corresponding to each cache line is used to exclude one or more cache lines recently used from the replacement targets. The controller 4 determines the cache line that includes the smallest number of transferred sub-lines, among the rest of cache lines obtained by removing recently used cache lines from all of the cache lines that are to be the replacement targets, as the replacement target.

Even in a case where a certain cache line includes a small number of transferred sub-lines, if the cache line has a new time stamp (i.e., recently accessed cache line), the cache line may be accessed later at a comparatively high probability. In the second embodiment, one or more cache lines determined to be recently used cache lines are excluded from the replacement targets. Therefore, even if the cache line includes a small number of transferred sub-lines, the content of the cache line having a new time stamp is not discarded but maintained in the address translation table cache 31. The hit rate can be therefore improved.

As a method of discriminating the cache line which is to be excluded from the replacement targets, a method of excluding the cache line in which a difference between the corresponding time stamp and the current value of the clock 41 for the time stamp (i.e., the current latest time stamp) is smaller than a threshold value, from the replacement targets, can be employed.

The cache line in which the time stamp value is close to the current value of the clock 41 for time stamp is determined as the recently accessed cache line. In FIG. 26, it is assumed that cache lines L0, L1, and L2 are the cache lines which are to be the replacement targets (candidates for replacement target cache line) and the threshold value is set to "2". The number of transferred sub-lines included in the cache line L1 is the smallest of the candidates for replacement target cache line. However, a difference ("1") between the time stamp ("7") corresponding to the cache line L1 and the current value ("8") of the clock 41 for the time stamp is smaller than the threshold value ("2"). Therefore, the controller 4 excludes the cache line L1 from the replacement targets and determines the cache line that includes the smaller number of transferred sub-lines (e.g., the cache line L2), among the cache lines L0 and L2, as the replacement target. As a result, even the number of transferred sub-lines of the cache line L1 that is recently accessed is small, the content of the cache line L1 is not discarded but is maintained in the address translation table cache 31. The hit rate can be therefore improved.

A flowchart of FIG. 27 illustrates a procedure of an operation of determining a replacement target cache line using plural bitmap flags corresponding to each cache line and the time stamp corresponding to each cache line.

For example, when a cache miss occurs, the controller 4 determines whether the cache line replacement is required or not (step S91). In step S91, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S91), the controller 4 searches for the cache line that includes the smallest number of the transferred sub-lines, among the other candidates for replacement target excluding cache lines in which a difference between the time stamp and the current value of the clock 41 for the time stamp (i.e., the latest time stamp) is smaller than a threshold value (step S92). In step S92, the controller 4 refers to the bitmap flag corresponding to each of the other candidates for replacement target, and specifies the cache line that includes the smallest number of transferred sub-lines, by comparing the number of the transferred sub-lines among the other candidates for replacement target.

The controller 4 determines the cache line that includes the smallest number of transferred sub-lines, among the other candidates for replacement target, as the replacement target c, and executes the cache line replace operation of transferring the table data of one sub-line read from the NAND flash memory 5 to one sub-line of the plural sub-lines in the replacement target cache line (step S93).

If an unused cache line exists in the cache lines which are to be replacement targets (i.e., in all of candidates for replacement target cache line), the controller 4 determines that the cache line replacement is not required.

If the cache line replacement is not required (NO in step S91), the controller 4 executes the cache line transfer operation (without the cache line replacement), i.e., the operation of transferring the table data to one of the plural sub-lines in the unused cache line (step S94).

According to the operation of determining a replacement target cache line illustrated in FIG. 27, even in a case where a certain cache line includes a small number of transferred sub-lines, if the cache line is recently accessed, the cache line can be excluded from the replacement targets. Therefore, a state that the address translation table cache 31 holds a large number of transferred sub-lines can be maintained even after the cache line replacement, without discarding the content of the cache line which will be accessed at a high probability.

The bitmap counter 32C explained with reference to FIG. 18 may be added to each entry of the address translation table cache tag 32 illustrated in FIG. 26. In this case, in step S92, the controller 4 may specify the cache line with the bitmap counter having the minimum value, among the other candidates for replacement target excluding cache lines in which a difference between the time stamp and the current value of the clock 41 for the time stamp is smaller than a threshold value.

A flowchart of FIG. 28 illustrates another procedure of an operation of determining a replacement target cache line using the plural bitmap flags corresponding to cache line and the time stamp corresponding to each cache line.

For example, when a cache miss occurs, the controller 4 determines whether the cache line replacement is required or not (step S95). In step S95, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S95), the controller 4 searches for the cache line that includes the smallest number of transferred sub-lines, among all of the cache lines that are to be replacement targets (step S96). In step S96, the controller 4 refers to the plural bitmap flags corresponding to each of cache lines which are to be the replacement targets, and compares the number of transferred sub-lines among all of the cache lines that are to be the replacement targets.

The controller 4 determines whether the number of cache lines that include the smallest number of transferred sub-lines is two or more, i.e., whether not only one cache line includes the smallest number of transferred sub-lines, but plural cache lines that include the smallest number of transferred sub-lines are searched or not (step S97).

If only one cache line includes the smallest number of transferred sub-lines (NO in step S97), the controller 4 determines the cache line that includes the smallest number of transferred sub-lines as the replacement target, and executes the cache line replacement operation of transferring the table data of one sub-line read from the NAND flash memory 5 to one of the plural sub-lines in the replacement target cache line (step S98).

In contrast, if the number of cache lines that include the smallest number of transferred sub-lines is two or more, i.e., if plural cache lines include the smallest number of transferred sub-lines (YES in step S97), the controller 4 determines the cache line that includes the oldest time stamp, among two or more cache lines that include the smallest number of transferred sub-lines (i.e., cache lines that include the same number of transferred sub-lines), as the replacement target, and executes the cache line replacement operation of transferring the table data of one sub-line read from the NAND flash memory 5 to one of the plural sub-lines in the replacement target cache line (step S99).

Thus, if the number of cache lines that include the smallest number of transferred sub-lines is not one but plural, the cache line having an older time stamp can be determined with priority as the replacement target.

If an unused cache line exists in the cache lines which are to be replacement targets (i.e., in all of candidates for replacement target cache line), the controller 4 determines that the cache line replacement is not required.

If the cache line replacement is not required (NO in step S95), the controller 4 executes the cache line transfer operation (without the cache line replacement), i.e., the operation of transferring the table data to one of the plural sub-lines in the unused cache line (step S100).

The bitmap counter 32C explained with reference to FIG. 18 may be added to each entry of the address translation table cache tag 32 illustrated in FIG. 26. In this case, in step S96, the controller 4 may specify the cache line having the smallest value of the bitmap counter 32C.

Third Embodiment

An operation of determining a replacement target cache line by using the number of transferred dirty sub-lines will be hereinafter explained as a third embodiment.

A hardware configuration of a storage device 3 according to the third embodiment is the same as that in the first embodiment, and only portions different from the first embodiment will be mainly explained.

In the third embodiment, the dirty sub-line means a sub-line of which content is not reflected to the address translation table 7 in a NAND flash memory 5. In other words, the dirty sub-line is indicative of a sub-line holding the table data which is not reflected to the address translation table 7 in the NAND flash memory 5. For example, if the only table data of a certain transferred sub-line is updated and the corresponding table data in the address translation table 7 is not yet updated, this transferred sub-line is a transferred dirty sub-line.

If the cache line that includes a large number of dirty sub-lines is set as the replacement target, the amount of data needed to be written to the NAND flash memory 5 at the cache line replacement might be increased, and the time required for the cache line replacement operation might be thereby long.

In the third embodiment, the controller 4 can determine the replacement target cache line by considering the number of sub-lines storing data unreflected to the NAND flash memory 5 (i.e., the dirty sub-lines).

Figure 29:
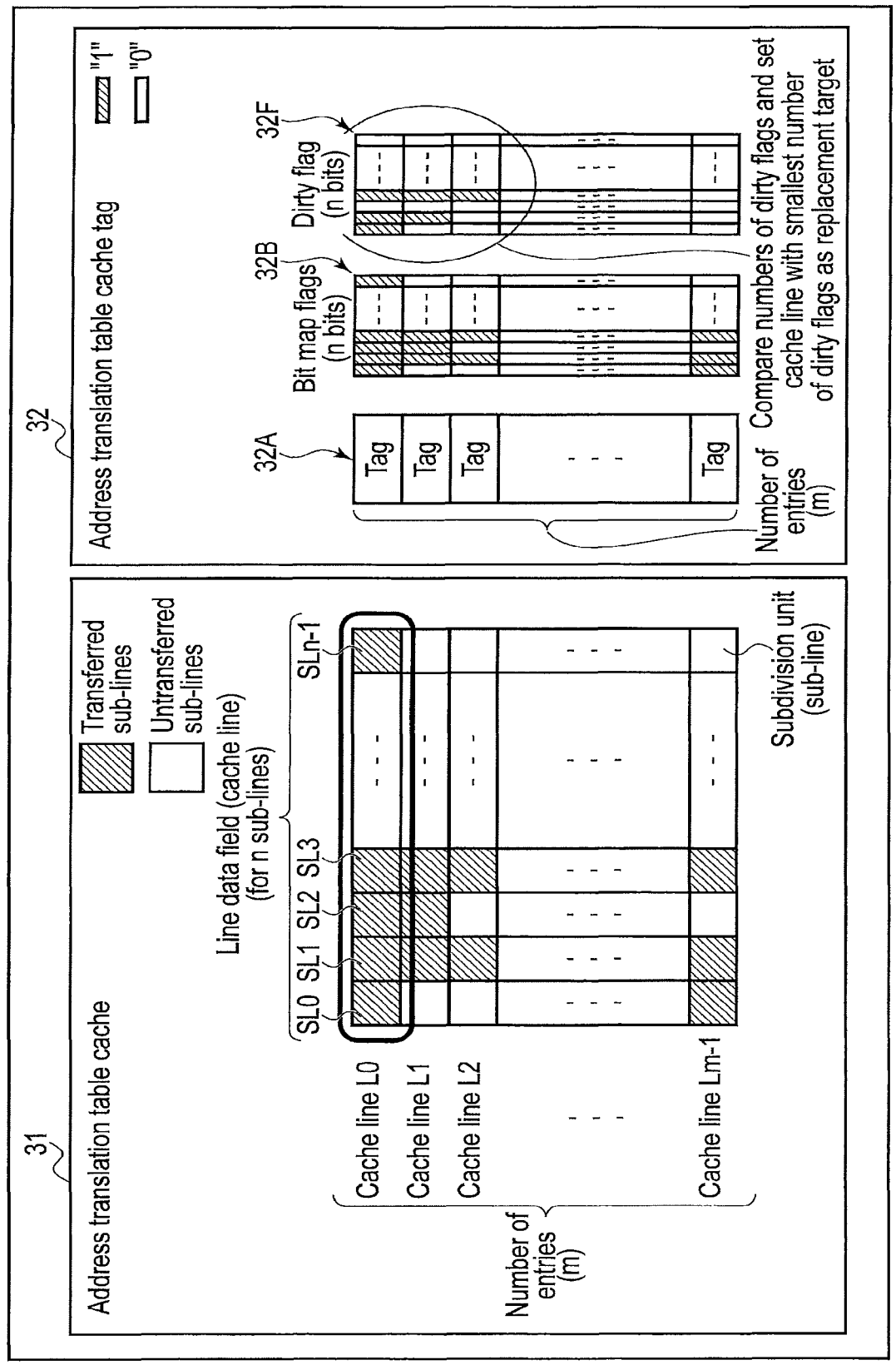
FIG. 29 is a diagram illustrating an example of a relationship between an address translation table cache and an address translation table cache tag, which are managed in a memory system of a third embodiment.

As illustrated in FIG. 29, in the third embodiment, each of the entries of the address translation table cache tag 32 holds not only the tag 32A and the plural bitmap flags 32B, but also plural dirty flags 32F.

Each of the dirty flags 32F indicates whether the table data stored in the corresponding sub-line is updated data unreflected to the NAND flash memory 5 or not, i.e., whether the data in the corresponding sub-line is dirty data or not. When the controller 4 transfers the updated data unreflected to the NAND flash memory 5 to a certain sub-line, the controller 4 updates the dirty flag 32F corresponding to this sub-line from, for example, "0" to "1". In this case, the dirty flag 32F "1" indicates that the corresponding sub-line is a dirty sub-line. When the controller 4 writes the data in the dirty sub-line to the NAND flash memory 5, the controller 4 updates the dirty flag 32F corresponding to this sub-line from, for example, "1" to "0".

A flowchart of FIG. 30 illustrates a procedure of an operation of determining a replacement target cache line using plural dirty flags corresponding to each cache line.

For example, when a cache miss occurs, the controller 4 determines whether the cache line replacement is required or not (step S101). In step S101, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S101), the controller 4 searches for the cache line that includes the smallest number of transferred sub-lines, among all of the cache lines that are to be replacement targets (step S102). In step S102, the controller 4 refers to plural bitmap flags corresponding to each of cache lines which are to be the replacement targets, and compares the number of transferred sub-lines among all of the cache lines that are to be the replacement targets.

The controller 4 determines whether the number of cache lines that include the smallest number of transferred sub-lines is two or more, i.e., whether not only one cache line includes the smallest number of transferred sub-lines, but plural cache lines include the smallest number of transferred sub-lines (step S103).

If only one cache line includes the smallest number of transferred sub-lines (NO in step S103), the controller 4 determines the cache line that includes the smallest number of transferred sub-lines as the replacement target, and executes the cache line replacement operation of transferring the table data of one sub-line read from the NAND flash memory 5 to one of the plural sub-lines in the replacement target cache line (step S104).

In contrast, if two or more cache lines include the smallest number of transferred sub-lines (YES in step S103), the controller 4 determines the cache line that includes the smallest number of dirty sub-lines, among two or more cache lines that include the smallest number of transferred sub-lines, as the replacement target, and executes the cache line replacement operation of transferring the table data of one sub-line read from the NAND flash memory 5 to one of the plural sub-lines in the replacement target cache line (step S105).

Thus, if the number of cache lines that include the smallest number of transferred sub-lines is not one but plural, the cache line that includes a smaller number of dirty sub-lines can be determined with priority as the replacement target.

If an unused cache line exists in the cache lines which are to be replacement targets (i.e., in all of candidates for replacement target cache line), the controller 4 determines that the cache line replacement is not required.

If the cache line replacement is not required (NO in step S101), the controller 4 executes the cache line transfer operation (without the cache line replacement), i.e., the operation of transferring the table data to one of the plural sub-lines in the unused cache line (step S106).

In other embodiments, the controller 4 can also determine the replacement target cache line by only considering the number of transferred dirty sub-lines. In this case, the controller 4 may determine the cache line that includes the smallest number of transferred dirty sub-lines, among all of the cache lines that are to be the replacement targets, as the replacement target.

The bitmap counter 32C explained with reference to FIG. 18 may be added to each entry of the address translation table cache tag 32 illustrated in FIG. 29. In this case, in step S102, the controller 4 may specify the cache line having the smallest value of the bitmap counter. In addition, a dirty flag counter indicative of the number of dirty flags "1" may be added to each entry of the address translation table cache tag 32 illustrated in FIG. 29. In this case, in step S105, the controller 4 may specify the cache line having the smallest value of the dirty flag counter.

A flowchart of FIG. 31 illustrates a procedure of a cache line replacement operation applied to the configuration that the address translation table cache tag 32 includes plural dirty flags corresponding to each cache line.

The controller 4 first specifies the sub-line which is included in the replacement target line and of which the dirty flag is a value indicative of validity (for example, "1") (step S111). The sub-line of which the dirty flag is a value indicative of validity is the dirty sub-line.

The controller 4 writes the table data in each sub-line of which the dirty flag is a value indicative of validity (for example, "1") to the address translation table 7 in the NAND flash memory 5. In other words, the controller 4 writes each updated table data back to the address translation table 7 in the NAND flash memory 5 to reflect the content of each updated table data to the address translation table 7 (step S112).

The controller 4 executes (1) an operation of invalidating the replacement target cache line by setting the valid bit (VB) corresponding to the replacement target cache line to a value indicative of invalidity (for example, "0"), and (2) an operation of invalidating all of the sub-lines in the replacement target cache line by clearing all of the bitmap flags and all of the dirty flags corresponding to the replacement target cache line to a value indicative of invalidity (for example, "0") (step S113).

The controller 4 reads the table data of one sub-line that includes a desired physical address, from the address translation table 7 in the NAND flash memory 5, and transfers the read table data of one sub-line to one specific sub-line in the replacement target cache line (step S114). This specific sub-line is determined by a logical address included in a read command which causes the cache miss.

The controller 4 executes (1) an operation of updating the content of the tag corresponding to the replacement target cache line to the tag field in the logical address included in the read command, (2) an operation of updating the bitmap flag corresponding to the transferred sub-line (i.e., the specific sub-line) of the replacement target cache line, to a value indicative of validity (for example, "1"), and (3) an operation of updating the valid bit (VB) corresponding to the replacement target cache line to a value indicative of validity (for example, "1") (step S115).

Fourth Embodiment

An operation of determining a replacement target cache line by using bitmap flag, dirty flag, and time stamp will be hereinafter explained as a fourth embodiment.

A hardware configuration of a storage device 3 according to the fourth embodiment is the same as that in the first embodiment, and only portions different from the first embodiment will be mainly explained.

Figure 32:
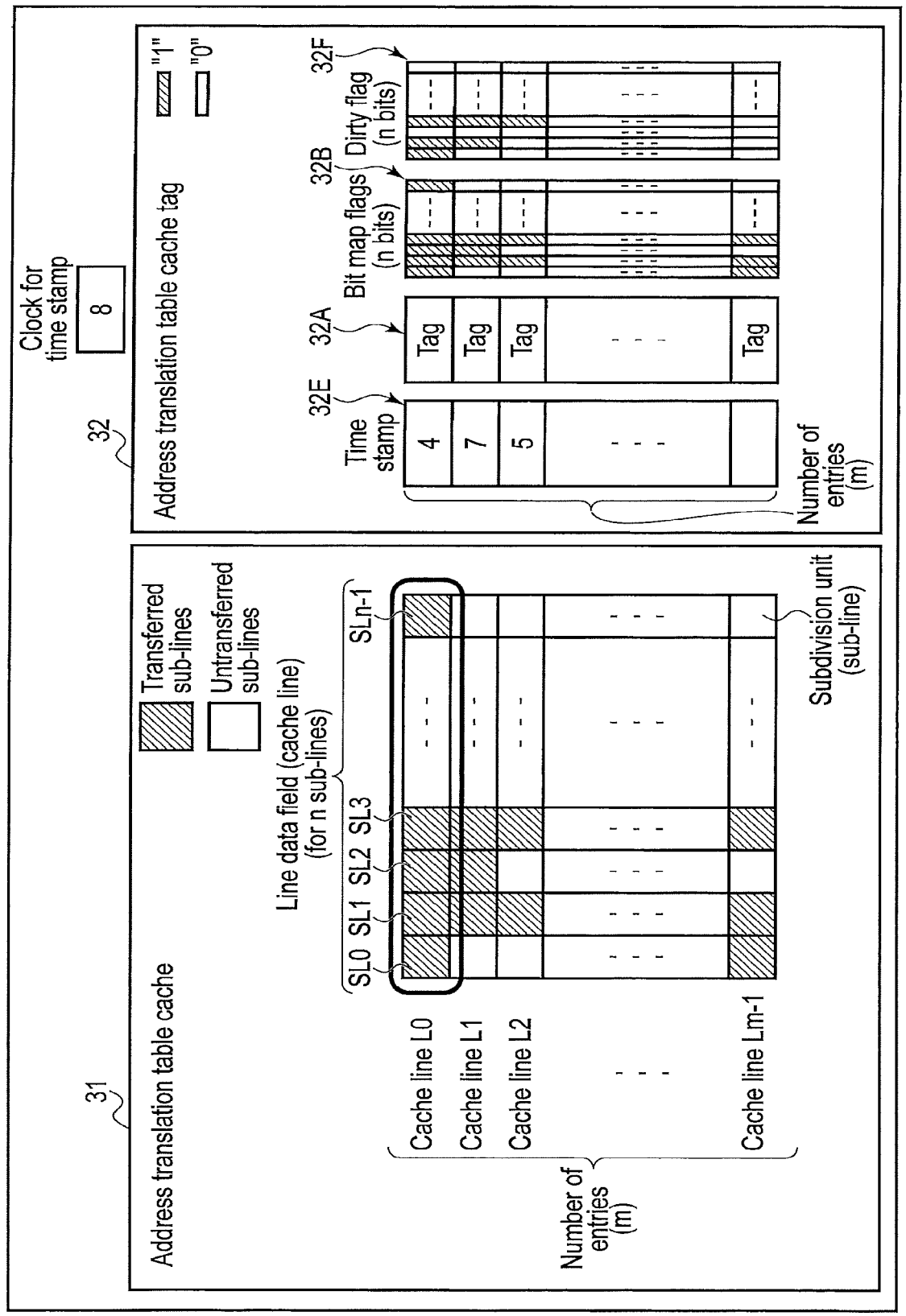
FIG. 32 is a diagram illustrating an example of a relationship between an address translation table cache and an address translation table cache tag, which are managed in a memory system of a fourth embodiment.

As illustrated in FIG. 32, in the fourth embodiment, each of the entries of the address translation table cache tag 32 holds not only the tag 32A and the plural bitmap flags 32B, but also the time stamp 32E and the plural dirty flags 32F.

Figure 33:
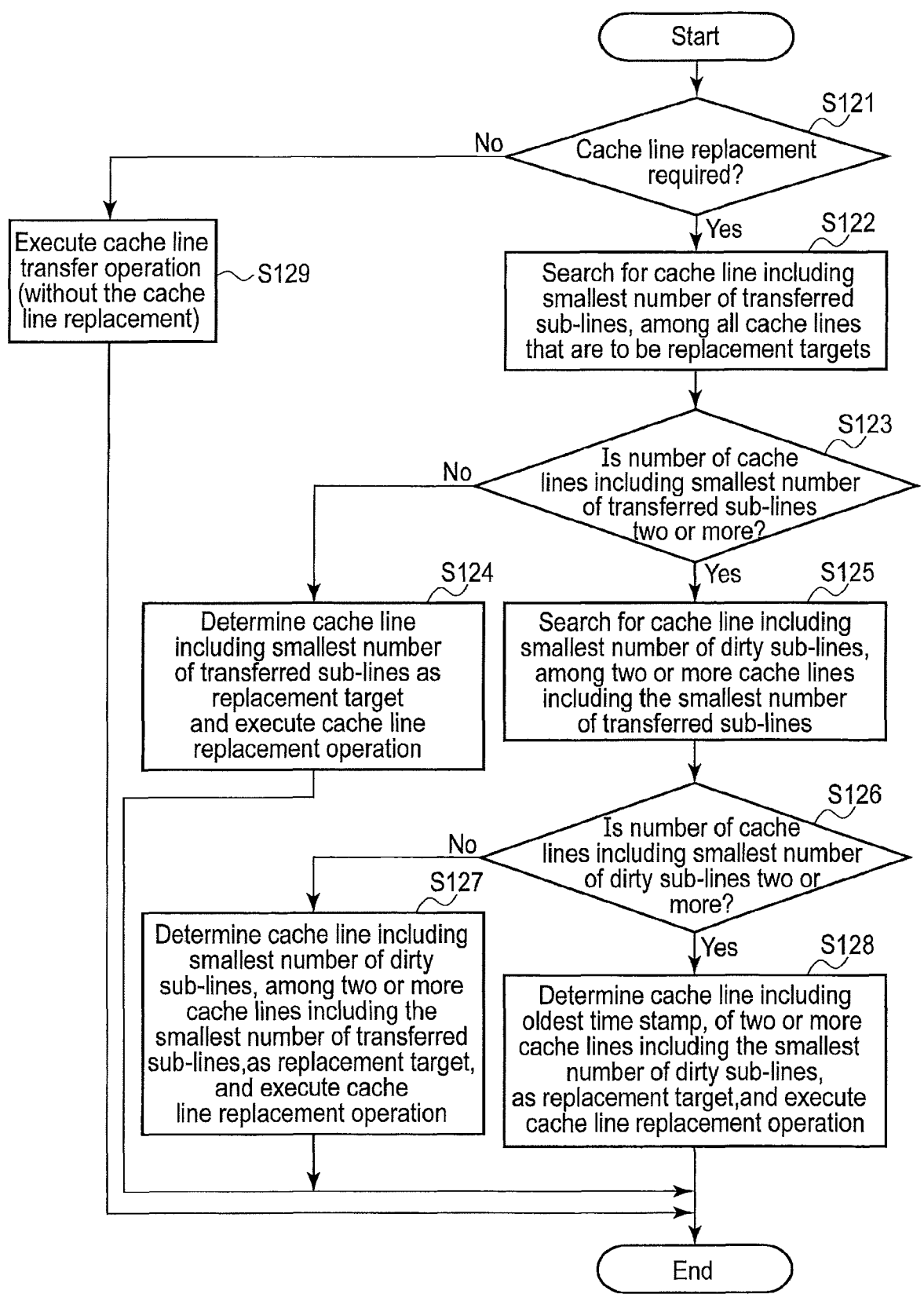
FIG. 33 is a flowchart illustrating a procedure of an operation of determining a replacement target cache line executed in the memory system of the fourth embodiment, using plural bitmap flags corresponding to each cache line, plural dirty flags corresponding to each cache line, and a time stamp corresponding to each cache line.

A flowchart of FIG. 33 illustrates a procedure of an operation of determining a replacement target cache line according to the fourth embodiment.

For example, when a cache miss occurs, the controller 4 determines whether the cache line replacement is required or not (step S121). In step S121, the controller 4 determines whether or not an unused cache line exists in the cache lines which are to be replacement targets (i.e., in all of candidates for replacement target cache line). If an unused cache line does not exist, the controller 4 determines that the cache line replacement is required.

If the cache line replacement is required (YES in step S121), the controller 4 searches for the cache line that includes the smallest number of transferred sub-lines, among all of the cache lines that are to be the replacement targets (step S122). In step S122, the controller 4 compares the number of transferred sub-lines among all of the cache lines that are to be replacement targets.

The controller 4 determines whether the number of cache lines that include the smallest number of transferred sub-lines is two or more, i.e., whether not only one cache line includes the smallest number of transferred sub-lines, but two or more cache lines include the smallest number of transferred sub-lines (step S123).

If only one cache line includes the smallest number of transferred sub-lines (NO in step S123), the controller 4 determines the cache line that includes the smallest number of transferred sub-lines as the replacement target, and executes the cache line replacement operation of transferring the table data of one sub-line read from the NAND flash memory 5 to one of the plural sub-lines in the replacement target cache line (step S124).

In contrast, if two or more cache lines include the smallest number of transferred sub-lines (YES in step S123), the controller 4 searches for the cache line that includes the smallest number of dirty sub-lines, among the two or more cache lines that include the smallest number of transferred sub-lines (step S125). In step S125, the controller 4 compares the number of dirty sub-lines among the two or more cache lines that include the smallest number of transferred sub-lines.

The controller 4 determines whether the number of cache lines that include the smallest number of dirty sub-lines is two or more, i.e., whether not only one cache line includes the smallest number of dirty sub-lines, but two or more cache lines include the smallest number of dirty sub-lines (step S126).

If only one cache line includes the smallest number of dirty sub-lines (NO in step S126), the controller 4 determines the cache line that includes the smallest number of dirty sub-lines, among two or more cache lines that include the smallest number of transferred sub-lines, as the replacement target, and executes the cache line replacement operation of transferring the table data of one sub-line read from the NAND flash memory 5 to one of the plural sub-lines in the replacement target cache line (step S127).

In contrast, if the number of cache lines that include the smallest number of dirty sub-lines is two or more (YES in step S126), the controller 4 determines the cache line that includes the oldest time stamp, among the two or more cache lines that include the smallest number of dirty sub-lines, as the replacement target, and executes the cache line replacement operation of transferring the table data of one sub-line read from the NAND flash memory 5 to one of the plural sub-lines in the replacement target cache line (step S128).

Thus, if the number of cache lines that include the smallest number of transferred sub-lines is not one but plural, the cache line that includes the smallest number of dirty sub-lines can be determined with priority as the replacement target. In addition, if the number of cache lines that include the smallest number of dirty sub-lines is not one but plural, the cache line having an older time stamp can be determined with priority as the replacement target.

If an unused cache line exists in the cache lines which are to be the replacement targets (i.e., in all of candidates for replacement target cache line), the controller 4 determines that the cache line replacement is not required.

If the cache line replacement is not required (NO in step S121), the controller 4 executes the cache line transfer operation (without the cache line replacement), i.e., the operation of transferring the table data to one of the plural sub-lines in the unused cache line (step S129).

The bitmap counter 32C and the dirty flag counter may be added to each entry of the address translation table cache tag 32 illustrated in FIG. 32. In this case, in step S122, the controller 4 may specify the cache line having the smallest value of the bitmap counter. In addition, in step S125, the controller 4 may specify the cache line having the smallest value of the dirty flag counter.

Fifth Embodiment

A configuration of the controller 4 that includes a cache for host memory will be hereinafter explained as a fifth embodiment.

As illustrated in FIG. 34, the address translation table cache 31 is placed in the host memory (e.g., the device usage region 22B of the main memory 22). The device usage region 22B is also used to store not only the address translation table cache 31, but also other data used by the controller 4. The other data may be, for example, a parity for erasure correction for data written to the NAND flash memory 5. In the host memory (i.e., in the device usage region 22B of the main memory 22), a memory region of a certain address range (e.g., an address range from address A to address B) is used to store the address translation table cache 31, and a memory region of another address range (e.g., an address range from address X to address Y) is used to store the other data.

In a storage device 3, the controller 4 includes not only the host interface 11, the CPU 12, the RAM 13, and the backend unit 14 which are explained above, but also a cache 51 for the host memory to accelerate access to the address translation table cache 31 in the host memory. The cache 51 is deployed between the bus 10 and the host interface 11. The cache 51 is configured to cache data (e.g., table data, parity, and the like) which are to be written to the host memory, to a cache region (e.g., SRAM 51A). The cache 51 may be implemented as a write-back type cache. In this case, if no unused cache line exist in the cache region in the cache 51, the cache 51 discards the data stored in the replacement target cache line in the cache region or writes the data stored in the replacement target cache line back to the host memory, and stores new data which is to be written to the host memory in the replacement target cache line.

The controller 4 may further include several hardware accelerators, for example, a hardware accelerator (HWA #1) 52A and a hardware accelerator (HWA #2) 52B. The hardware accelerator (HWA #1) 52A is dedicated hardware for executing an address solution operation of translating the logical address into the physical address. The hardware accelerator (HWA #2) 52B is dedicated hardware for executing an operation of writing the above-explained parity to the host memory, an operation of reading the parity from the host memory, and the like. Each of the hardware accelerator (HWA #1) 52A and the hardware accelerator (HWA #2) 52B is implemented as a bus master capable of executing a memory access. The hardware accelerator (HWA #1) 52A can issue a write request to store table data to the address translation table cache 31 on the host memory, and the hardware accelerator (HWA #2) 52B can issue a write request to store other data such as the parity to the host memory.

FIG. 35 illustrates a configuration example of the cache 51.

The cache 51 includes SRAM 51A which functions as the cache and a cache controller 51B which is a circuit to control the cache. The SRAM 51A includes a cache region 61A that includes plural cache lines CL0, CL1, CL2, . . . and a cache tag region 61B that includes plural entries respectively corresponding to the plural cache lines. The size of each of the cache lines CL0, CL1, CL2, . . . may be the same as the size of one sub-line or may be different from the size of one sub-line.

Each entry of the cache tag region 61B may include a valid bit (VB), a tag, usage information, and a dirty flag. The usage information of each entry is used to determine the replacement target cache line in the cache tag region 61B. As a replace policy for determining the replacement target cache line in the cache tag region 61B, LRU may be used or another policy may be used.

For example, in a case where the cache 51 is implemented as five-way set-associative cache, the usage information having different priorities are assigned to five cache lines corresponding to a certain specific set (i.e., five cache lines of five ways). If the replace policy is the LRU, the usage information having a priority to enable a corresponding cache line to be replaced most unlikely (i.e., usage information having a priority most unlikely replaced) is assigned to the most recently accessed cache line.

The dirty flag indicates whether the corresponding cache line is a dirty cache line or not. The dirty cache line is indicative of a cache line whose content is not reflected to the host memory. In other words, the dirty cache line is indicative of a cache line which stores the data unreflected to the host memory.

Figure 36:
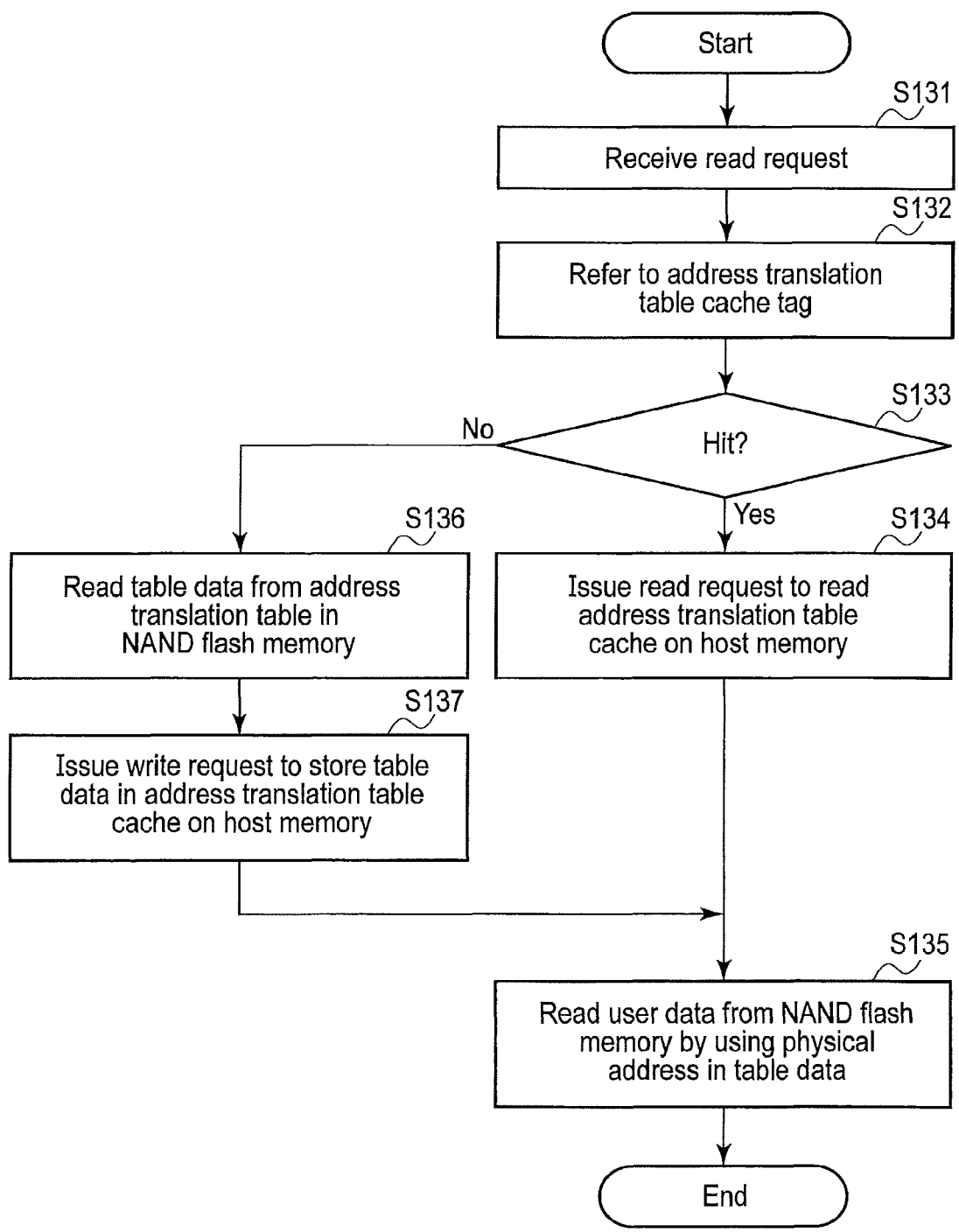
FIG. 36 is a flowchart illustrating a procedure of processing executed by a CPU or hardware accelerator (HWA) in the memory system of the fifth embodiment when receiving a read request from a host.

A flowchart of FIG. 36 illustrates a procedure of read processing executed by the CPU 12 or the hardware accelerator (HWA #1) 52A when receiving a read request (e.g., read command) from the host 2.

When the CPU 12 or the hardware accelerator (HWA #1) 52A receives the read request (e.g., read command) from the host 2 (step S131), the CPU 12 or the hardware accelerator (HWA #1) 52A refers to the address translation table cache tag 32 and determines cache hit/miss of the address translation table cache 31 on the host memory (step S132).

If the table data that includes a physical address corresponding to a logical address in the read command exists in the address translation table cache 31 on the host memory (i.e., cache hit) (YES in step S133), the CPU 12 or the hardware accelerator (HWA #1) 52A issues a read request to read the table data from the address translation table cache 31 on the host memory and acquires the table data that includes the physical address corresponding to the logical address (step S134). Since the issued read request is transmitted to the cache 51, if the table data exists in the cache region 61A in the cache 51, the cache controller 51B of the cache 51 reads the table data from the cache region 61A and returns the read table data to the CPU 12 or the hardware accelerator (HWA #1) 52A. The details of this operation will be explained later with reference to steps S143 and S144 of FIG. 37. If the table data does not exist in the cache region 61A in the cache 51, the cache controller 51B transmits the read request to the host 2 via the host interface 11. The details of this operation will be explained later with reference to step S143 and steps S145 to S152 of FIG. 37.

The CPU 12 or the hardware accelerator (HWA #1) 52A read-accesses the NAND flash memory 5 by using a physical address included in the acquired table data and reads the user data from the NAND flash memory 5 (step S135).

If the table data that includes the physical address corresponding to the logical address in the read command does not exist in the address translation table cache 31 on the host memory (cache miss or bitmap miss) (NO in step S133), the CPU 12 or the hardware accelerator (HWA #1) 52A reads the table data from the address translation table 7 in the NAND flash memory 5 (step S136). The CPU 12 or the hardware accelerator (HWA #1) 52A issues a write request to store the read table data into the address translation table cache 31 on the host memory (step S137). Then, the CPU 12 or the hardware accelerator (HWA #1) 52A read-accesses the NAND flash memory 5 by using a physical address included in the read table data, and reads the user data from the NAND flash memory 5 (step S135). The procedure of first executing the processing in step S137 and then executing the processing in step S135 is explained, but the processing in step S135 may be first executed and then the processing in step S137 may be executed. In other words, either of the table data transfer to the address translation table cache 31 on the host memory and the user data read from the NAND flash memory 5 may be first executed. In the cache control processing explained with reference to FIG. 8 and FIG. 10, too, either of the table data transfer to the address translation table cache 31 on the host memory and the user data read from the NAND flash memory 5 may be first executed.

A flowchart of FIG. 37 illustrates a procedure of operations executed by the cache 51 (more specifically, cache controller 51B) when receiving a read request to read table data from the address translation table cache 31 on the host memory.

When the cache 51 receives, from the CPU 12 or the hardware accelerator (HWA #1) 52A, the read request to read the table data from the address translation table cache 31 on the host memory (YES in step S141), the cache controller 51B of the cache 51 refers to the cache tag region 61B and determines whether the table data of one sub-line designated by the read request exists in the cache region 61A or not (step S142).

If the table data exists in the cache region 61A (i.e., cache hit) (YES in step S143), the cache controller 51B reads the table data from the cache region 61A and returns the read table data to the CPU 12 or the hardware accelerator (HWA #1) 52A (step S144).

If the table data of one sub-line does not exist in the cache region 61A (cache miss) (NO in step S143), the cache controller 51B transmits the read request to the host 2 via the host interface 11 and reads the table data of one sub-line from the address translation table cache 31 on the host memory (step S145).

The cache controller 51B determines whether an available cache line capable of storing the table data (i.e., at least one cache line capable of storing the table data) exists in the cache region 61A or not (step S146).

If the empty cache line capable of storing the table data (i.e., at least one empty cache line capable of storing the table data) does not exist in the own cache region 61A (NO in step S146), the cache controller 51B refers to the usage information (e.g., priority) of each of the cache lines which are to be the replacement target in the cache region 61A and determines the replacement target cache line in the cache region 61A (step S147).

The cache controller 51B refers to the dirty flag corresponding to the replacement target cache line and determines whether the replacement target cache line is a dirty cache line whose content is not reflected to the host memory or not (step S148).

If the replacement target cache line is the dirty cache line (YES in step S148), the cache controller 51B writes the content (i.e., table data or parity) of the replacement target cache line back to the host memory (step S149).

If the replacement target cache line is not the dirty cache line (NO in step S148), the cache controller 51B discards the content (i.e., table data or parity) of the replacement target cache line (step S150).

After executing the processing in step S149 or step S150, the cache controller 51B stores the table data read from the address translation table cache 31 on the host memory, into the replacement target cache line of the cache region 61A (step S151). Then, the cache controller 51B returns the table data to the CPU 12 or the hardware accelerator (HWA #1) 52A (step S152).

If the available cache line capable of storing the table data (i.e., at least one cache line capable of storing the table data) exists in the cache region 61A (YES in step S146), the cache controller 51B skips execution of the processing in steps S147 to S150.

Figure 38:
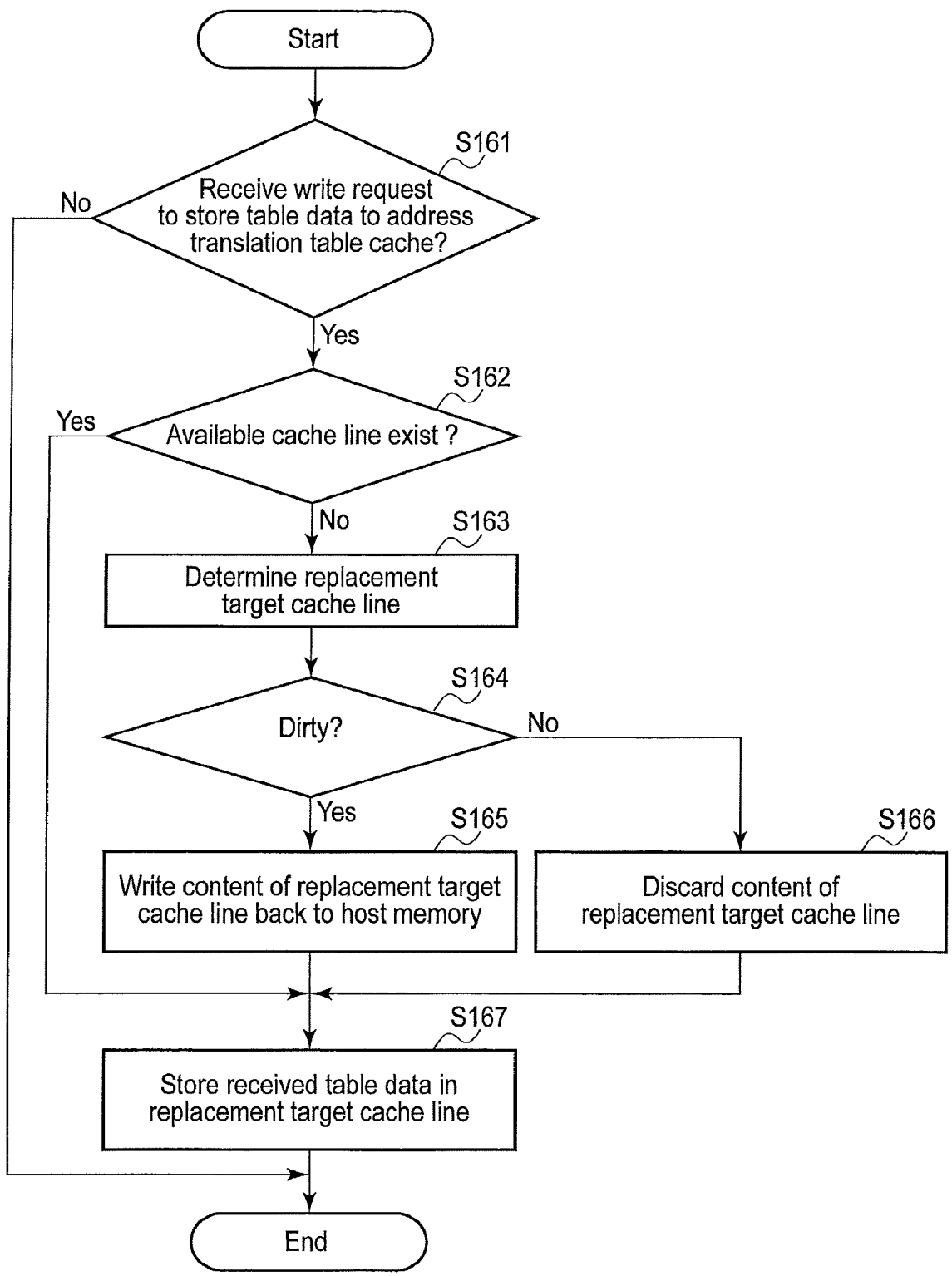
FIG. 38 is a flowchart illustrating a procedure of an operation executed by the cache illustrated in FIG. 33 when receiving a write request to store the table data in the address translation table cache.

A flowchart of FIG. 38 illustrates a procedure of operations executed by the cache 51 (more specifically, cache controller 51B) when receiving a write request to store the table data to the address translation table cache 31 on the host memory.

When the cache controller 51B of the cache 51 receives, from the CPU 12 or the hardware accelerator (HWA #1) 52A, the write request to store the table data of one sub-line in the address translation table cache 31 on the host memory (YES in step S161), the cache controller 51B determines whether an available cache line capable of storing the table data (i.e., at least one cache line capable of storing the table data) exists in the own cache region 61A or not (step S162).

If the available cache line capable of storing the table data (i.e., at least one cache line capable of storing the table data) does not exist in the cache region 61A (NO in step S162), the cache controller 51B refers to the usage information (e.g., priority) of each of the cache lines which are to be the replacement target in the cache region 61A and determines the replacement target cache line in the cache region 61A (step S163).

The cache controller 51B refers to the dirty flag corresponding to the replacement target cache line and determines whether the replacement target cache line is a dirty cache line whose content is not reflected to the host memory or not (step S164).

If the replacement target cache line is the dirty cache line (YES in step S164), the cache controller 51B writes the content (i.e., table data or parity) of the replacement target cache line back to the host memory (step S165).

If the replacement target cache line is not the dirty cache line (NO in step S164), the cache controller 51B discards the content (i.e., table data or parity) of the replacement target cache line (step S166).

After executing the processing in step S165 or S166, the cache controller 51B stores the table data received from the CPU 12 or the hardware accelerator (HWA #2) 52B, into the replacement target cache line (step S167).

A flowchart of FIG. 39 illustrates a procedure of an operation of writing a parity for erasure correction for the user data which is written to the NAND flash memory 5, into the host memory.

When the parity for erasure correction for the user data which is written to the NAND flash memory 5 needs to be written into the host memory (YES in step S171), the CPU 12 or the hardware accelerator (HWA #2) 52B issues a write request to store the parity into the host memory (step S172).

When receiving the write request from the CPU 12 or the hardware accelerator (HWA #2) 52B, the cache 51 (more specifically, cache controller 51B) executes an operation of storing the parity in the cache region 61A, an operation of discarding the content of the replacement target cache line or writing the content of the replacement target cache line back to the host memory, and the like, in the same procedure as the procedure explained with reference to FIG. 38.

In addition, when receiving a read request, from the CPU 12 or the hardware accelerator (HWA #2) 52B, to read the parity from the host memory, the cache 51 (more specifically, cache controller 51B) executes an operation of reading the parity from the cache region 61A or the host memory, an operation of discarding the content of the replacement target cache line or writing the content of the replacement target cache line back to the host memory, and the like, in the same procedure as the procedure explained with reference to FIG. 37.

Thus, the cache 51 is configured to cache not only the table data, but other data such as the parity to the cache region 61A. In other words, the cache 51 is configured to cache the table data which is to be stored in the address translation table cache 31 in the host memory and other data (for example, parity) which is to be stored in the host memory.

However, the parity is not used unless a trouble such as data erasure (or, data lost) occurs and, even if the parity is cached to the cache 51, the cached parity is rarely used. In addition, the size of the parity is generally very large. Therefore, if the CPU 12 or the hardware accelerator (HWA #2) 52 issues the write request to store the parity in the host memory, a number of cache lines in the cache 51 are occupied by the parity having a small use frequency. This can be a factor which degrades the hit rate of the table data in the cache 51.

Thus, the cache controller 51B of the cache 51 is configured to more preferentially determine the cache line in which the other data such as the parity is stored, as a replacement target cache line, than the cache line in which the table data of the address translation table 7 is stored. In this case, if the write address of the data which is to be written to the cache line belongs to the address range of the storage region on the host memory (e.g., address X to address Y) in which the other data such as the parity is to be stored, the cache controller 51B of the cache 51 stores the priority with a value which enables this cache line to be replaced likely in the entry of the cache tag region 61B, which corresponds to this cache line. For example, when storing the data which is to be written to the address range corresponding to the other data, in a cache line of the cache region 61A, the cache controller 51B may store the priority to preferentially select the cache line as the replacement target cache line (i.e., the priority which enables the cache line to be replaced likely), in the entry of the cache tag region 61B, which corresponds to this cache line. The cache line in which the parity is stored can be thereby preferentially determined as the replacement target cache line. As a result, when new table data is to be cached to the cache 51 (more specifically, cache region 61A), the only cache line in which the parity is stored can be preferentially evicted from the cache 51 while maintaining each cache line already storing the table data in the cache 51.

FIG. 40 illustrates an operation of allocating the priority (usage information) which enables the corresponding cache line to be likely replaced to the write data to be written into a preferred replacement region in the host memory.

The preferred replacement region in the host memory is a storage region on the host memory corresponding to data which is to be preferentially evicted from the cache 51. In the fifth embodiment, the storage region having a specific address range (i.e., an address range from address X to address Y), that is, the storage region in which the other data such as the parity is stored is the preferred replacement region in the host memory.

It is assumed below that the cache 51 is a five-way set-associative cache. The usage information indicative of any one of values (priorities) zero to four is allocated to each of five cache lines corresponding to five ways in each set. It is assumed that the cache line with a smaller value of the usage information (i.e., priority) is accessed more recently (i.e., the cache line is more unlikely replaced).

It is assumed that usage information of value zero, usage information of value two, usage information of value three, usage information of value four, and usage information of value one are allocated to five cache lines A, B, C, D, and E corresponding to five ways in a certain set. If a store destination cache line (store destination way number) of the data which is to be written to the preferred replacement region is C, the data is stored in cache line C, and the value of the usage information of the cache line C is updated to the maximum value (four, in this example) which enables the cache line C to be replaced most likely. As for the cache line D to which the usage information of the value larger than the original value of the usage information of the cache line C (three, in this example) is allocated, the value of the usage information is updated to a newer value by one. In this case, the usage information of the cache line D is updated to value three obtained by subtracting one from the original value four of the usage information of the cache line D. As for the cache lines A, B, and E to which the usage information of the values smaller than the original value of the usage information of the cache line C (three, in this example) are allocated, the values of the usage information are not updated but maintained at the original values.

As illustrated in FIG. 41, if the store destination cache line (store destination way number) of the data which is to be written to the preferred replacement region is B, the data is stored in cache line B, and the value of the usage information of the cache line B is updated to the maximum value (four, in this example) for enabling the cache line B to be replaced most likely. As for the cache lines C and D to which the usage information of the values larger than the original value of the usage information of the cache line B (two, in this example) are allocated, each value of the usage information is updated to the newer value by one. In this case, the usage information of the cache line C is updated to value two obtained by subtracting one from the original value three of the usage information of the cache line C. The usage information of the cache line D is updated to value three obtained by subtracting one from the original value four of the usage information of the cache line D. As for the cache lines A and E to which the usage information of the values smaller than the original value of the usage information of the cache line B (two, in this example) are allocated, the values of the usage information are not updated but maintained at the original values.

FIG. 42 illustrates an operation of allocating the usage information which enables the corresponding cache line to be unlikely replaced, for the write data in the region in the host memory other than the preferred replacement region.

In the fifth embodiment, the storage region having a specific address range (i.e., an address range from address A to address B), that is, the storage region in which the address translation table cache 31 is stored is the region in the host memory other than the preferred replacement region.

As illustrated in FIG. 42, if the store destination cache line (store destination way number) of the table data which is to be written to the region other than the preferred replacement region (i.e., the storage region in which the address translation table cache 31 is stored) is C, the table data is stored in cache line C, and the value of the usage information of the cache line C is updated to a value (zero, in this example) which enables the cache line C to be replaced most unlikely. As for the cache lines A, B, and E to which the usage information of the values smaller than the original value of the usage information of the cache line C (three, in this example) are allocated, the values of the usage information is updated to an older value by one. In this case, the usage information of the cache line A is updated to a value one obtained by adding one to the original value zero of the usage information of the cache line A. The usage information of the cache line B is updated to value three obtained by adding one to the original value two of the usage information of the cache line B. The usage information of the cache line E is updated to value two obtained by adding one to the original value one of the usage information of the cache line E. As for the cache line D to which the usage information of the value larger than the original value of the usage information of the cache line C (three, in this example) is allocated, the value of the usage information is not updated but maintained at the original value.

The same usage information update operation as the above-explained operation is also executed in a case where the cache line C is accessed by a read request that includes a read address belonging to the address range (i.e., address range from address A to address B).

In addition, as illustrated in FIG. 43, if the store destination cache line (store destination way number) of the table data which is to be written to the region other than the preferred replacement region (i.e., the storage region in which the address translation table cache 31 is stored) is B, the table data is stored in cache line B, and the value of the usage information of the cache line B is updated to a value (zero, in this example) which enables the cache line B to be replaced most unlikely. As for the cache lines A and E to which the usage information of the values smaller than the original value of the usage information of the cache line B (two, in this example) are allocated, each value of the usage information is updated to an older value by one. The usage information of the cache line A is updated to a value one obtained by adding one to the original value zero of the usage information of the cache line A. The usage information of cache line E is updated to a value two obtained by adding one to the original value one of the usage information of the cache line E. As for the cache lines C and D to which the usage information of the values larger than the original value of the usage information of the cache line B (two, in this example) are allocated, the values of the usage information are not updated but maintained at the original values.

The same usage information update operation as the above-explained operation is also executed in a case where the cache line B is accessed by the read request that includes the read address belonging to the address range (i.e., address range from address A to address B).

A flowchart of FIG. 44 illustrates a procedure of a usage information update operation executed by the cache 51 (more specifically, cache controller 51B) illustrated in FIG. 35.

When the cache controller 51B of the cache 51 receives a data write request from the CPU 12 or the hardware accelerator (HWA #1) 52A, the cache controller 51B writes the data to a certain cache line in the cache region 61A (step S181). The cache controller 51B determines whether the write address designated by the write request belongs to a specific address range corresponding to the preferred replacement region or not (step S182).

If the write address belongs to the specific address range (YES in step S182), the cache controller 51B updates the usage information corresponding to the cache line to which the data is written, to the oldest value (i.e., maximum value) (step S183).

On the other hand, if the write address does not belong to the specific address range (NO in step S182), the cache controller 51B updates the usage information corresponding to the cache line to which the data is written, to the latest value (i.e., minimum value) (step S184).

After step S183 or S184, the cache controller 51B updates the usage information corresponding to each of the other ways (other cache lines) in the set to which the data-written cache line belongs, as needed (step S185).

Figure 45:
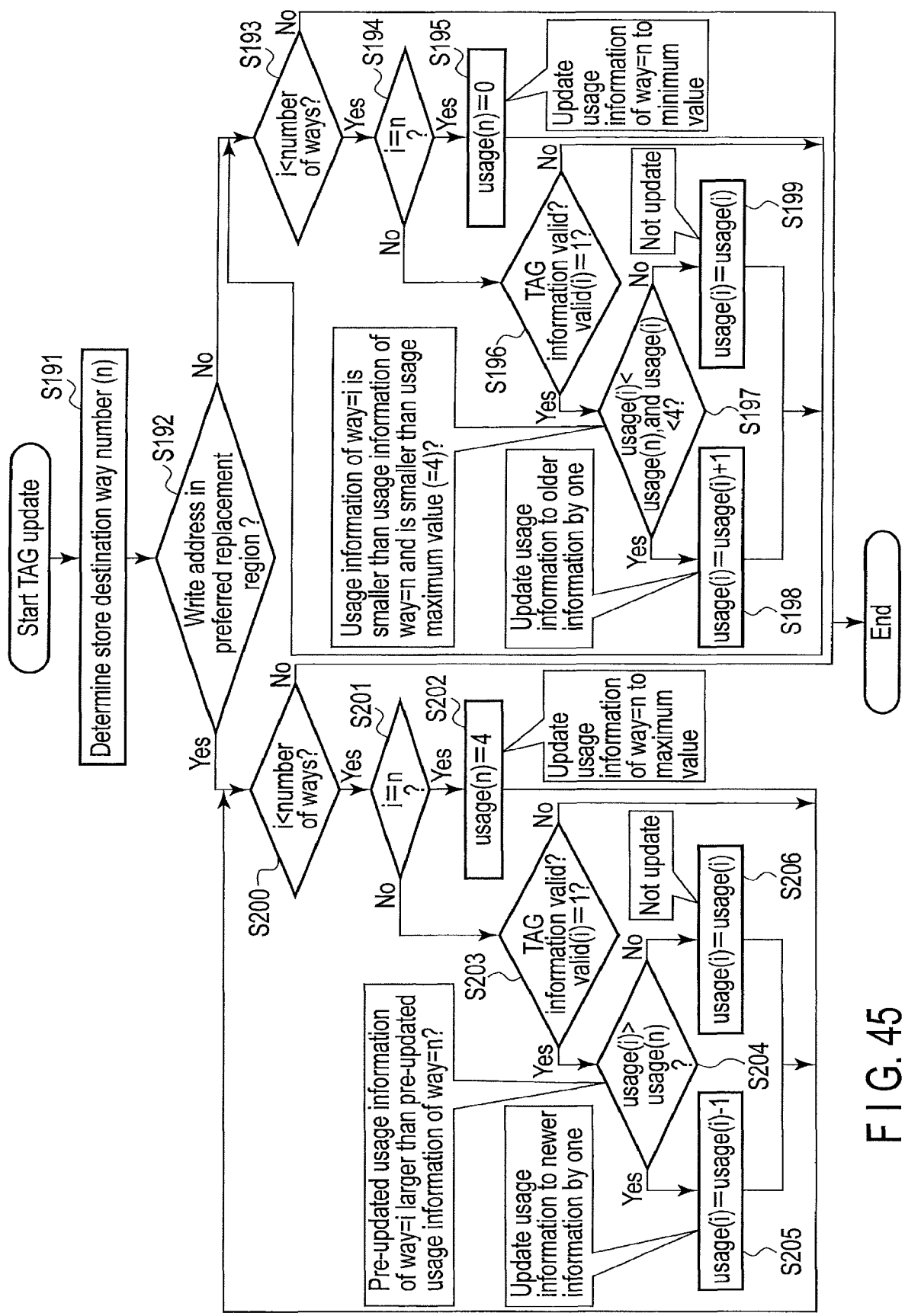
FIG. 45 is a flowchart illustrating a procedure of the usage information update operation executed by the cache illustrated in FIG. 35.

A flowchart of FIG. 45 illustrates an example of a procedure of the usage information update operation executed by the cache 51 (more specifically, cache controller 51B).

In FIG. 45, too, it is assumed that the cache 51 is a five-way set-associative cache. In other words, the number of ways is five, the way numbers are zero to four, and the usage information is zero (new) to four (old). In addition, in FIG. 45, valid (i) represents a valid flag (valid bit VP) of way number i (i.e., cache line i), and usage (i) represents a value of the usage information (i.e., priority) of the way number i (i.e., cache line i).

When receiving a write request from the CPU 12 or the hardware accelerator 52A or 52B, the cache controller 51B of the cache 51 determines the cache line (i.e., the store destination way number (n)) in which a write data is to be stored, among a certain set of five ways determined by the write address corresponding to the write data which is to be written (step S191). Then, the cache controller 51B determines whether the write address belongs to a specific address range corresponding to the preferred replacement region or not (step S192).

If the write address does not belong to the specific address range corresponding to the preferred replacement region, i.e., if the write data is the table data which is to be stored in the address translation table cache (NO in step S192), the cache controller 51B determines whether the current way number i is smaller than the number of ways (i.e., five) (step S193). If the current way number i is smaller than the number of ways (YES in step S193), the cache controller 51B repeats processing in steps S194 to S199 as explained below while incrementing the current way number i from initial value zero by one.

The cache controller 51B first determines whether the current way number i matches the store destination way number (n) or not (step S194).

If the current way number i matches the store destination way number (n) (YES in step S194), the cache controller 51B updates usage information (usage(n)) of the cache line corresponding to the store destination way number (n) to the minimum value (zero, in this case) (step S195).

If the current way number i does not match the store destination way number (n) (NO in step S194), the cache controller 51B determines whether the valid bit of the cache line corresponding to the current way number i is one or not, i.e., whether the cache line of the current way number i is valid or not (step S196).

If the cache line corresponding to the current way number i is not valid (NO in step S196), the cache controller 51B increases the current way number i by one and returns to processing in step S193.

If the cache line corresponding to the current way number i is valid (YES in step S196), the cache controller 51B determines whether a condition that the usage information (usage(i)) of the cache line corresponding to the current way number i is smaller than usage information (usage(i)) and the usage information (usage(i)) is smaller than the maximum value (four, in this case) is met or not (step S197).

If this condition is met (YES in step S197), the cache controller 51B updates the usage information (usage(i)) of the cache line corresponding to the current way number i to older information by one (step S198). In step S198, the cache controller 51B updates the usage information (usage(i)) of the cache line corresponding to the current way number i to "usage(i)+1".

In contrast, if this condition is not met (NO in step S197), the cache controller 51B does not update the usage information (usage(i)) of the cache line corresponding to the current way number i but maintains its original value (step S199).

After executing the processing in step S198 or step S199, the cache controller 51B increases the current way number i by one and returns to the processing in step S193.

Thus, if the write address of the write data does not belong to the address range corresponding to the preferred replacement region, the usage information having a value enabling a corresponding cache line to be replaced most unlikely (i.e., minimum value) is allocated to the cache line in which the write data is stored.

Next, the usage information update operation executed in a case where the write address belongs to the address range corresponding to the preferred replacement region will be explained.

If the write address belongs to the address range corresponding to the preferred replacement region, i.e., if the write data is other than the table data (for example, parity) which is to be stored in the address translation table cache (YES in step S192), the cache controller 51B of the cache 51 determines whether the current way number i is smaller than the number of ways or not (step S200). If the current way number i is smaller than the number of ways (YES in step S200), the cache controller 51B repeats processing in steps S201 to S206 as explained below while incrementing the way number i from initial value zero by one.

The cache controller 51B first determines whether the current way number i matches the store destination way number (n) or not (step S201).

If the current way number i matches the store destination way number (n) (YES in step S201), the cache controller 51B updates the usage information (usage(n)) of the cache line corresponding to the store destination way number (n) to the maximum value (four, in this case) (step S202).

If the current way number i does not match the store destination way number (n) (NO in step S201), the cache controller 51B determines whether the valid bit of the cache line corresponding to the current way number i is one or not, i.e., whether the cache line of the current way number i is valid or not (step S203).

If the cache line corresponding to the current way number i is not valid (NO in step S203), the cache controller 51B increases the current way number i by one and returns to processing in step S200.

If the cache line corresponding to the current way number i is valid (YES in step S203), the cache controller 51B determines whether a condition that the usage information (usage(i)) of the cache line corresponding to the current way number i is larger than the usage information (usage(i)) is met or not (step S197).

If this condition is met (YES in step S204), the cache controller 51B updates the usage information (usage(i)) of the cache line corresponding to the current way number i to newer information by one (step S205). In step S205, the cache controller 51B updates the usage information (usage(i)) of the cache line corresponding to the current way number i to "usage(i)−1".

In contrast, if this condition is not met (NO in step S204), the cache controller 51B does not update the usage information (usage(i)) of the cache line corresponding to the current way number i but maintains its original value (step S206).

After executing the processing in step S205 or step S206, the cache controller 51B increases the current way number i by one and returns to the processing in step S200.

Thus, if the write address of the write data belongs to the address range corresponding to the preferred replacement region, the usage information having a value enabling a corresponding cache line to be replaced most likely (i.e., maximum value) is allocated to the cache line in which the write data is stored.

In the fifth embodiment, when the cache controller 51B stores the data which is to be written in the preferred replacement region corresponding to the designated address range, in the cache line of the cache region 61A, the cache controller 51B allocates the usage information having the value which enables the cache line to be replaced most likely to this cache line (i.e., the priority which enables the cache line to be replaced most likely), but may allocate this cache line to a second most likely replaced value (three, in this case).

In addition, if the cache line holding the data in the preferred replacement region is read, the cache controller 51B may not update the value (priority) of the usage information of this cache line. In contrast, if the cache line holding the data not belonging to the preferred replacement region (table data of the address translation table cache 31) is read, the cache controller 51B may update the value of the usage information (i.e., priority) of this cache line to the most likely replaced value (i.e., maximum value).

In addition, if the cache controller 51B receives first data which is to be stored in one of the cache lines from the hardware accelerator (HWA #2) 52B, the cache controller 51B may store the priority of the likely replaced value in the entry of the cache tag region 61B, which corresponds to this cache line. In this case, the cache 51 may store the usage information of the most likely replaced value (in other words, most likely replaced priority), in the entry of the cache tag region 61B, which corresponds to this cache line, when storing the data in the cache line of the cache region 61A in response to the write request from the hardware accelerator (HWA #2) 52B configured to write the parity to the host memory, and may store the usage information of the most unlikely replaced value (in other words, most unlikely replaced priority), in the entry of the cache tag region 61B, which corresponds to this cache line, when storing the data in the cache line of the cache region 61A in response to the write request from the hardware accelerator (HWA #1) 52A configured to write the table data of the address translation table 7 to the host memory (address translation table cache 31).

In addition, in the fifth embodiment, too, the configurations and the procedures explained in the first to fourth embodiments can be applied to the determination of the replacement target cache line in the address translation table cache 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to manage, by using a first cache tag, a first cache which stores a part of a logical-to-physical address translation table stored in the nonvolatile memory,
the first cache including a plurality of cache lines each including a plurality of sub-lines,
the first cache tag including a plurality of entries respectively corresponding to the cache lines,
each of the entries of the first cache tag including a tag indicating which region of the logical-to-physical address translation table is stored in a corresponding cache line, and a plurality of bitmap flags respectively corresponding to sub-lines in the corresponding cache line,
each of the bitmap flags indicating whether data of the logical-to-physical address translation table is already transferred to a corresponding sub-line, wherein
the controller is configured to determine, when replacing one of the cache lines of the first cache, a cache line including a smallest number of sub-lines to which data of the logical-to-physical address translation table is already transferred, among candidates for the replacement, as a cache line to be replaced.

2. The memory system of claim 1, wherein
the controller is configured to determine the cache line including the smallest number of sub-lines to which data of the logical-to-physical address translation table is already transferred, as the cache line to be replaced, by searching for a cache line including the smallest number of bitmap flags of a value indicative of validity, among the candidates for the replacement.

3. The memory system of claim 1, wherein
each of the entries of the first cache tag further includes a counter indicative of the number of bitmap flags of a value indicative of validity, among the corresponding bitmap flags, and
the controller is configured to determine the cache line including the smallest number of sub-lines to which data of the logical-to-physical address translation table is already transferred, as the cache line to be replaced, by searching for a cache line in which a value of the counter is the smallest, among the candidates for the replacement.

4. The memory system of claim 1, wherein
each of the entries of the first cache tag further includes a shared storage region in which a time stamp for a least recently used (LRU) policy is stored when a first replacement mode is applied, and in which a counter indicative of the number of bitmap flags of a value of validity, among the corresponding plural bitmap flags, is stored when a second replacement mode is applied, and
the controller is configured to;
determine a cache line corresponding to the oldest time stamp as the cache line to be replaced by comparing the time stamps among the candidates for the replacement when the first replacement mode is applied, and
determine a cache line including the smallest number of sub-lines to which data of the logical-to-physical address translation table is already transferred, as the cache line to be replaced, by comparing the counters among the candidates for the replacement when the second replace mode is applied.

5. The memory system of claim 4, wherein
a value of the time stamp for a recently used cache line is updated to be larger than values of the time stamps for other cache lines, and
the controller is configured to determine a cache line in which a value stored in the shared storage region is the smallest, among the candidates for the replacement, as the cache line to be replaced, in both the first replacement mode and the second replacement mode.

6. The memory system of claim 1, wherein
each of the entries of the first cache tag further includes a time stamp whose value should be updated to be larger or smaller than values of the time stamps for other cache lines, and
the controller is configured to exclude a cache line in which a difference between a corresponding time stamp and a latest time stamp is smaller than a threshold value, from the candidates for the replacement, and to determine a cache line including the smallest number of sub-lines to which data of the logical-to-physical address translation table is already transferred, among the other cache lines of the candidates for the replacement, as the cache line to be replaced.

7. The memory system of claim 1, wherein
each of the entries of the first cache tag further includes a time stamp for least recently used (LRU) policy, and
the controller is configured to determine, when two or more cache lines of the candidates for the replacement include the smallest number of sub-lines to which data of the logical-to-physical address translation table is already transferred, a cache line corresponding to the oldest time stamp, among the two or more cache lines that include the smallest number of sub-lines to which the data is already transferred, as the cache line to be replaced.

8. The memory system of claim 1, wherein
each of the entries of the first cache tag further includes a time stamp for least recently used (LRU) policy, and a plurality of dirty flags respectively corresponding to the sub-lines in the cache line, each of the dirty flags indicating whether or not a corresponding sub-line is a dirty sub-line holding data unreflected to the logical-to-physical address translation table, and
the controller is further configured to search for, when two or more cache lines of the candidates for the replacement include the smallest number of sub-lines to which data of the logical-to-physical address translation table is already transferred, a cache line including the smallest number of dirty sub-lines, among the two or more cache lines including the smallest number of sub-lines to which the data is already transferred, and determine, when two or more cache lines of the two or more cache lines including the smallest number of sub-lines to which the data is already transferred include the smallest number of dirty sub-lines, a cache line corresponding to the oldest time stamp, among the two or more cache lines including the smallest number of dirty sub-lines, as the cache line to be replaced.

9. The memory system of claim 1, wherein
the first cache is stored in a memory included in the host.

10. The memory system of claim 1, wherein
the first cache is stored in a random-access memory included in the memory system.

11. The memory system of claim 10, wherein
the random-access memory is a static RAM in the controller or a dynamic RAM provided outside the controller.

12. The memory system of claim 1, wherein
the first cache is stored in a memory included in the host,
the controller further includes a second cache configured to cache data of the logical-to-physical address translation table which is to be stored in the first cache in the memory included in the host, and data other than the logical-to-physical address translation table which is to be stored in the memory of the host, and
the second cache includes a cache controller configured to more preferentially determine a cache line in which the other data is stored, as the cache line to be replaced, than a cache line in which the data of the logical-to-physical address translation table is stored, among cache lines of the second cache.

13. The memory system of claim 12, wherein
the second cache further includes a second cache tag configured to store a priority corresponding to each cache line in the second cache, and
the cache controller of the second cache is configured to store, when a write address of first data which is to be stored in one of the cache lines of the second cache belongs to an address range of a first memory region of the memory included in the host for storing the other data, a priority for preferentially selecting the one of the cache lines of the second cache as the cache line to be replaced, in an entry of the second cache tag which corresponds to the one of the cache lines of the second cache.

14. The memory system of claim 12, wherein
the controller includes a first bus master configured to issue a write request for storing the other data in the memory included in the host,
the second cache further includes a second cache tag configured to store a priority corresponding to each cache line in the second cache, and
the second cache is configured to store, when data is stored in one of the cache lines of the second cache in response to the write request from the first bus master, a priority for preferentially selecting the one of the cache lines of the second cache as the cache line to be replaced, in an entry of the second cache tag which corresponds to the one of the cache lines of the second cache.

15. A memory system connectable to a host, comprising:
a nonvolatile memory; and
a controller electrically connected to the nonvolatile memory and configured to manage, by using a first cache tag, a first cache configured to store a part of a logical-to-physical address translation table stored in the nonvolatile memory,
the first cache being stored in a memory included in the host,
the first cache including a plurality of cache lines each including a plurality of sub-lines,
the first cache tag including a plurality of entries respectively corresponding to the cache lines,
each of the entries of the first cache tag including a tag indicating which region of the logical-to-physical address translation table is stored in a corresponding cache line, and a plurality of bitmap flags respectively corresponding to the sub-lines in the corresponding cache line,
each of the bitmap flags indicating whether data of the logical-to-physical address translation table is already transferred to a corresponding sub-line,
the controller further including a second cache configured to cache data of the logical-to-physical address translation table which is to be stored in the first cache in the memory included in the host, and data other than the logical-to-physical address translation table which is to be stored in the memory included in the host,
the controller being configured to determine, when replacing one of the cache lines of the first cache, a cache line including a smallest number of sub-lines to which data of the logical-to-physical address translation table is already transferred, among candidates for the replacement, as a cache line to be replaced,
the second cache including a cache controller configured to more preferentially determine a cache line in which the other data is stored, as the cache line to be replaced, than a cache line in which the data of the logical-to-physical address translation table is stored, among cache lines of the second cache.

16. The memory system of claim 15, wherein
the second cache further includes a second cache tag configured to store a priority corresponding to each cache line in the second cache, and
the cache controller of the second cache is further configured to store, when a write address of first data which is to be stored in one of the cache lines of the second cache belongs to an address range of a first memory region of the memory included in the host for storing the other data, a priority for preferentially selecting the one of the cache lines of the second cache as the cache line to be replaced, in an entry of the second cache tag which corresponds to the one of the cache lines of the second cache.

17. The memory system of claim 15, wherein
the controller further includes a first bus master configured to issue a write request for storing the other data in the memory included in the host,
the second cache further includes a second cache tag configured to store a priority corresponding to each cache line in the second cache, and
the cache controller of the second cache is configured to store, when data is stored in one of the cache lines of the second cache in response to the write request from the first bus master, a priority for preferentially selecting the one of the cache lines of the second cache as the cache line to be replaced, in an entry of the second cache tag which corresponds to the one of the cache lines of the second cache.

18. A memory system connectable to a host, comprising:
a nonvolatile memory; and a controller configured to cache address translation data indicative of correspondence between a logical address designated by the host and a physical address indicative of a storage location of the nonvolatile memory, in a first cache, the first cache including a plurality of cache lines which are units for the controller invalidating the first cache, each of the cache lines including a plurality of sub-lines which are units for the controller caching the address translation data, wherein the controller preferentially evicts from the first cache a cache line including a first number of the sub-lines to which the address translation data is cached, than a cache line including a second number of the sub-lines to which the address translation data is cached, the second number being larger than the first number.

* * * * *